US012570796B2

(12) United States Patent
McCall

(10) Patent No.: US 12,570,796 B2
(45) **Date of Patent: *Mar. 10, 2026**

(54) POLYESTER POLYMER NANOCOMPOSITES

(71) Applicant: Kintra Fibers, Inc., Brooklyn, NY (US)

(72) Inventor: William McCall, Brooklyn, NY (US)

(73) Assignee: Kintra Fibers, Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,727

(22) Filed: Mar. 6, 2024

(65) Prior Publication Data

US 2025/0034330 A1 Jan. 30, 2025

Related U.S. Application Data

(63) Continuation of application No. 18/213,685, filed on Jun. 23, 2023, now Pat. No. 11,952,459, which is a (Continued)

(51) Int. Cl.
*C08G 63/78* (2006.01)
*C08B 15/00* (2006.01)

(Continued)

(52) U.S. Cl.
CPC .............. *C08G 63/78* (2013.01); *C08B 15/00* (2013.01); *C08G 63/668* (2013.01); *C08L 67/00* (2013.01);

(Continued)

(58) Field of Classification Search
CPC ...................................................... C08G 63/78
See application file for complete search history.

(56) References Cited

U.S. PATENT DOCUMENTS 7,985,566 B2 * 7/2011 Aoshima .................. C12P 7/46 525/437
9,376,530 B2 6/2016 Hess et al.

(Continued)

FOREIGN PATENT DOCUMENTS

CN 102295827 A 12/2011
CN 106977758 A 7/2017

(Continued)

OTHER PUBLICATIONS

Beck, S. et al. "Dispersibility in Water of Dried Nanocrystalline Cellulose." Biomacromolecules, vol. 13, No. 5, Apr. 6, 2012, pp. 1486-1494.

(Continued)

*Primary Examiner* — Michael F Pepitone
(74) *Attorney, Agent, or Firm* — FENWICK & WEST LLP

(57) ABSTRACT

Aspects of the present disclosure include compositions of and methods for producing a polymer-polysaccharide nanocomposite resin, including polymerizing an alkane diol monomer and an alkane diacid agent monomer in a mixture comprising dispersed polysaccharide nanocrystals, a catalyst and one or more optional additives under conditions sufficient to produce a polymer-polysaccharide nanocomposite resin. Aspects of the present disclosure further include compositions of and methods for producing a polybutylene succinate nanocomposite, including dispersing cellulose nanocrystals in 1,4 butanediol (BDO) to form a cellulose-BDO dispersion and esterifying the cellulose-BDO dispersion and succinate anhydride to form a plurality of polybutylene succinate oligomers. The polybutylene succinate oligomers are condensed to form a polybutylene succinate nanocomposite.

25 Claims, 9 Drawing Sheets

Related U.S. Application Data continuation of application No. PCT/US2021/065081, filed on Dec. 23, 2021.

(60) Provisional application No. 63/130,020, filed on Dec. 23, 2020.

(51) Int. Cl.

| | |
|---|---|
| ***C08G 63/668*** | (2006.01) |
| ***C08L 67/00*** | (2006.01) |
| ***D01F 1/10*** | (2006.01) |
| ***D01F 6/84*** | (2006.01) |

(52) U.S. Cl.
CPC .................. *D01F 1/10* (2013.01); *D01F 6/84* (2013.01); *D10B 2401/063* (2013.01)

(56) References Cited

U.S. PATENT DOCUMENTS

| | | | | |
|---|---|---|---|---|
| 9,796,849 | B2 | 10/2017 | Berry et al. | |
| 10,870,727 | B2 | 12/2020 | Aoshima et al. | |
| 11,396,598 | B2 | 7/2022 | Oh et al. | |
| 11,926,699 | B2 | 3/2024 | Li et al. | |
| 11,952,459 | B2 * | 4/2024 | McCall | C08B 15/00 |
| 2008/0319152 | A1 | 12/2008 | Okamoto et al. | |
| 2012/0277351 | A1 | 11/2012 | Yano et al. | |
| 2013/0313477 | A1 | 11/2013 | Beck et al. | |
| 2015/0011792 | A1 | 1/2015 | Gehringer et al. | |
| 2016/0235057 | A1 | 8/2016 | Qiu et al. | |
| 2016/0319467 | A1 | 11/2016 | Yamato et al. | |
| 2019/0194400 | A1 | 6/2019 | Wu et al. | |
| 2020/0216660 | A1 * | 7/2020 | Oh | C08L 67/02 |
| 2020/0331661 | A1 | 10/2020 | Prouvost et al. | |
| 2021/0238413 | A1 | 8/2021 | Song et al. | |
| 2022/0235162 | A1 | 7/2022 | McCall | |
| 2023/0054664 | A1 | 2/2023 | Riofski et al. | |
| 2023/0416954 | A1 | 12/2023 | Schweizer | |

FOREIGN PATENT DOCUMENTS

| | | | |
|---|---|---|---|
| CN | 110776628 | A | 2/2020 |
| EP | 0926178 | A1 | 6/1999 |
| JP | 2013-519736 | A | 5/2013 |
| KR | 20190087873 | A | 7/2019 |
| KR | 10-2069075 | B1 | 1/2020 |
| WO | WO 2006/115226 | A1 | 11/2006 |
| WO | WO 2014/173055 | A1 | 10/2014 |
| WO | WO 2018/081493 | A2 | 5/2018 |
| WO | WO 2018/236151 | A1 | 12/2018 |
| WO | WO 2019/215373 | A2 | 11/2019 |
| WO | WO 2019/216700 | A1 | 11/2019 |
| WO | WO 2020/257298 | A1 | 12/2020 |
| WO | WO 2021/042044 | A1 | 3/2021 |
| WO | WO 2021/131181 | A1 | 7/2021 |
| WO | WO 2021/201185 | A1 | 10/2021 |
| WO | WO 2021/241712 | A1 | 12/2021 |

OTHER PUBLICATIONS

George, J. et al. "Cellulose Nanocrystals: Synthesis, Functional Properties, and Applications." Nanotechnology Science and Applications, vol. 8, Nov. 4, 2015, pp. 45-54.

Habibi, Y. et al. "Cellulose Nanocrystals: Chemistry, Self-Assembly, and Applications." Chemical Reviews, vol. 110, No. 6, Mar. 4, 2010, pp. 3479-3500.

Lu, P. et al. "Cellulose Isolation and Core-Shell Nanostructures of Cellulose Nanocrystals from Chardonnay Grape Skins." Carbohydrate Polymers, vol. 87, No. 1, Mar. 1, 2012, pp. 2546-2553.

Morelli, C. L. et al. "Nanocomposites of PBAT and Cellulose Nanocrystals Modified by in situ Polymerization and Melt Extrusion." Polymer Engineering & Science, vol. 56, No. 12, Dec. 2016, pp. 1339-1348.

PCT International Search Report and Written Opinion, PCT Application No. PCT/US2020/038160, Sep. 28, 2020, 9 pages.

PCT International Search Report and Written Opinion, PCT Application No. PCT/US2021/065081, Mar. 22, 2022, 14 pages.

Tserki, V. et al. "Biodegradable Aliphatic Polyesters. Part I. Properties and Biodegradation of Poly(butylene succinate-co-butylene adipate)." Polymer Degradation and Stability, vol. 91, No. 2, Feb. 2006, pp. 367-376.

Zheng, L. et al. "Novel Poly(butylene fumarate) and Poly(butylene succinate) Multiblock Copolymers Bearing Reactive Carbon-Carbon Double Bonds: Synthesis, Characterization, Cocrystallization, and Properties." Industrial & Engineering Chemistry Research, vol. 52, Apr. 15, 2013, pp. 6147-6155.

Kilinç, K. et al., "The Production and Physical and Thermal Characterization of Polybutylene Succinate Multifilament Yarns," Tekstil Ve Konfeksiyon, vol. 33, Issue 3, Oct. 18, 2022, pp. 262-269.

* cited by examiner

POLYESTER POLYMER NANOCOMPOSITES

CROSS REFERENCE TO RELATED APPLICATION

This application is a continuation of U.S. application Ser. No. 18/213,685, filed Jun. 23, 2023, now U.S. Pat. No. 11,952,459, which is a continuation of International Application No. PCT/US2021/065081, filed Dec. 23, 2021, which claims the benefit of U.S. Provisional Application No. 63/130,020, filed Dec. 23, 2020, each of which are hereby incorporated by reference in their entirety.

INTRODUCTION

Aliphatic polyester polymers can have many interesting properties, including biodegradability, melt processability, and thermal and chemical resistance. Polybutylene succinate (PBS) can be processed in the field of textiles into melt blow, multifilament, monofilament, flat, and split yarn and also in the field of plastics into injection-molded products, thus being a promising polymer exhibiting high processability for various potential applications.

PBS is typically synthesized by performing an esterification reaction between 1,4 butanediol and succinic acid, then condensing the intermediate oligomer products produced to form the PBS polymer. A common method for increasing the molecular weight of PBS polymer by such methods is by adding a chain extender such as a carbonate or a diisocyanate agent during preparation.

Conventional methods can involve undesirable toxic byproducts and reactants. One byproduct of PBS production is tetrahydrofuran (THF), which is a hazardous waste formed when 1,4 butanediol monomer cyclizes. Diisocyanate chain extenders are a non-renewable resource that is also potentially toxic and requires additional processing steps to use.

Linear aliphatic polyesters such as PBS are more susceptible to thermal and hydrolytic degradation than high melting point polyesters such as polyethylene terephthalate (PET), polytrimethylene terephthalate (PTT), or polybutylene terephthalate (PBT). The physical performance of these polymers become extremely sensitive to formulation design and subsequent physical processing.

Polymers that find use in textile applications need to withstand a multitude of processing steps, such as: compounding, melt spinning, drawing, weaving/knitting, dyeing/finishing, and laundering. For example, synthetic textile fibers can be manufactured by a melt spinning process. In this process, a molten polymer is extruded through a die (also called a spinneret) to create a cylindrical jet of viscous polymer, the fiber. From the spinneret, the fiber is wrapped around a drum, which pulls it away at a pre-determined take-up speed. The take-up speed is typically much higher than the extrusion speed in industrial processes, e.g., the take-up speed can be about 50 m/s and the extrusion speed about 10 m/s. The ratio between the take-up speed (vL) and the extrusion speed (v0) is called draw ratio d. Hence the filament is stretched considerably in length and therefore it decreases in diameter. The ambient atmosphere temperature is below the polymer solidification temperature such that the polymer is cooled and solidifies before the take-up. In industrial processes a whole bundle of hundreds of single filaments can be extruded and spun in parallel.

There remains a need for method for producing polymer-polysaccharide nanocomposite resins that reduce the amount of waste produced, while at the same time, utilize renewable raw materials, and provide polymer products with improved properties and processability.

SUMMARY

Aspects of the present disclosure include compositions of, and methods for producing, polyester polymer-polysaccharide nanocomposite resin. The methods of this disclosure can include polymerizing an alkane diol monomer and an alkane diacid agent monomer in a mixture comprising dispersed polysaccharide nanocrystals, a catalyst and one or more optional additives under conditions sufficient to produce a polymer-polysaccharide nanocomposite resin. The catalyst can be added to the mixture before or during polymerization. The polymerizing can be performed in a one pot reaction. The polymerizing can be performed as a single step, or alternatively as two distinct steps having different reaction conditions. Aspects of the present disclosure further include compositions of, and methods for producing, a polybutylene succinate nanocomposite, including dispersing cellulose nanocrystals in 1,4 butanediol (BDO) to form a cellulose-BDO dispersion and esterifying the cellulose-BDO dispersion and succinate anhydride to form a plurality of polybutylene succinate oligomers. The polybutylene succinate oligomers are condensed to form a polybutylene succinate nanocomposite.

In another embodiment, the method comprises adding cellulose nanocrystals to 1,4 butanediol to form a cellulose-BDO mixture, and then sonicating the cellulose-BDO mixture to disperse the cellulose nanocrystals in 1,4 butanediol form a cellulose-BDO dispersion. Succinate derivatives are esterified to the cellulose-BDO dispersion to form a plurality of polybutylene succinate oligomer. The polybutylene succinate oligomers are condensed to form a polybutylene succinate nanocomposite.

Another embodiment of the method comprises adding cellulose nanocrystals to 1,4 butanediol to form a cellulose-BDO mixture and sonicating the cellulose-BDO mixture to disperse the cellulose nanocrystals in 1,4 butanediol and form a cellulose-BDO dispersion. The cellulose-BDO dispersion and succinate anhydride are esterified to form a plurality of polybutylene succinate oligomers, which are then condensed to form a polybutylene succinate nanocomposite.

BRIEF DESCRIPTION OF THE DRAWINGS

FIG. 3A, sonication amplitude of 60%. FIG. 3B, sonication amplitude of 80%. FIG. 3C, sonication amplitude of 100%.

FIG. 4A, 10000 rpm for 1 minute. FIG. 4B, 13333 rpm for 1 minute. FIG. 4C, 16666 rpm for 1 minute.

DETAILED DESCRIPTION

Figure 1:
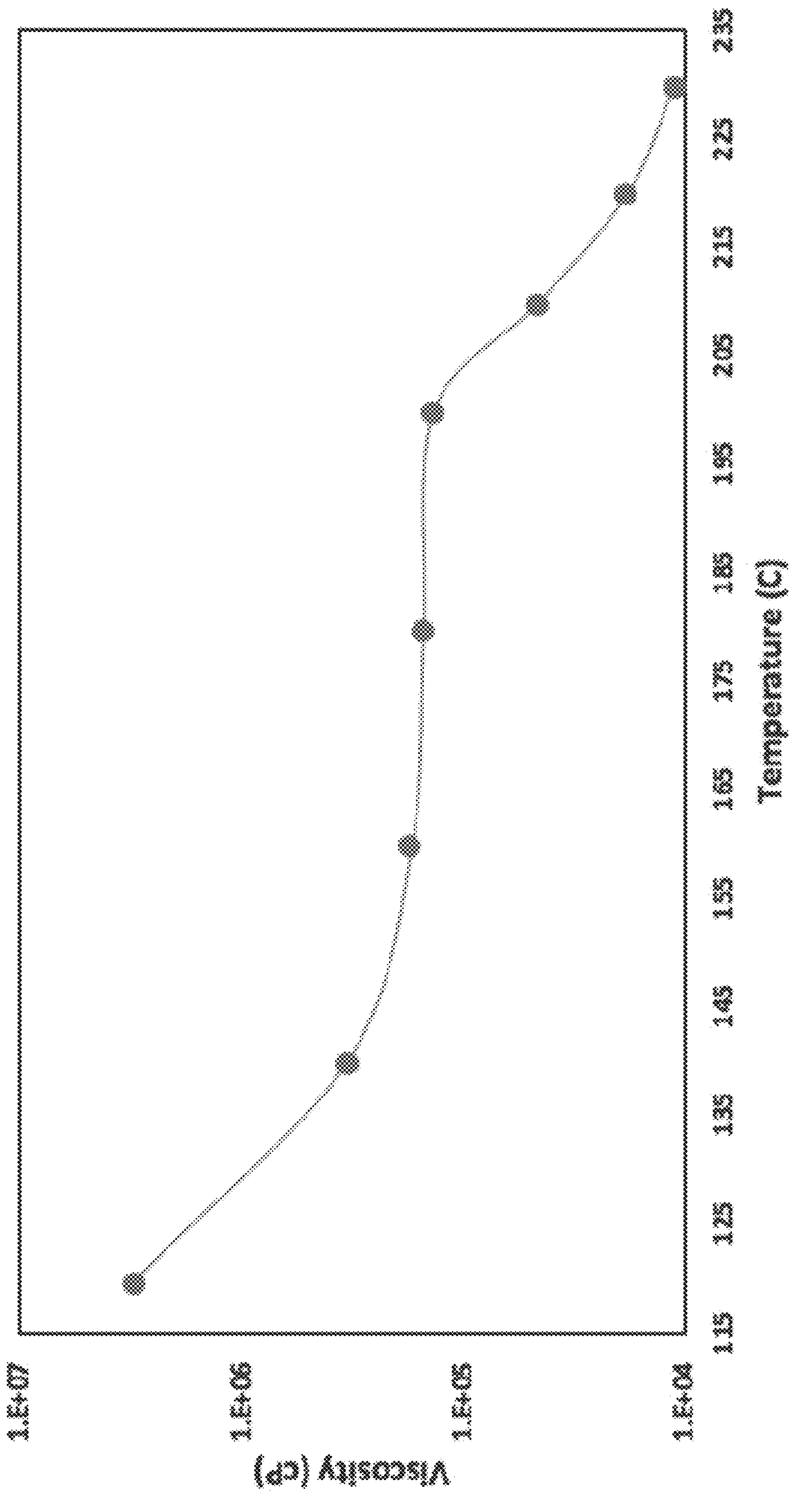
FIG. 1 shows a plot of dynamic viscosity versus temperature for a polybutylene succinate nanocomposite synthesized from cellulose nanocrystals dispersed into 1,4 butanediol using a homogenizer and esterified with epoxidized linseed oil.

The foregoing and other aspects of the present invention will now be described in more detail with respect to the description and methodologies provided herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items.

The term "about," as used herein when referring to a measurable value such as an amount of a compound, dose, time, temperature, and the like, is meant to encompass variations of 20%, 10%, 5%, 1%, 0.5%, or even 0.1% of the specified amount. Unless otherwise defined, all terms, including technical and scientific terms used in the description, have the same meaning as commonly understood by one of ordinary skill in the art to which this invention belongs.

The terms "comprise," "comprises," "comprising," "include," "includes" and "including" specify the presence of stated features, integers, steps, operations, elements, and/or components, but do not preclude the presence or addition of one or more other features, integers, steps, operations, elements, components, and/or groups thereof.

The term "consists essentially of" (and grammatical variants thereof), as applied to the compositions and methods of the present invention, means that the compositions/methods may contain additional components so long as the additional components do not materially alter the composition/method. The term "materially alter," as applied to a composition/method, refers to an increase or decrease in the effectiveness of the composition/method of at least about 20% or more.

All patents, patent applications and publications referred to herein are incorporated by reference in their entirety. In case of a conflict in terminology, the present specification is controlling.

Aspects of the present disclosure include compositions of and methods for producing a polymer-polysaccharide nanocomposite resin, including preparing a mixture (e.g., dispersion) comprising polysaccharide nanocrystals, an alkane diol monomer, an alkane diacid agent monomer and a catalyst; polymerizing the alkane diol monomer and the alkane diacid agent monomer in the dispersion to produce a polymer-polysaccharide nanocomposite resin. In some embodiments, the polysaccharide nanocrystals and/or catalyst are added to the mixture in situ after polymerization has begun. Aspects of the present disclosure further include compositions of and methods for producing a polybutylene succinate nanocomposite, including dispersing cellulose nanocrystals in 1,4 butanediol (BDO) to form a cellulose-BDO dispersion and esterifying the cellulose-BDO dispersion and succinate anhydride to form a plurality of polybutylene succinate oligomers. The polybutylene succinate oligomers are condensed to form a polybutylene succinate nanocomposite.

Polyester Polymer-Polysaccharide Nanocomposite Resin

Aspects of the present disclosure include compositions of a polyester polymer-polysaccharide nanocomposite resin.

A nanocomposite, used herein in its conventional sense, is generally comprised of multiple nanoscale materials or a nanoscale material incorporated into a bulk material. Nanocomposites can be a multiphase solid material where one of the phases has one, two, or three dimensions or structures having nano-scale repeat distances between the different phases that make up the material. Thus, a nanocomposite can include nanoparticles entrained in a polymer matrix.

In some embodiments, a polyester polymer-polysaccharide nanocomposite resin includes an increased modulus and strength by the addition of the nanocomposites as to provide reinforcing fibers as compared to the modulus and strength of a polyester polymer-polysaccharide without the addition of nanocomposites.

In some embodiments, the polyester polymer-polysaccharide nanocomposite resin may act to reinforce the base polymer resin and thereby enhance one or more mechanical properties of the base resin. Non-limiting properties that may be improved through the incorporation of polysaccharide nanoparticles in the base polyester polymer resin may be selected from at least one of the following: modulus of elasticity, tensile yield stress, strength, toughness, hoop stress rating, flexural modulus, UV resistance, reduced rate of gas or moisture transmission, flame retardation mechanism, anti-bacterial properties. The present disclosure therefore allows a measurable enhancement in performance to be achieved without a significant loss of other desirable characteristics, such as tensile strength, ultimate elongation, melt index, thermal stability, flame retardation, antibacterial properties, reduced gas and/or moisture transmission, impact strength, slow crack growth resistance and rapid crack propagation resistance.

In some embodiments, the polyester polymer-polysaccharide nanocomposite resin provides an improved yield stress of at least 1%, at least 2%, at least 3%, at least 4%, at least 5%, at least 6%, at least 7%, at least 8%, at least 9%, or at least 10%, as compared to the base polymer alone, i.e., a composition lacking polysaccharide nanoparticles. In some embodiments, the polyester polymer-polysaccharide nanocomposite resin provides an improved yield stress of at least 10%, at least 20%, at least 30%, at least 40%, at least 50%, at least 60%, at least 70%, at least 80%, or at least 90%, as compared to the base polymer alone. In some embodiments, the polyester polymer-polysaccharide nanocomposite resin provides an improved yield stress of up to 200%, such as up to 100% as compared to the base polymer alone. In some embodiments, the polyester polymer-polysaccharide nanocomposite resin provides an improved yield stress ranging from 10% to 15%, 15% to 20%, 20% to 25%, 25% to 30%, 30% to 35%, 35% to 40%, 40% to 45%, or 45% to 50%, as compared to the base polymer alone.

In some embodiments, the polyester polymer-polysaccharide nanocomposite resin has a tensile strength ranging from about 10 MPa to about 60 MPa. In some embodiments, the polyester polymer-polysaccharide nanocomposite resin has a tensile strength ranging from about 10 MPa to about 15 MPa, about 15 MPa to about 20 MPa, about 20 MPa to about 25 MPa, about 25 MPa to about 30 MPa, about 30 MPa to about 35 MPa, about 35 MPa to about 40 MPa, about 40 MPa to about 45 MPa, about 45 MPa to about 50 MPa, about 50 MPa to about 55 MPa, about 55 MPa to about 60 MPa, about 60 MPa to about 65 MPa, or about 65 MPa to about 70 MPa. In some embodiments, the polyester polymer-polysaccharide nanocomposite resin has a tensile strength of about 10 MPa or more, about 15 MPa or more, about 15 MPa or more, about 20 MPa or more, about 20 MPa or more, about 25 MPa or more, about 25 MPa or more, about 30 MPa or more, about 30 MPa to about 35 MPa, or more, about 35 MPa or more, 40 MPa or more, about 45 MPa or more, about 45 MPa or more, about 50 MPa or more, about 50 MPa or more, about 55 MPa or more, about 55 MPa or more, about 60 MPa or more, about 65 MPa or more, or about 70 MPa or more. In some embodiments, the polyester polymer-polysaccharide nanocomposite resin has a tensile strength ranging from about 20 MPa to about 35 MPa. In some embodiments, the polymer-polysaccharide nanocomposite resin has a tensile strength ranging from about 20 MPa to about 40 MPa. In some embodiments, the polyester polymer-polysaccharide nanocomposite resin has a tensile strength ranging from about 20 MPa to about 60 MPa. In some embodiments, the polymer-polysaccharide nanocomposite resin has a tensile strength ranging from about 20 MPa to about 70 MPa. In some embodiments, the polyester polymer-polysaccharide nanocomposite resin has a tensile strength ranging from about 10 MPa to about 70 MPa.

In some embodiments, the polyester polymer-polysaccharide nanocomposite resin has a modulus of stiffness ranging from 250 MPa to about 450 MPa. In some embodiments, the polyester polymer-polysaccharide nanocomposite resin has a modulus or stiffness ranging from 300 MPa to 400 MPa. In some embodiments, the polyester polymer-polysaccharide nanocomposite resin has a modulus or stiffness of 300 MPa or more, 305 MPa or more, 310 MPa or more, 315 MPa or more, 320 MPa or more, 330 MPa or more, 340 MPa or more, 350 MPa or more, 360 MPa or more, 370 MPa or more, 380 MPa or more, 390 MPa or more, or 400 MPa or more.

In some embodiments, the polyester polymer-polysaccharide nanocomposite resin has a modulus of elasticity ranging from 0.10 GPa to about 1.0 GPa. In some embodiments, the polyester polymer-polysaccharide nanocomposite resin has a modulus of elasticity ranging from 0.20 GPa to about 0.5 GPa. In some embodiments, the polymer-polysaccharide nanocomposite resin has a modulus of elasticity ranging from 0.20 GPa to about 0.4 GPa. In some embodiments, the polyester polymer-polysaccharide nanocomposite resin has a modulus of elasticity of 0.10 GPa or more, 0.15 GPa or more, 0.20 GPa or more, 0.25 GPa or more, 0.30 GPa or more, 0.35 GPa or more, 0.40 GPa or more, 0.45 GPa or more, or 0.50 GPa or more.

In some embodiments, the polyester polymer-polysaccharide nanocomposite resin has a tensile strain ($\epsilon u$) percentage ranging from 10% to about 300%. In some embodiments, the polyester polymer-polysaccharide nanocomposite resin has a tensile strain ($\epsilon u$) percentage ranging from 20% to 200%. The polyester polymer-polysaccharide nanocomposite resin can have a tensile strain ($\epsilon u$) percentage of 10% or more, 20% or more, 30% or more, 40% or more, 50% or more, 60% or more, 70% or more, 80% or more, 90% or more, 100% or more, 110% or more, 120% or more, 130% or more, 140% or more, 150% or more, 160% or more, 170% or more, 180% or more, 190% or more, 200% or more, 210% or more, 220% or more, 230% or more, 240% or more, 250% or more, 260% or more, 270% or more, 280% or more, 290% or more, or 300% or more.

In some embodiments, the polyester polymer-polysaccharide nanocomposite resin has an intrinsic viscosity ranging from about 0.1 to about 1.5 dL/g. In some embodiments, the polyester polymer-polysaccharide nanocomposite resin has an intrinsic viscosity ranging from about 0.2 to about 0.8 dL/g, such as about 0.2 to about 0.5 dL/g. Intrinsic viscosity, used herein and in its conventional sense, is a measure of a solute's contribution to the viscosity of a solution. In some embodiments, the polyester polymer-polysaccharide nanocomposite resin has an intrinsic viscosity of about 0.10 dL/g or more, 0.15 dL/g or more, 0.20 dL/g or more, 0.25 dL/g or more, 0.30 dL/g or more, 0.35 dL/g or more, 0.40 dL/g or more, 0.45 dL/g or more, 0.50 dL/g or more, 0.55 dL/g or more, 0.60 dL/g or more, 0.65 dL/g or more, 0.70 dL/g or more, 0.75 dL/g or more, 0.80 dL/g or more, 0.85 dL/g or more, 0.90 dL/g or more, 0.95 dL/g or more, 1.0 dL/g or more, 1.10 dL/g or more, 1.15 dL/g or more, 1.20 dL/g or more, 1.25 dL/g or more, 1.30 dL/g or more, 1.35 dL/g or more, 1.40 dL/g or more, 1.45 dL/g or more, or 1.50 dL/g or more. In some embodiments, the polyester polymer-polysaccharide nanocomposite resin has an intrinsic viscosity of about 0.8 dL/g or more. In some embodiments, the polyester polymer-polysaccharide nanocomposite resin has an intrinsic viscosity of about 0.9 dL/g or more. In some embodiments, the polyester polymer-polysaccharide nanocomposite resin has an intrinsic viscosity ranging from about 0.8 to about 1.5 dL/g. In some embodiments, the polyester polymer-polysaccharide nanocomposite resin has an intrinsic viscosity ranging from about 0.9 to about 1.5 dL/g. The intrinsic viscosity of the polyester polymer-polysaccharide nanocomposite resins of this disclosure can be determined according to a standard method using a capillary based viscometer, under standard conditions and temperature of 20° C., or according to ASTM D445 and D2515 testing methods, e.g, as described herein.

In some embodiments, the polyester polymer-polysaccharide nanocomposite resin has a relative viscosity ranging from about 3 to about 150. Relative viscosity, used herein and in its conventional sense, refers to the ratio of the viscosity of a polymer solution to the viscosity of the solvent used. In some embodiments, the polyester polymer-polysaccharide nanocomposite resin has a relative viscosity ranging from about 3 to about 5, about 5 to about 7, about 7 to about 10, about 10 to about 15, about 15 to about 20, about 20 to about 25, about 25 to about 30, about 30 to about 35, about 35 to about 40, about 40 to about 45, about 45 to about 50, about 50 to about 55, about 55 to about 60, about 60 to about 65, about 65 to about 70, about 70 to about 75, about 75 to about 80, about 80 to about 85, about 85 to about 90, about 90 to about 95, about 95 to about 100, about 100 to about 105, about 105 to about 110, about 110 to about 115, about 115 to about 120, about 120 to about 125, about 125 to about 130, about 130 to about 135, about 135 to about 140, about 140 to about 145, or about 145 to about 150.

In some embodiments, the polyester polymer-polysaccharide nanocomposite resin has a melt viscosity, ranging from about 500 to about 15,000 cP. In some embodiments, the polyester polymer-polysaccharide nanocomposite resin has a melt viscosity, ranging from about 500 to about 10,000 cP. In some embodiments, the polyester polymer-polysaccharide nanocomposite resin has a melt viscosity, ranging from about 500 to about 1,000 cP. In some embodiments, the polyester polymer-polysaccharide nanocomposite resin has a melt viscosity, ranging from about 800 to about 10,000 cP. In some embodiments, the polyester polymer-polysaccharide nanocomposite resin has a melt viscosity, ranging from about 500 to about 1,000 cP, about 1,000 cP to about 1,500 cP, about 1,500 cP to about 2,000 cP, about 2,000 cP to about 2,500 cP, about 2,500 cP, to about 3,000 cP, about 3,000 cP to about 3,500 cP, about 4,000 cP, about 4,000 cP to about 4,500 cP, about 4,500 cP to about 5,000 cP, about 5,000 cP to about 7,000 cP, about 7,000 cP to about 10,000 cP, or about 10,000 cP to about 15,000 cP. In some cases, the melting temperature at which the melt viscosity is measured is between about 115° C. and about 230° C.

Polysaccharide Nanoparticles

Aspects of the present disclosure include a polyester polymer-polysaccharide nanocomposite resin that includes polysaccharide nanoparticles.

Polysaccharides are comprised of multiple saccharide units joined to one another through glycosidic linkages and have a number of unique features that differentiates them from the other families of biopolymers. Polysaccharide materials that find use in the subject nanocomposites can be nanoparticles, i.e., nano-structured forms of a polysaccharide of interest. In some cases, the nanoparticles are crystalline and can be referred to as nanocrystals.

The polyester polymer-polysaccharide resin can be derived from polysaccharide nanoparticles. In some embodiments, the polyester polymer-polysaccharide resin is derived of polysaccharide nanocrystals, and one or more monomers. In some embodiments, the one or more monomers include an alkane diol monomer and an alkane diacid agent monomer.

In some embodiments, the polysaccharide nanocrystals are derived from heparin, chitosan, chitin, hyaluronan, starch, cellulose, alginate, pectin, guar, starch/chitosan, chitosan/heparin, chitosan/hyaluronan, hyaluronan/heparin, or cellulose and chitin whiskers and platelet-like starch. In some embodiments, the polysaccharide nanocrystals are derived from cellulose, starch or chitin.

In some embodiments, the polysaccharide nanocrystals are derived from cellulose. In some embodiments, the polysaccharide nanocrystals are derived from starch. In some embodiments, the polysaccharide nanocrystals are derived from chitin.

In some embodiments, the polysaccharide nanocrystals can be a sphere, rod, disk, or any other shape. In some embodiments, the nanocrystals that find use in the compositions of this disclosure have a low particle size distribution. In some embodiments, a low particle size distribution refers to nanocrystals or nanoparticles that have a polydispersity index (PDI) of 0.5 or less. In some embodiments, the nanocrystals are polydisperse and can have a high size distribution. In some embodiments, a high particle size distribution refers to nanocrystals or nanoparticles that have a polydispersity index (PDI) of 0.6 or more, such as 1.0 or more.

In some embodiments, the polysaccharide nanocrystals contains or is modified to contain sulfonic acid groups, which may be present as a sulfonate salt, such as sodium salts.

Cellulose Nanoparticles

The polysaccharide nanoparticles that find use in the nanocomposites of this disclosure can be composed of or derived from cellulose. In some embodiments, the polysaccharide nanocrystals are derived from cellulose. The terms cellulose nanoparticles and nanocellulose are used interchangeably herein. Nanocellulose refers to nano-structured cellulose and can include nanofibers or nonfibrils, nanocrystals or other nano sized structures. Cellulose is a polysaccharide (e.g., of the formula $(C_6H_{10}O_5)_n$) that is composed of a linear chain of β(1→4) linked D-glucose units (e.g., n is 100 to 100,000, such as 500 to 10,000). In some embodiments, the polysaccharide nanocrystals are cellulose nanocrystals. The terms cellulose nanocrystals and nanocellulose crystals (NCC) are used interchangeably herein. An exemplary formula of unmodified cellulose is shown below.

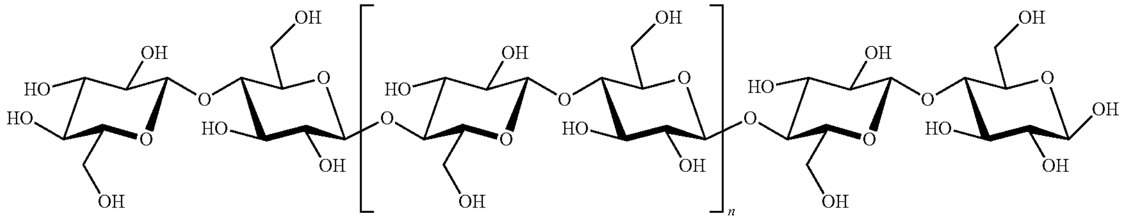

In some embodiments, cellulose nanocrystals, as a subset of cellulose nanoparticles, are highly ordered nano-scale crystals remaining after treatment to remove disordered amorphous regions from nanofibrils (the next member of the cellulose hierarchy).

In some embodiments, the cellulose nanocrystal is a crystal that is derived by subjecting a cellulose fiber to chemical treatment such as acid hydrolysis. In some embodiments, the cellulose nanocrystals are derived from acid hydrolyzed cellulose from cellulosic biomass via an acid hydrolysis technique similar to what was first as first described in Rånby, B. G. (Rånby, B. G. (1951) *Discussion Faraday Society,* 11, 158-164). Nanocellulose crystals (NCC) produced via sulfuric acid treatment and neutralized with base (NaOH in this instance) will contain an amount of sulfate and/or sulfonate substituent groups that affect dispersibility in hydrophilic mediums.

It is understood that the NCC that find use in the subject nanocomposites can be unmodified or modified, e.g., by incorporation of one or more substituents to replace or derivatize one or more of the three hydroxyl groups of one or more of the glucopyranose repeat unit. In some cases, the NCC is sulfated (—$OSO_3H$). During sulfuric acid hydrolysis of cellulose, starch or chitin, sulfate groups will cover the surface of the nanocrystals. If using hydrochloric acid instead, the sulfate groups (or other substituent) can be attached to the nanocrystal surfaces afterwards by an esterification reaction with sulfuric acid. After HCl or HBr hydrolysis, the NCC may be unmodified. Further modification steps can be performed to add a substituent, e.g., an amine containing group to provide for surface cationization. After $H_3PO_4$ hydrolysis, the NCC may be modified with a phosphate (—$OPO_3H_2$). In some cases, after a HCl/HBr hydrolysis followed by a TEMPO-oxidation, the —CH2OH hydroxyl may be converted to a carboxylic acid. In some embodiments, the NCC contains or is modified to contain sulfonic acid substituent groups, or a salt thereof (e.g., sulfonate salt).

Exemplary modified units that may be incorporated into glucopyranose repeat units at the surface of a NCC are shown below, where R is any convenient substituent, e.g., alkyl or substituted alkyl, alkanoyl or substituted alkanoyl, or the like.

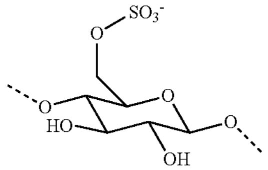

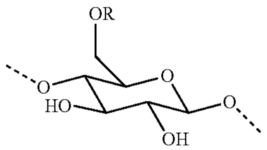

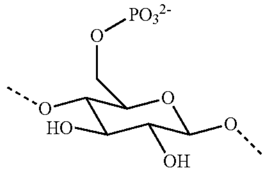

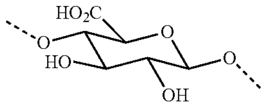

In some embodiments, the cellulose nanocrystals are derived from acid hydrolyzed cellulose from source wood, cotton, bacteria, or algae. In some cases, sulfuric acid is used for acid treatment of the cellulose. NCCs of interest that finds use in the subject methods and compositions includes the NCC described by George et al. ("Cellulose nanocrystals: synthesis, functional properties, and applications", Nanotechnol Sci Appl. 2015; 8: 45-54), the disclosure of which is incorporated by reference.

In some embodiments, the incorporation of NCCs toughens the resulting polybutylene succinate polymer composition (e.g., by making the product more fracture resistant). In some embodiments, additives such as epoxy derivatives or epoxidized oils that are incorporated into the preparation methods (e.g., as described herein) can toughen or strengthen the resulting polybutylene succinate (PBS) polymer composition, but also at the same time impart upon the PBS polymer composition a softness or desirable elasticity. In some embodiments, using a combination of NCC and epoxidized oil toughens the material but makes it slightly softer or more elastic, e.g., as compared to a composition which lacks the epoxidized oil (e.g., as described herein).

In some embodiments, the acid hydrolyzed cellulose is obtained from naturally occurring cellulose fibers. In some embodiments, the acid hydrolyzed cellulose is obtained, for example, plant biomass, vascular plants, cotton plants, wood pulp, jute, hemp, corn, flasks, rice, wheat straw, or sisal. In some embodiments, the cellulose is obtained from plant biomass, which includes, but is not limited to trees, grasses, cotton, sisal, bamboo and ramie.

In some embodiments, cellulose nanocrystals can be found as structural components in tunicates (sea creature similar to sea cucumbers), and are produced naturally by the *Acetobacter xylinum* bacteria.

In some embodiments, the cellulose nanocrystals have average dimensions of about 1 to 80 nm in width and about 25 to 1000 nm in length. In some embodiments, the cellulose nanocrystals have average dimensions ranging from about 1 to 100 nm in width and a length ranging from about 25 to 3000 nm. In some embodiments, the cellulose nanocrystals have average dimensions of about 10 nm or more, 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, 85 nm or more, 90 nm or more, 95 nm or more, or 100 nm or more in width; and 25 nm or more, 50 nm or more, 100 nm or more, 150 nm or more, 200 nm or more, 250 nm or more, 300 nm or more, 350 nm or more, 400 nm or more, 500 nm or more, 550 nm or more, 600 nm or more, 650 nm or more, 700 nm or more, 800 nm or more, 850 nm or more, 900 nm or more, 950 nm or more, 1000 nm or more, 1500 nm or more, 2000 nm or more, 2500 nm or more, or 3000 nm or more, in length.

In some embodiments, the cellulose nanocrystals have average dimensions of about 3 to 50 nm in width and about 100 to 1000 nm in length.

In some embodiments, the cellulose nanocrystals have an average aspect ratio (length/diameter) that is 10 or great, such as 20 or greater, 30 or greater, 40 or greater, 50 or greater, 60 or greater, 70 or greater, 80 or greater, 90 or greater, 100 or greater, 150 or greater, 200 or greater, or even greater. In some embodiments, the cellulose nanocrystals have an average aspect ratio (length/diameter) that is between 10 and 200, such as between 20 and 200, between 50 and 200, or between 100 and 200.

In some embodiments, the nanocrystals in the dispersion have a particle size distribution ranging from about 1 d·nm to about 400 d·nm. In some embodiments, the nanocrystals in the dispersion have a particle size distribution ranging from about 1 d·nm to about 50 d·nm, about 50 d·nm to about 100 d·nm, about 100 d·nm to about 150 d·nm, about 150 d·nm to about 200 d·nm, 200 d·nm to about 250 d·nm, 250 d·nm to about 300 d·nm, 300 d·nm to about 350 d·nm, 350 d·nm to about 400 d·nm. In some embodiments, the nanocrystals in the dispersion have a particle size distribution ranging from about 1 d·nm to about 20 d·nm. In some embodiments, the nanocrystals in the dispersion have a particle size distribution ranging from about 10 d·nm to about 100 d·nm. In some embodiments, the nanocrystals in the dispersion have a particle size distribution ranging from about 10 d·nm to about 30 d·nm. In some embodiments, the nanocrystals in the dispersion have a particle size distribution ranging from about 100 d·nm to about 200 d·nm. In some embodiments, the nanocrystals in the dispersion have a particle size distribution of 1 d·nm or more, 2 d·nm or more, 4 d·nm or more, 6 d·nm or more, 8 d·nm or more, 10 d·nm or more, 12 d·nm or more, 14 d·nm or more, 16 d·nm or more, 18 d·nm or more, 20 d·nm or more, 22 d·nm or more, 24 d·nm or more, 26 d·nm or more, 28 d·nm or more, 30 d·nm or more, 32 d·nm or more, 34 d·nm or more, 36 d·nm or more, 38 d·nm or more, 40 d·nm or more, 42 d·nm or more, 44 d·nm or more, 46 d·nm or more, 48 d·nm or more, 50 d·nm or more, 52 d·nm or more, 54 d·nm or more, 56 d·nm or more, 58 d·nm or more, 60 d·nm or more, 62 d·nm or more, 64 d·nm or more, 66 d·nm or more, 68 d·nm or more, 70 d·nm or more, 72 d·nm or more, 74 d·nm or more, 76 d·nm or more, 78 d·nm or more, 80 d·nm or more, 82 d·nm or more, 84 d·nm or more, 86 d·nm or more, 88 d·nm or more, 90 d·nm or more, 92 d·nm or more, 94 d·nm or more, 96 d·nm or more, 98 d·nm or more, or 100 d·nm or more. In some embodiments, the nanocrystals in the dispersion have a particle size distribution of 100 d·nm or more, 125 d·nm or more, 150 d·nm or more, 175 d·nm or more, 200 d·nm or more, 225 d·nm or more, 250 d·nm or more, 275 d·nm or more, 300 d·nm or more, 325 d·nm or more, 350 d·nm or more, 400 d·nm or more, 425 d·nm or more, 500 d·nm or more, 525 d·nm or more, 550 d·nm or more, 575 d·nm or more, 600 d·nm or more, 625 d·nm or more, 650 d·nm or more, 675 d·nm or more, 700 d·nm or more, 725 d·nm or more, 750 d·nm or more, 775 d·nm or more, 800 d·nm or more, 825 d·nm or more, 850 d·nm or more, 875 d·nm or more, 900 d·nm or more, 925 d·nm or more, 950 d·nm or more, 975 d·nm or more, or 1000 d·nm or more.

In some embodiments, increasing the length of the cellulose nanocrystals increases load distribution potential throughout the polymer relative to a shorter length of the cellulose nanocrystals. In some embodiments, the relative orientation of the cellulose nanocrystals within the polymer provides desirable alignments and interfacial contact between adjacent cellulose nanocrystals in the axial orientation, and can provide an ultimate tensile strength of the resulting composition which can be increased by comparison to a compositions which lacks such aligned nanocrystals.

Cellulose nanocrystal morphology (e.g., length, aspect ratio, length polydispersity) and surface charge vary greatly based on synthesis conditions. In some embodiments, acid hydrolysis is used to break down cellulose microfibrils by digesting the amorphous regions that connect cellulose nanocrystals. In some embodiments, process typically requires heating, agitation, rinsing, filtration, dialysis, and ultrasonication, with the parameters of each step having a direct impact on cellulose nanocrystal morphology and/or surface chemistry. In some embodiments, the final result of cellulose nanocrystal processing includes a suspension of liquid crystalline cellulose nanocrystals that is produced, forming either a nematic or chiral nematic mesophase (e.g., dependent on cellulose nanocrystal length, aspect ratio, length polydispersity, surface charge, nano crystalline cellulose (NCC) concentration, and electrolyte concentration).

In some embodiments, the cellulose nanocrystals enhance one or more mechanical properties of the polymer base resin. Non-limiting properties that may be improved through the incorporation of cellulose nanoparticles in the base polymer resin may be selected from at least one of the following: modulus of elasticity, tensile yield stress, hoop stress rating, flexural modulus, UV resistance, and reduced rate of gas transmission. The present disclosure therefore allows a measurable enhancement in performance to be achieved without a significant loss of other desirable characteristics, such as tensile strength, ultimate elongation, melt index, thermal stability, impact strength, slow crack growth resistance and rapid crack propagation resistance.

Aspects of the subject disclosure include preparation of nanocomposites where the polymer chains can be grafted to the polysaccharide nanoparticles, such as cellulose nanocrystals, e.g., via ester linkages to hydroxyl groups of the polysaccharide.

Chitosan Nanoparticles

The polysaccharide nanoparticles that find use in the nanocomposites of this disclosure can be composed of, or derived from, chitosan. Chitosan, the deacetylated derivative of chitin, is a type of natural biodegradable polysaccharide polymer and is a natural antimicrobial that is non-toxic and sustainable. The use of chitosan nanoparticles can impart some desirable properties upon the resulting compositions, such as flame retardant properties, anti-bacterial properties and enhanced biodegradability.

In some embodiments, the polysaccharide nanocrystals are derived from chitosan. Chitosan is a polysaccharide (e.g., of the formula $(C_6H_{11}NO_4)_n$) that is composed of randomly distributed β-(1→4)-linked D-glucosamine (deacetylated unit) and N-acetyl-D-glucosamine (acetylated unit). In some embodiments, the polysaccharide nanocrystals are chitosan nanocrystals. An exemplary formula of unmodified chitosan is shown below that includes free amine groups. It is understood that some % of the amine groups may be N-acetylated depending on the extent of deacetylation that is present.

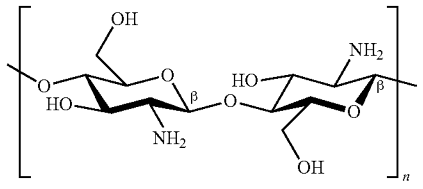

The primary alcohol and/or amine groups of the chitosan may participate in branching reactions with carboxylic acid groups and/or epoxides during the polymerization and/or capping processes of the disclosure.

In some embodiments, chitosan is derived from sea crustaceans, such as, but not limited to shells of shrimp. Commercially, Chitosan is produced by deacetylation of chitin. Chitin is the structural element in the exoskeleton of crustaceans.

In some embodiments, mixtures of two or more type of polysaccharide nanoparticles can be utilized in the subject compositions and methods.

In some embodiments, chitosan nanoparticles are the only type of polysaccharide nanoparticles utilized. In some embodiments, chitosan nanoparticles are utilized is a mixture with nano crystalline cellulose (NCC) as the polysaccharide nanoparticles of the subject compositions and methods. In some instances, the polysaccharide nanoparticle mixture is 50:50% by weight of chitosan to NCC. In some embodiments, the chitosan nanoparticles are more than 50% by weight of polysaccharide nanoparticle mixture. In some embodiments, the NCC is more than 50% by weight of polysaccharide nanoparticle mixture.

Polyester Polymers

The nanocomposites of this disclosure are based on polyester polymers. The term polyester polymer refers to a polymer that includes a plurality of repeating units that are linked via ester linkages. In some embodiments, the ester linkage is formed between an aliphatic diol co-monomer and an aliphatic diacid co-monomer. The polyester polymers of the subject nanocomposites can be biodegradable. The exact components of the polyester polymers can be selected to provide for desirable properties in the resulting nanocomposite.

The term "unit" refers to a structural subunit of a polymer. The term unit is meant to include monomers, co-monomers, co-blocks, segments, repeating units, and the like. A "repeating unit" is a subunit of a polymer that is defined by the minimum number of distinct structural features that are required for the unit to be considered monomeric, such that when the unit is repeated n times, the resulting structure describes the polymer or a block thereof. In some cases, the polymer may include two or more different repeating units, e.g., when the polymer is a multiblock polymer, each block may define a distinct repeating unit. In some cases, a repeating unit of the polymer includes a single monomer group. In certain instances, a repeating unit of the polymer includes two or more monomer groups, i.e., co-monomer groups, such as two, three, four or more co-monomer groups.

The term "co-monomer" or "co-monomer group" refers to a structural unit of a polymer that may itself be part of a repeating unit of the polymer. In some embodiments, the polyester polymer includes a block copolymer that is composed of blocks of polymerized monomers. In such cases, the block copolymer may be described as having distinct repeating units each corresponding to a distinct co-block of the polymer. In some cases, the polymer is a diblock copolymer that contains two different co-blocks. In such cases, the polymer may be described as including co-blocks, where each co-block may be composed of co-monomers, such as one, two, three or more co-monomers.

In some embodiments, the nanocomposite includes a polyester polymer comprising a repeat unit of formula (I):

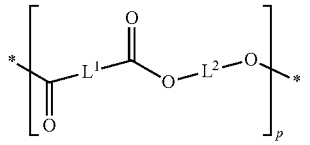

where:

$L^1$ and $L^2$ are each independently a linking group of 2-12 atoms in length;

p is 1 to 100,000; and each * independently represents H, OH, alkyl, alkoxy, alkanoyl, aroyl, heteroaroyl, aryloxy, heteroaryloxy, a capping group, a co-polymer segment, a repeat unit, a co-monomer, a grafted polysaccharide nanoparticle, a linker, a crosslinker, or an epoxidized oil, epoxy derivative or fatty acid.

$L^1$ and $L^2$ can be any convenient divalent linking groups having a chain of between 2 and 12 atoms in length, for example a chain of 2, 3, 4, 5, 6, 8, 10, or 12 carbon atoms in length, where the linker may be linear, branched, or cyclic. In certain cases, one, two, three, four or five or more carbon atoms of a linking group backbone may be optionally substituted with a sulfur, nitrogen or oxygen heteroatom. The bonds between backbone atoms may be saturated or unsaturated (e.g., alkenyl), and in some cases not more than one, two, or three unsaturated bonds are present in a linker backbone. The linker may include one or more substituent groups, for example with an alkyl, aryl or alkenyl group. A linker may include, without limitations, polyethylene glycol; ethers, thioethers, tertiary amines, alkenyls, alkyls, which may be straight or branched, e.g., methyl, ethyl, n-propyl, 1-methylethyl (iso-propyl), nbutyl, n-pentyl, 1,1-dimethylethyl (t-butyl), and the like. In some embodiments of formula (I), $L^1$ and $L^2$ are each independently selected from alkyl, substituted alkyl, alkenyl, substituted alkenyl.

"Alkylene" refers to divalent aliphatic hydrocarbyl groups (e.g., alkyl or alkenyl), preferably having from 2 to 12 and more preferably 2 to 6 carbon atoms that are either straight-chained or branched, and which are optionally interrupted with one or more groups selected from —O—, —NR10-, NR10C(O)—, —C(O)NR10- and the like. This term includes, by way of example, methylene (CH2), ethylene (CH2CH2), n-propylene (CH2CH2CH2), iso-propylene (CH2CH(CH3)), (C(CH3)2CH2CH2), (C(CH3)2CH2C(O)), (C(CH3)2CH2C(O)NH), (CH(CH3)CH2-), and the like. "Substituted alkylene" refers to an alkylene group having from 1 to 3 hydrogens replaced with substituent groups.

In some embodiments of formula (I), p is 2 to 100,000. In some embodiments of formula (I), p is 5 to 100,000. In some embodiments of formula (I), p is 10 to 100,000. In some embodiments of formula (I), p is 100 to 100,000. In some embodiments of formula (I), p is 1000 to 100,000.

In some embodiments of formula (I), p is 2 to 10,000. In some embodiments of formula (I), p is 5 to 10,000. In some embodiments of formula (I), p is 10 to 10,000. In some embodiments of formula (I), p is 100 to 10,000. In some embodiments of formula (I), p is 1000 to 10,000. In some embodiments of formula (I), p is 2 to 1,000. In some embodiments of formula (II), p is 5 to 1,000. In some embodiments of formula (I), p is 10 to 1,000. In some embodiments of formula (I), p is 100 to 1000.

Any convenient polymers, and/or their monomeric precursors, may be adapted to be incorporated into the subject preparation methods to provide a nanocomposite composition having desirable physical properties (e.g., as described herein, such as tensile strength). Polymers of interest, and monomeric precursors thereof, that may be adapted for use in the subject preparation methods and nanocomposite compositions include, but are not limited to, those polymers and monomers described by Zheng et al. (Ind. Eng. Chem. Res. 2013, 52, 6147-6155), Tserki et al. (Polymer Degradation and Stability, Volume 91, Issue 2, February 2006, 367-376), US20190194400, and U.S. Pat. No. 9,796,849, the disclosures of which are herein incorporated by reference in their entirety.

In some aspects, the polyester polymer-polysaccharide nanocomposite resin is derived from a mixture that includes polysaccharide nanocrystals, an alkane diol monomer, and an alkane diacid agent monomer. Aspects of the subject disclosure include preparation of nanocomposites via a polymerization reaction where the polysaccharide nanoparticles, such as cellulose nanocrystals, are present during polymerization to allow for grafting of the polymer chains onto the polysaccharide, e.g., via ester linkages to hydroxyl groups of the polysaccharide.

In some embodiments, the polysaccharide nanocrystals, the alkane diol monomer, and the alkane diacid agent monomer are polymerized (e.g., esterified and polycondensed) in a dispersion to produce a polyester polymer-polysaccharide nanocomposite resin.

In some embodiments, the polyester polymer of the polymer-polysaccharide nanocomposite resin is an aliphatic polyester polymer. In some cases, the polyester polymer is biodegradable. In some embodiments, the polymer includes a polybutylene succinate homopolymer or co-polymer. In some embodiments, the polymer includes poly(butylene succinate-co-butylene adipate).

The polyester polymer can include one or more additional co-monomers that are incorporated into the polymer to provide for a particular desirable property.

In some embodiments, the aliphatic polyester polymer can include, but is not limited to, a segment of a particular aliphatic polyester polymer selected from polylactide (PLA) (e.g., poly(lactic acid)), polyglycolide (PGA) (e.g., Polyglycolic acid), poly(ε-caprolactone) (PCL), poly(γ-valerolactone) (PVL), and co-polymer poly(lactic-co-glycolic acid) (PLGA).

PLA is a biodegradable and hydrophobic polymer synthesized from lactic acid.

PCL is a semicrystalline polyester, typically with a melting temperature of about 55-60° C.

PGA is a highly crystalline polymer, typically with a melting point greater than 200° C. and a glass transition temperature around 35-40° C.

PLGA can be fabricated over different ratios of its monomers, lactide and glycolide, enabling tunable degradation and release rates.

In some embodiments, the nanocomposite includes a polyester polymer comprising a repeat unit of formula (II):

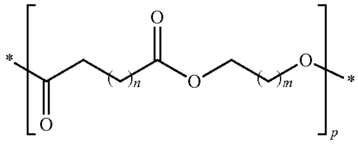

(II)

where:

n is 1 to 11;

m is 1 to 11;

p is 1 to 100,000; and each * independently represents H, OH, alkyl, alkoxy, alkanoyl, aroyl, heteroaroyl, aryloxy, heteroaryloxy, a capping group, a co-polymer segment, a repeat unit, a co-monomer, a grafted polysaccharide nanoparticle, a linker, a crosslinker, or an epoxidized oil, epoxy derivative or fatty acid.

In some embodiments of formula (II), n is 1 to 5 and m is 1 to 5.

In some embodiments of formula (II), n is 1. In some embodiments of formula (II), n is 2. In some embodiments of formula (II), n is 3. In some embodiments of formula (II), n is 4. In some embodiments of formula (II), n is 5.

In some embodiments of formula (II), m is 2 to 5. In some embodiments of formula (II), m is 2. In some embodiments of formula (II), m is 3. In some embodiments of formula (II), m is 4. In some embodiments of formula (II), m is 5.

In some embodiments of formula (II), n is 1 and m is 3.

In some embodiments of formula (II), p is 2 to 100,000. In some embodiments of formula (II), p is 5 to 100,000. In some embodiments of formula (II), p is 10 to 100,000. In some embodiments of formula (II), p is 100 to 100,000. In some embodiments of formula (II), p is 1000 to 100,000.

In some embodiments of formula (II), p is 2 to 10,000. In some embodiments of formula (II), p is 5 to 10,000. In some embodiments of formula (II), p is 10 to 10,000. In some embodiments of formula (II), p is 100 to 10,000. In some embodiments of formula (II), p is 1000 to 10,000.

In some embodiments of formula (II), p is 2 to 1,000. In some embodiments of formula (II), p is 5 to 1,000. In some embodiments of formula (II), p is 10 to 1,000. In some embodiments of formula (II), p is 100 to 1000.

In some embodiments of formula (I)-(II), at least one * represents a grafted polysaccharide nanoparticle. In some embodiments of formula (I)-(II), at least one * represents a grafted cellulose nanoparticle. In some embodiments of formula (I)-(II), at least one * represents a grafted cellulose nanocrystal.

In some embodiments of formula (I)-(II), at least one * represents a capping group. A capping group is a group comprising a compatible functional group suitable for attachment to a hydroxy terminal or carboxylic acid terminal of the polymeric segment. Exemplary capping groups include alkanoyl groups that form an ester linkage to the hydroxy terminal, and alkoxy groups that form an ester linkage to the carboxylic acid terminal. A variety of chemical linkages and capping groups can be utilized. In some embodiments of formula (I)-(II), at least one * represents a linkage to an epoxidized oil, epoxy derivative or fatty acid. An epoxidized oil can have one or more epoxide groups suitable for coupling to a reactive group of the polyester polymer, e.g., a terminal group such as a carboxylic acid to form an ester linkage to the epoxidized oil, or a terminal groups such as a hydroxyl to form an ether linkage. When the epoxidized oil has more that one epoxide reactive group, it can provide for crosslinking between two or more polyester polymers. In some cases, a fatty acid can be used to cap the polyester polymer via an ester linkage to a hydroxyl terminal group.

In some embodiments of formula (I)-(II), at least one * represents a co-monomer, a co-polymer segment, or a repeat unit (e.g., as described herein), such that the polyester polymer is a co-polymer (e.g., as described herein). It is understood that such a co-polymer can be a random co-polymer or a block co-polymer.

In some aspects, the polyester polymer-polysaccharide nanocomposite resin includes polymer repeat units based on a diol monomer HO-$L^2$-OH where $L^2$ is as defined in formula (I). In some cases, $L^2$ is an alkyl or substituted alkyl. In some cases, $L^2$ is an alkenyl or substituted alkenyl.

Alkane Diol Monomers

In some aspects, the polyester polymer-polysaccharide nanocomposite resin includes polymer repeat units based on an alkane diol monomer. The alkane diol monomer refers to a straight chain or branched alkyl group having terminal hydroxyl groups (e.g., HO-alkyl-OH). The alkane diol monomer can have a chain of C2 to C12 linking the terminal hydroxyl groups. The alkane diol monomer can be unsubstituted, or substituted with one or more substituents. In some embodiments, the alkyl group includes from 1 to 10 carbon atoms. In certain embodiments, an alkyl group includes from 1 to 6 carbon atoms, such as from 1 to 4 carbon atoms. This term includes, by way of example, linear and branched hydrocarbyl groups such as ethyl (CH3CH2), n-propyl (CH3CH2CH2-), isopropyl ((CH3)2CH—), n-butyl (CH3CH2CH2CH2), isobutyl ((CH3)2CHCH2), sec-butyl ((CH3)(CH3CH2)CH—), t-butyl ((CH3)3C—), n-pentyl (CH3CH2CH2CH2CH2-), and neopentyl ((CH3)3CCH2-).

The term "substituted alkyl" refers to an alkyl group as defined herein wherein one or more carbon atoms in the alkyl chain have been optionally replaced with a heteroatom such as O—, N—, S—, —S(O)n- (where n is 0 to 2), —NR— (where R is hydrogen or alkyl) and having from 1 to 5 substituents selected from the group consisting of alkoxy, substituted alkoxy, cycloalkyl, substituted cycloalkyl, cycloalkenyl, substituted cycloalkenyl, acyl, acylamino, acyloxy, amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-aryl, —SO-heteroaryl, —SO2-alkyl, —SO2-aryl, SO2-heteroaryl, and —NRaRb, wherein Ra and Rb may be the same or different and are chosen from hydrogen, optionally substituted alkyl, cycloalkyl, alkenyl, cycloalkenyl, alkynyl, aryl, heteroaryl and heterocyclic.

In some embodiments, the alkane diol monomer is selected from a 1,4-butanediol monomer, a 1,2-ethanediol monomer, a 1,3-propanediol monomer, a 1,5-pentanediol monomer, or a 1,6-hexanediol monomer.

In some embodiments, the alkane diol monomer includes one or more diols to form a polyester composite. Non-limiting examples of other suitable diols include, but are not limited to, ethylene glycol, 1,3-propylene glycol, neopentyl glycol, 1,6-hexamethylene glycol, 1,4-cyclohexanedimethanol, hydroquinone, 1.5-dihydroxynaphthalene, 4,4'-dihydroxydiphenyl, bis(p-hydroxyphenyl)methane, bis(p-hydroxyphenyl)-2.2-propane, and combinations thereof.

In some embodiments, the alkane diol monomer 1,4-butanediol.

In some embodiments, the alkane diol monomer is 1,2-ethanediol.

In some embodiments, the alkane diol monomer is 1,3-propanediol.

In some embodiments, one or more additional components may be added or substituted with 1,4-butanediol with one or more other diols to form a polyester composite.

Non-limiting examples of other suitable diols include, but are not limited to, ethylene glycol, 1,3-propylene glycol, neopentyl glycol, 1,6-hexamethylene glycol, 1,4-cyclohexanedimethanol, hydroquinone, 1.5-dihydroxynaphthalene, 4,4'-dihydroxydiphenyl, bis(p-hydroxyphenyl)methane, bis(p-hydroxyphenyl)-2.2-propane, and combinations thereof.

In some embodiments, a polyether having hydroxyl end groups may be used in combination with the diols of the present disclosure. In some embodiments, as the polyether having hydroxyl end groups, the carbon number has a lower limit of usually 4 or more, 10 or more and an upper limit of usually 1,000 or less, 200 or less, more 100 or less. Non-limiting examples of the polyether having hydroxyl end groups include, but are not limited to, diethylene glycol, triethylene glycol, polyethylene glycol, polypropylene glycol, polytetramethylene glycol, poly-1,6-hexamethylene glycol, and the like. Moreover, copolymerized polyether of polyethylene glycol and polypropylene glycol, and the like can be also used.

Alkane Diacid Agent Monomer

The polyester polymer-polysaccharide nanocomposite includes polymer repeat units based on an diacid agent monomer (e.g., of the formula $HO_2C-L^1-CO_2H$ or a derivative or equivalent thereof, where $L^1$ is as defined in formula (I)). The polyester polymer-polysaccharide nanocomposite includes polymer repeat units based on an alkane diacid agent monomer. The alkane diacid agent monomer refers to a straight chain or branched alkyl group having terminal hydroxyl groups. The alkane diacid monomer can have an alkyl chain of C2 to C12 linking the terminal carboxylic acid or ester groups, or equivalent functional group. The alkane diacid agent monomer can be unsubstituted, or substituted with one or more substituents. In some embodiments, the alkyl group includes from 1 to 10 carbon atoms. In certain embodiments, an alkyl group includes from 1 to 6 carbon atoms, such as from 1 to 4 carbon atoms. It is understood that the diacid groups of the monomer are typically provided in a derivative form suitable for polymerization with a hydroxyl containing co-monomer. In some embodiments, where the alkane diacid agent monomer is provided in an ester or cyclic anhydride form, the monomer is capable of transesterification with a hydroxyl containing monomer, e.g., an alkane diol monomer.

In some embodiments, the alkane diacid agent monomer is selected from succinic acid, monoalkyl succinate, dialkyl succinate (e.g., dimethyl succinate or diethyl succinate), succinic anhydride, adipic acid, monoalkyl adipate, dialkyl adipate (e.g., dimethyl adipate or diethyl adipate), and adipic anhydride.

In some embodiments, the alkane diacid agent monomer is selected from oxalic acid, malonic acid, succinic acid, glutaric acid, adipic acid, suberic acid, sebacic acid, cyclohexanedicarboxylic acid, and their cyclic acid anhydride equivalents. In certain embodiments the succinate derivative is substituted with or added to one or more additional components. In some embodiments, these one or more additional components include one or more dicarboxylic acids or anhydrides. Non-limiting examples include, but are not limited to, fumaric acid, oxalic acid, malonic acid, succinic acid, glutaric acid, adipic acid, suberic acid, sebacic acid, cyclohexanedicarboxylic acid, and their cyclic acid anhydride equivalents.

In some embodiments, the polyester polymer includes repeat units based on an aliphatic diacid agent co-monomer (e.g., as described herein). In certain embodiments, the aliphatic diacid agent co-monomer is fumaric acid.

Polybutylene Succinate or Fumarate Polymers and Co-Polymers

In some aspects, the polyester polymer-polysaccharide nanocomposite resin includes polysaccharide nanocrystals, an alkane diol monomer, and an diacid agent monomer.

In some embodiments, the alkane diol monomer is a 1,4-butanediol monomer. In some embodiments, the alkane diacid agent monomer is a succinic acid agent monomer. In some embodiments, alkane diacid agent monomer is succinic anhydride.

Aliphatic homopolyesters and copolyesters can be prepared from 1,4-butanediol and succinic acid agent monomer (e.g., succinic anhydride or dimethylesters of succinic acid) and optionally one or more other co-monomers (e.g., as described herein) through a polymerization process of esterification, transesterification and/or polycondensation. In some embodiments, the process is performed as two distinct steps, e.g., with different reaction conditions e.g., particular conditions of temperature, and/or pressure. In some embodiments, the process in performed as a single step. The process can be performed in a single reaction vessel. Similarly, an alkenyl diacid monomer such as fumaric acid monomer, e.g., maleic anhydride, can be utilized with a 1,4-butanediol monomer to produce a polybutylene fumarate (PBF) homopolymer or co-polymer for use in the subject nanocomposites.

In some embodiments, a mixture including the polysaccharide nanocrystals, the 1,4-butanediol monomer, and the succinic acid agent monomer (optionally in the presence of one or more additional co-monomers) are polymerized (e.g., esterified and/or polycondensed) to produce the polymer-polysaccharide nanocomposite resin.

In some embodiments, the polysaccharide nanocrystals, the alkane diol monomer, and the alkane diacid agent monomer are polymerized in a single step to produce a first resin material. The first resin material can then be pelletized and dried under conditions sufficient to increase the MW of polymers in the first resin material and produce a polyester polymer-polysaccharide nanocomposite resin. In some embodiments, pelletizing and/or drying of the product of polymerization of the polysaccharide nanocrystals, the alkane diol monomer, and the alkane diacid agent monomer removes moisture from the mixture and increases the molecular weight of polymers in the mixture or resin.

In some embodiments, the polymer of the polymer-polysaccharide nanocomposite resin is polybutylene succinate (PBS) homopolymer or polybutylene succinate copolymer.

In some embodiments, the polymer of the polymer-polysaccharide nanocomposite resin is polybutylene succinate copolymer.

In some embodiments, the polybutylene succinate copolymer is butylene fumarate or polymeric blends of PBS and polybutylene fumarate (PBF). In some embodiments, the polybutylene succinate copolymer is represented by the formula (III):

(III)

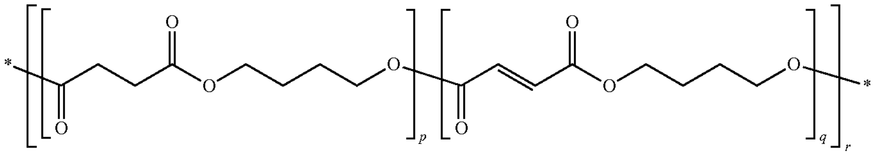

where p, q and r are independently 1 to 100,000, and each * independently represents H, OH, alkyl, alkoxy, alkanoyl, aroyl, heteroaroyl, aryloxy, heteroaryloxy, a capping group, a co-polymer segment, a repeat unit, a co-monomer, a grafted polysaccharide nanoparticle, a linker, a crosslinker, or an epoxidized oil, epoxy derivative or fatty acid.

In some embodiments of formula (III), p and q are independently 2 to 100,000. In some embodiments of formula (III), p and q are independently 5 to 100,000. In some embodiments of formula (III), p and q are independently 10 to 100,000. In some embodiments of formula (III), p and q are independently 100 to 100,000. In some embodiments of formula (III), p and q are independently 1000 to 100,000.

In some embodiments of formula (III), p and q are independently 2 to 10,000. In some embodiments of formula (III), p and q are independently 5 to 10,000. In some embodiments of formula (III), p and q are independently 10 to 10,000. In some embodiments of formula (III), p and q are independently 100 to 10,000. In some embodiments of formula (III), p and q are independently 1000 to 10,000. In some embodiments of formula (III), p and q are independently 2 to 1,000. In some embodiments of formula (III), p and q are independently 5 to 1,000. In some embodiments of formula (III), p and q are independently 10 to 1,000. In some embodiments of formula (III), p and q are independently 100 to 1000.

In some embodiments of formula (III), r is 1 to 10,000. In some embodiments of formula (III), r is 1 to 1,000. In some embodiments of formula (III), r is 1 to 100. In some embodiments of formula (III), r is 1 to 10.

It is understood that the polybutylene succinate copolymer may include any convenient configuration of co-monomers, such as a co-block or random configuration. In some embodiments, the polybutylene succinate copolymer is represented by the formula (IV):

(IV)

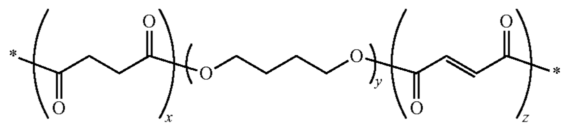

where x, y and z represent the mol % of the co-monomer in the polymer.

In some embodiments, x, y and z are each independently 1 to 50 mol %. In some cases, y is x+z. In some embodiments, x>z. In some embodiments, z>x.

In some embodiments, the polybutylene succinate copolymer has an average MW of 10 kDa to 100 kDa, such as 10 kDa to 50 kDa or 20 kDa to 40 kDa.

In some embodiments, adding the fumarate moiety extends the crystalline melting temperature of PBS up to 10° C. to 15° C. For example, PBS has a melting temperature of about 115° C., which might hinder its processability in the melt, in yarn/fabric production, as well as yarn/fabric application. Pure PBF has a melting temperature of around 139° C. In some embodiments, PBF acts as a polymeric nucleating agent when compounded with succinate derived polyesters and enhances crystallization kinetics.

In some embodiments, the polybutylene succinate copolymer is diethyleneglycolsuccinate. In some embodiments, the diethylene glycol (DEG) may be substituted with triethylene glycol, 1,3 propanediol, sorbitol, or xylitol. In some embodiments, introduction of hydrophilic backbone creates a better substrate for certain bacteria and fungi to adhere to, allowing aerobic/anaerobic degradation processes to occur. In some embodiments, introduction of asymmetrical backbone reduces crystallinity and improves biodegradability. PBS is hydrophobic and highly crystalline, which limits how readily it will degrade in certain aquatic and terrestrial environments.

In some embodiments, the polybutylene succinate copolymer is polypropyleneoxide succinate. Introduction of poly (1,3propyleneoxide) polyol allows for a phase separated soft segment to form in the copolymer, creating a thermoplastic polyester elastomer (TPPE). Polyol molecular weights may range from 500-2700 g/mol. In some embodiments, polytetramethyleneoxide (PTMO) or polyethyleneglycol (PEG) polyols of similar molecular weights may also be used. In some embodiments, fumaric acid may be included in the copolymer. In some embodiments, fumaric acid may be introduced to increase crystallinity and induce better phase separation of hard (PBS) and soft (PPOS) segments.

In some embodiments, the polybutylene succinate copolymer is a phenylethylene succinate. In some embodiments, the tyrosol can be substituted with a homovanillyl alcohol, coniferyl alcohol, or vanillyl alcohol. For example, introduction of naturally occurring aryl hydroxy acids increases strength and durability of polybutylene succinate.

In some embodiments, the polybutylene succinate copolymer is a butylene coumarate. In some embodiments, the p-coumaric acid is substituted with ferulic acid, phloretic acid, syringic acid, sinapic acid, or caffeic acid. For example, introduction of hydroxy cinnamic acid derivatives increases the strength and melting point of PBS.

Succinic Acid Agent Monomer

In some embodiments, the alkane diacid agent monomer is a succinic acid agent monomer or derivative thereof. In some embodiments, the alkane diacid agent monomer is a succinic acid agent monomer. In some embodiments, the succinic acid agent is succinic anhydride.

In some embodiments, the succinic acid agent monomer includes, but is not limited to, a succinic acid agent selected from succinic acid, monoalkyl succinate, dialkyl succinate (e.g., dimethyl succinate or diethyl succinate), or succinic anhydride.

In some embodiments, the succinate acid agent is a succinate derivative. In some embodiments, the succinate derivative is succinate anhydride. In some embodiments, the succinate anhydride increases the speed of esterification with 1,4 butanediol and also reduces the amount of hazardous THF produced during the esterification step relative to a polymer-polysaccharide nanocomposite resin that does not include a succinate anhydride. However, other suitable non-limiting examples of succinate derivatives may include succinic acid or succinate esters.

Additives

A variety of additives may be included during the polymerization of the monomer agents, and can impart desirable physical properties or characteristics upon the resulting polymer-polysaccharide nanocomposite resin. The additives can be co-monomers, capping agents, epoxy-derivatives, oils (e.g., epoxidized oils), pigments, cross-linkers, and the like. Thus, in some aspects, the polymer-polysaccharide nanocomposite resin includes one or more additional co-monomers, additive components and/or capping agents. The additives that are added into the reaction mixture can be incorporated covalently or non-covalently into the resulting polymer-polysaccharide nanocomposite resin. In some instances, the additive is capable of forming a covalent bond with a chemical group on the growing polymer, e.g., a terminal hydroxy or carboxylic acid type group, or a compatible ligation group of a crosslinker. In other instances, the additive is incorporated non-covalently into the resin composition to impart a desirable physical property (e.g., as described herein).

In some embodiments, the polymer polysaccharide nanocomposite includes one or more additional monomers or components, such as, but not limited to, co-monomers, capping groups, epoxy-derivatives, oils, pigments, cross-linkers, and the like.

In some embodiments, the one or more additional monomers includes an additional alkane diol monomer and/or an additional diacid agent monomer.

In some embodiments, an additional alkane diol monomer includes, but is not limited to, a 1,4-butanediol monomer, a 1,2-ethanediol monomer, a 1,3-propanediol monomer, a 1,5-pentanediol monomer, or a 1,6-hexanediol monomer.

In some embodiments, an additional diacid agent monomer includes, but is not limited to succinic acid, monoalkyl succinate, dialkyl succinate (e.g., dimethyl succinate or diethyl succinate), succinic anhydride, adipic acid, monoalkyl adipate, dialkyl adipate (e.g., dimethyl adipate or diethyl adipate), and adipic anhydride.

In some embodiments, the additional alkane diacid agent monomer includes adipic anhydride.

In some embodiments, the one or more additional components can include a hydrophobic agent. In some embodiments, the hydrophobic agent is an oil. In some embodiments, the hydrophobic agent is an elastomer material. In some embodiments, the hydrophobic agent is an epoxidized soybean oil or elastomer material.

In some embodiments, the one or more additional components include, but are not limited to agents to provide additional water and oxygen barrier properties may be included. Non-limiting exemplary water and oxygen barrier agents include candelilla wax, beeswax, and other waxes. In some embodiments, such a barrier agent is derived from a renewable source.

In some embodiments, the one or more additional component is a non-covalent plasticizer. Plasticizers are additives that are used to impart flexibility to polymer blends and improve their processability. Any known non-covalent plasticizer may be included as one or more additional components.

In some embodiments, one or more additional components include gloss agents that provide an aesthetically pleasing gloss to a finished product. Non-limiting exemplary gloss agents include shea butter and nut oils, such as Brazil nut oil. In some embodiments, a gloss agent is derived from a renewable source.

In some embodiments, the one or more additional components include, but are not limited to impact modifiers, antioxidants, antibacterial agents, antifungal agents, antistatic agents, fillers, thermal stabilizers, UV stabilizers, dyes, fillers, crystallizing promoters and coupling agents.

Non-limiting examples of antioxidants include hindered phenol antioxidants, such as p-tert-butyl hydroxytoluene and p-tert-butyl hydroxyanisole, sulfur antioxidants such as distearyl thiodipropionate and dilauryl thiodipropionate, and the like; heat stabilizers include triphenyl phosphite, trilauryl phosphite, tris-nonylphenyl phosphite and the like; UV stabilizers include p-tert-butyl phenyl salicylate, 2-hydroxy-4-methoxybenzophenone, 2-hydroxy-4-methoxy-2'-carboxybenzophenone, 2,4,5-trihydroxybutylophenone and the like; lubricants include calcium stearate, zinc stearate, barium stearate, sodium palmitate and the like; antistatic agents include N,N-bis(hydroxyethyl) alkyl amine, alkyl amine, alkyl allyl sulfonate, alkyl sulfonate and the like; flame retarders include hexabromocyclododecane, tris-(2,3-dichloropropyl) phosphate, pentabromophenyl allyl ether and the like; anti-blocking agents include the combination of inorganic fillers such as silica and oleamide and the like; inorganic fillers or nucleating agents include calcium carbonate, silica, titanium oxide, talc, mica, barium sulfate, alumina, mixture of $NaHCO_3$ and citric acid and the like; crystallizing promoters include polyethylene terephthalate, poly-transcyclohexane dimethanol terephthalate and the like; organic fillers include wood powder, rice hull, wastepaper such as newspaper, starches (including modified materials such as alpha-starch), cellulose and the like.

In some embodiments, a polyether having hydroxyl end groups may be used in combination with the diols disclosed in the present disclosure. As the polyether having hydroxyl end groups, the carbon number has a lower limit of usually 4 or more, preferably 10 or more and an upper limit of usually 1,000 or less, preferably 200 or less, more preferably 100 or less. Non-limiting examples of the polyether having hydroxyl end groups include, but are not limited to diethylene glycol, triethylene glycol, polyethylene glycol, polypropylene glycol, polytetramethylene glycol, poly-1,6-hexamethylene glycol, and the like. Moreover, copolymerized polyether of polyethylene glycol and polypropylene glycol, and the like can be also used.

In some embodiments, the one or more additional monomers includes one or more dicarboxylic acids or anhydrides. Non-limiting examples may include, but are not limited to oxalic acid, malonic acid, succinic acid, glutaric acid, adipic acid, suberic acid, sebacic acid, cyclohexanedicarboxylic acid, and their cyclic acid anhydride equivalents.

Epoxidized Lipid Additive

In some embodiments, the additive is an epoxidized lipid. Any convenient lipids can be adapted for use in the compositions and methods of this disclosure. In general terms, a lipid that is unsaturated or polyunsaturated can be epoxidized to provide an additive material that finds use in the compositions and methods of this disclosure. In some embodiments, the term “epoxidized derivative” or “epoxy derivative” refers to a derivative of a lipid moiety that has been epoxidized (e.g., using a peroxide or peracid reagent).

In some embodiments, the additive can include an epoxidized oil, epoxidized derivative of a fatty acid, triglyceride, terpene or other lipid, or an epoxidized polymer. In some embodiments, the epoxidized oil, epoxidized fatty acid ester, epoxidized triglyceride, epoxidized terpene, epoxidized polymer, epoxy derivative or other fatty acid (ester) additive is capable of reaction with a monomer, oligomer or polymer of the polymerization reaction mixture.

In some embodiment, the additive is an epoxidized triglyceride. Triglycerides with varying degrees of unsaturation may be epoxidized to add reactive functionality. In some cases, the functionality is up to 6 epoxide groups per molecule. Linseed oil and soybean oil are triglycerides which can be epoxidized for use in the methods and compositions of this disclosure.

In some instances, the additive is capable of an esterification. In some instances, the additive includes epoxide functional groups that are capable of forming covalent bonds with a hydroxy and/or carboxylic acid group of the growing oligomers or polymers. In some embodiments, the epoxy derivative or epoxidized oil or other additive is added to the reaction mixture or dispersion at the beginning of the polymerization reaction. In some embodiments, the epoxy derivative or epoxidized oil or other additive is added to the reaction mixture during the polymerization reaction, e.g., after oligomers of a desirable length have been formed. In some embodiments, the epoxy derivative or epoxidized oil or other additive is added at the end of the polymerization reaction. For example, in some embodiments, the epoxy derivative or epoxidized can be added after re-pressurizing the vessel just before the cool down and discharging of the polymer. In some embodiments, NCCs, epoxy derivative, and/or epoxidized oil can be added up front with the alkane diol monomer and/or alkane diacid agent monomer. For example, in some embodiments, the NCCs can be added in the beginning of the reaction in the form of a dispersion. In some embodiments, the epoxy derivative or epoxidized oil is added at the very end of the esterification process right before a catalyst is added and the polycondensation takes place. In some examples, the epoxy derivative or epoxidized oil is allowed to react for 5 minutes before adding the catalyst. The high shear disperser method follows the same process as the sonication method for time and power consumption, but instead uses the equipment described in https://www(dot)mixers(dot)com/products/high-speed-dispersers/.

In some embodiments, the one or more additional monomers is an epoxidized oil. In some embodiments, the one or more additional monomers is an epoxidized derivative, e.g., of a fatty acid or fatty acid ester. In some embodiments, the epoxidized oil or an epoxy derivative includes, but is not limited to epoxidized linseed oil, epoxidized soybean oil, lard, beef tallow, fish oil, coffee oil, soybean oil, safflower oil, tung oil, tall oil, calendula, rapeseed oil, peanut oil, sesame oil, grape seed oil, olive oil, jojoba oil, dehydrated castor oil, tallow oil, sunflower oil, cottonseed oil, corn oil, canola oil, orange oil, and mixtures thereof.

In some embodiments, the epoxidized oil is derived from one or more or fatty acids selected from linolenic acid, oleic acid, linoleic acid, palmitic acid and stearic acid. In some cases, the epoxidized oil is derived from a fatty acid derivative (e.g., a triglyceride). In some embodiments, the epoxidized oil is epoxidized linseed oil. In some embodiments, the epoxidized oil is epoxidized soybean oil. Epoxidized linseed oil or epoxidized fatty acid derivative can act as a non-volatile, plasticizer during resin preparation to stabilize the resin product and help provide for a desirable intrinsic viscosity and/or or physical properties of the resin.

The epoxidized oil can impart a number of benefits and desirable properties on the methods and resin compositions of this disclosure. The epoxidized oil can act as an acid scavenger, where the epoxide groups preferentially react with any COOH groups that are present in the prepolymer mixture. The inventors demonstrated that the addition of epoxidized oils such as ELO, leads to an improvement of the color and heat stability of the resulting resin mixture. The epoxidized oil can act as a chain extender, whereby the high reactivity and functionality can induce large branches in the prepolymer mixture. The inventors demonstrated that the addition of epoxidized oils such as ELO, leads to an improvement of the melt strength and intrinsic viscosity of the polymeric resin product. In addition, the addition of epoxidized oil can lead to a process enhancement, where the epoxide groups may react with any residual solvent (e.g., BDO or water) that is present in the prepolymer mixture. The inventors demonstrated that the addition of epoxidized oils such as ELO, leads to increasing processing speeds, and reduced reaction times.

In some embodiments, the one or more additives are added to the reaction mixture in situ. In some embodiments, the one or more additives includes a thermal stabilizer. In some embodiments, the one or more additives includes a decolorizer. In some embodiments, the one or more additives is a flame retardant. In certain embodiments, the one or more additives is phytic acid. In certain embodiments, phytic acid added in situ to the reaction and provides for thermal stabilization and decolorization of the nanocomposite resin.

Catalysts

The polymerization reaction to the polymer-polysaccharide nanocomposite resin can be performed in the presence of a catalyst. The catalyst can be used during the polymerization process to activate and accelerate the process, e.g., esterification reactions between alkane diol monomers and alkane diacid agent monomers, and/or oligomers thereof. In some embodiments, the reaction mixture (e.g., dispersion) including the one or more additional monomers can further include a catalyst. In some embodiments, catalysts are added to the reaction mixture during the esterification and/or polycondensation process after polymerization has already been initiated.

The catalyst can be a Lewis acid catalyst.

The catalyst can be a metal-based Lewis acid catalyst.

In some embodiments, the catalyst utilized in the preparation of resin compositions of this disclosure is a metal oxide catalyst. In some embodiments, the catalyst is a mixed metal oxide catalyst, such as a catalyst described by Carneiro et al. "Embracing the Complexity of Catalytic Structures: A Viewpoint on the Synthesis of Nonstoichiometric Mixed Metal Oxides for Catalysis." ACS Catalysis 2020 10 (1), 516-527, the disclosure of which is herein incorporated by reference.

In some embodiments, the metal oxide catalyst is a mixed metal oxide that includes two or more different metal oxides, i.e., metal oxides derived from different metals. In some embodiments, the mixed metal oxide catalyst includes an alkali or alkaline earth metal oxide and a transition metal oxide. In some embodiments, the mixed metal oxide catalyst includes an alkaline earth metal oxide and a transition metal oxide.

Transition metal oxides of interest that can be utilized in the catalyst compositions of this disclosure include but are not limited to, metal oxides containing aluminum, tin, titanium, zirconium, iron, copper, zinc, hafnium and molybdenum.

Alkaline earth metal oxides of interest that can be utilized in the catalyst compositions of this disclosure include but are not limited to, metal oxides containing calcium, magnesium, or strontium.

In some embodiments, the mixed metal oxide catalyst comprises a titanium or zirconium metal catalyst, and an alkaline earth metal catalyst containing calcium, magnesium, or strontium.

In general, a compound containing at least one member among metal elements belong to the groups 1 to 14 of the periodic table may be used as the esterification reaction catalyst. Specifically, examples of the metal element include scandium, yttrium, samarium, titanium, zirconium, vanadium, chromium, molybdenum, tungsten, tin, antimony, cerium, germanium, zinc, cobalt, manganese, iron, aluminum, magnesium, calcium, strontium, sodium, potassium, and the like. Of these, scandium, yttrium, titanium, zirconium, vanadium, molybdenum, tungsten, zinc, iron, and germanium are preferable; and titanium, zirconium, tungsten, iron and germanium are especially preferable. Furthermore, in order to reduce the concentration of the polyester terminal which influences thermal stability of the polyester, among the foregoing metals, metal elements belonging to groups 3 to 6 of the periodic table and exhibiting the Lewis acidity are preferable. Specifically, examples thereof include scandium, titanium, zirconium, vanadium, molybdenum, and tungsten. In particular, from the standpoint of easiness of availability, titanium and zirconium are preferable, and furthermore, from the standpoint of reaction activity, titanium is preferable. In alternative embodiments, the catalyst is not a titanium containing catalyst.

In some embodiments, the catalyst is a metal-based Lewis acid catalyst comprising aluminum, tin, titanium, zirconium, iron, copper, zinc, hafnium or molybdenum. In some embodiments, the catalyst includes a titanium or zirconium compound, such as titanium lactate or zirconium butoxide.

In some embodiments, the catalyst is a hafnium-containing catalyst. In some embodiments, the catalyst includes a hafnium salt such as a hafnium alkoxide. Hafnium salts of interest which may be utilized as a catalyst in the subject methods include, but are not limited to, hafnium acetate, hafnium acetylacetonate, hafnium ethoxide, hafnium propoxide, hafnium butoxide, hafnium tert-butoxide, hafnium chloride, hafnium oxychloride hydrate, hafnium tetrachloride, tetrakis(ethylmethylamido)hafnium and hafnium-tannic acid (Hf-TA) catalyst.

In some embodiments, the catalyst is a molybdenum-containing catalyst. Molybdenum(VI)-complexes can have a high Lewis acidity and act on alcohol O—H bond leading to a transient species which has high nucleophilic character. Sodium molybdate is a heterogeneous catalyst used for the methanolysis of different types of renewable lipid sources derived from the soybean oil. Transesterification reactions can occur under relatively mild conditions, requiring low temperatures, short times and normal pressure. See e.g., Nakagaki et al. "Use of anhydrous sodium molybdate as an efficient heterogeneous catalyst for soybean oil methanolysis", Applied Catalysis A: General 351 (2008) 267-274, the disclosure of which is herein incorporated by reference. In some embodiments, the catalyst includes a molybdate salt or complex, such as sodium molybdate ($Na_2MoO_4$), potassium molybdate or zinc molybdate ($ZnMoO_4$).

In some embodiments, the catalyst is NOT a titanium containing catalyst. In some cases, a catalyst can impart a certain color on the resulting resin, and thus it is understood that the catalyst can be selected to provide for desired color or colorless property.

In some embodiments, the catalyst is a titanium compound. In some embodiments, the titanium compound is a tetraalkyl titanate and a hydrolyzate thereof. Non-limiting examples include, but are not limited to, tetra-n-propyl titanate, tetraisopropyl titanate, tetra-n-butyl titanate, tetra-t-butyl titanate, tetraphenyl titanate, tetracyclohexyl titanate, tetrabenzyl titanate, and mixed titanates thereof, and hydrolyzates thereof.

In some embodiments, the catalyst includes titanium (oxy)acetyl acetonate, titanium tetraacetyl acetonate, titanium (diisopropoxide)acetyl acetonate, titanium bis(ammonium lactate)dihydroxide, titanium bis(ethyl acetoacetate) diisopropoxide, titanium (triethanolaminate) isopropoxide, polyhydroxytitanium stearate, titanium lactate, titanium triethanolaminate, butyl titanate dimer, or the like. In some embodiments, the method further comprises adding liquid materials obtained by mixing an alcohol, a group 2 metal compound in the long-form periodic table (Nomenclature of Inorganic Chemistry IUPAC Recommendations 2005) (hereinafter sometimes referred to as "group 2 metal compound in the long-form periodic table"), a phosphoric ester compound, and a titanium compound.

In some embodiments, the catalyst selected from tetra-n-propyl titanate, tetraisopropyl titanate, tetra-n-butyl titanate, titanium (oxy)acetyl acetonate, titanium tetraacetyl acetonate, titanium bis(ammonium lactate)dihydroxide, polyhydroxytitanium stearate, titanium lactate, or butyl titanate dimer; and adding a liquid material obtained by mixing an alcohol, a group 2 metal compound in the long-form periodic table, a phosphoric ester compound, and adding a titanium compound.

In some embodiments, the catalyst is selected from tetra-n-butyl titanate, titanium (oxy)acetyl acetonate, titanium tetraacetyl acetonate, polyhydroxytitanium stearate, titanium lactate, or butyl titanate dimer; and adding a liquid material obtained by mixing an alcohol, a group 2 metal compound in the long-form periodic table, a phosphoric ester compound; and adding a titanium compound.

In some embodiments, the catalyst is selected from tetra-n-butyl titanate, polyhydroxytitanium stearate, titanium (oxy)acetyl acetonate, titanium tetraacetyl acetonate; and adding a liquid material obtained by mixing an alcohol, a group 2 metal compound in the long-form periodic table, a phosphoric ester compound, and adding a titanium compound.

Non-limiting examples of the zirconium compound as a catalyst include, but are not limited to, zirconium tetraacetate, zirconium acetate hydroxide, zirconium tris(butoxy) stearate, zirconyl diacetate, zirconium oxalate, zirconyl oxalate, potassium zirconium oxalate, polyhydroxyzirconium stearate, zirconium ethoxide, zirconium tetra-n-propoxide, zirconium tetraisopropoxide, zirconium tetra-n-butoxide, zirconium tetra-t-butoxide, zirconium tributoxyacetyl acetonate, and mixtures thereof.

In some embodiments, the catalyst is selected from zirconyl diacetate, zirconium tris(butoxy)stearate, zirconium tetraacetate, zirconium acetate hydroxide, ammonium zirconium oxalate, potassium zirconium oxalate, polyhydroxyzirconium stearate, zirconium tetra-n-propoxide, zirconium tetraisopropoxide, zirconium tetra-n-butoxide, and zirconium tetra-t-butoxide are preferable; zirconyl diacetate, zirconium tetraacetate, zirconium acetate hydroxide, zirconium tris(butoxy)stearate, ammonium zirconium oxalate, zirconium tetra-n-propoxide, and zirconium tetra-n-butoxide. In some embodiments, the catalyst is selected from zirconium tris(butoxy)stearate. In some embodiments, a colorless polyester with a high degree of polymerization is easily obtained using zirconium tris(butoxy)stearate.

In some embodiments, the catalyst is a germanium compound. Non-limiting examples of the germanium compound include, but are not limited to, inorganic germanium compounds such as germanium oxide, germanium chloride, etc.; and organic germanium compounds such as a tetraalkoxygermanium, etc. From the standpoints of prices and easiness of availability, germanium oxide, tetraethoxygermanium, tetrabutoxygermanium, and the like are preferable, and germanium oxide is especially preferable.

In some embodiments, the catalyst is an inorganic chloride. Non-limiting examples of inorganic chlorides include, but are not limited to, such as ferric chloride, etc.; inorganic oxides such as triiron tetroxide, etc.; organic iron complexes such as ferrocene, etc.; and the like. In some embodiments, the catalyst is an inorganic oxide.

In some embodiments, the catalyst is a metal-containing compound. Non-limiting examples of metal-containing compounds include, but are not limited to scandium compounds such as scandium carbonate, scandium acetate, scandium chloride, scandium acetyl acetonate, etc.; yttrium compounds such as yttrium carbonate, yttrium chloride, yttrium acetate, yttrium acetyl acetonate, etc.; vanadium compounds such as vanadium chloride, vanadium trichloride oxide, vanadium acetyl acetonate, vanadium acetyl acetonate oxide, etc.; molybdenum compounds such as molybdenum chloride, molybdenum acetate, etc.; tungsten compounds such as tungsten chloride, tungsten acetate, tungstic acid, etc.; lanthanoid compounds such as cerium chloride, samarium chloride, ytterbium chloride, etc.; and the like.

Chelating Agents

In some embodiments, the metal-based catalyst used in the preparation of resins of this disclosure further includes a chelating agent. The nature and number of chelating agent(s) employed in the catalyst composition depends on the size and charge of the metal ions in solution. If the metal ions of the catalyst involved in the polymerization differ greatly in size or charge, it can be useful to employ more than one chelating agent.

Any convenient chelating agents can be utilized. Chelating agents of interest include, but are not limited to, citric acid, kojic acid, urea, glycine, glycolic acid, propionic acid, acetic acid, furaneol, maltol, and combinations thereof.

In some embodiments, the chelating agent is biogenic, e.g., a biogenic compound or material produced by plant, fungi or microorganism.

In some embodiments, the chelating agent is selected from kojic acid (5-hydroxy-2-(hydroxymethyl)-4-pyrone), furaneol (4-hydroxy-2,5-dimethyl-3-furanone), maltol (3-hydroxy-2-methyl-4H-pyran-4-one), and maple lactone (3-methylcyclopentane-1,2-dione).

In some embodiments, the catalyst is added to the mixture as a liquid catalyst composition comprising a mixed metal oxide catalyst and a chelating agent dissolved in a solvent, e.g., a glycol solvent such as ethylene glycol or propylene glycol. In some cases, the glycol solvent can itself act as a chelating or complexing agent with the metal ions in the catalyst composition.

In some embodiments, the catalyst composition used in the methods of this disclosure is a metal oxide chelate or mixed metal oxide chelate (e.g., a metal oxide catalyst including a chelating agent). In some embodiments, the catalyst composition used in the methods of this disclosure is a magnesium zirconate chelate. In some embodiments, the chelating agent used in the mixed metal oxide chelate (e.g., magnesium zirconate chelate) is selected from kojic acid (5-hydroxy-2-(hydroxymethyl)-4-pyrone), furaneol (4-hydroxy-2,5-dimethyl-3-furanone), maltol (3-hydroxy-2-methyl-4H-pyran-4-one), and maple lactone (3-methylcyclopentane-1,2-dione).

In some embodiments, the catalyst composition is premixed and activated with dispersed polysaccharide nanocrystals, e.g., dispersed cellulose nanocrystals (e.g., as described herein). In such embodiments, the catalyst composition used in the methods of this disclosure is referred to as a metal oxide nanoparticle chelate or mixed metal oxide nanoparticle chelate, e.g., a magnesium zirconate nanoparticle chelate composition.

Other Catalysts

In some embodiments, the catalyst is not a metal-containing compound.

In certain embodiments, the catalyst is a mineral. In some embodiments, the catalyst includes a mineral of natural origin. In some embodiments, the catalyst is derived from an industrial product or by product. The catalyst can be a clay mineral. In some embodiments, the catalyst is an aluminosilicate mineral. In some embodiments, the catalyst is a magnesium aluminum phyllosilicate clay. In some embodiments, the catalyst is selected from kaolin, kaolinite, zeolite, illite, attapulgite, palygorskite, and bentonite. In some embodiments, Fuller's earth clay material is used as the catalyst, which material can in some cases, be composed of palygorskite (attapulgite) and/or bentonite. In some embodiments, the catalyst is acti-gel 208, a hydrous magnesium aluminosilicate material.

In some embodiments, the catalyst is kaolin. In some embodiments, the catalyst is kaolinite, such as a low moisture content kaolinite. In some embodiments, the catalyst is metakaolinite. in some cases, such catalysts can be thermally activated by calcination, which removes water that is present and increases the acidity of the catalyst material.

Non-limiting examples of catalysts include, but are not limited to, ash, fly ash, calcium carbonate, calcite, a silicate, silica, quartz, an oxide, a metal oxide, an insoluble or substantially insoluble metal salt, iron ore, talc, gypsum, carbonates of magnesium, carbonates of calcium and magnesium, limestone, dolomite, hydroxides of calcium, hydroxides of magnesium, oxides of calcium, oxides of magnesium, hydrogen carbonates of calcium, hydrogen carbonates of magnesium, calcium phosphate, hydroxyapatite, phyllosilicates, and any combination thereof.

In certain embodiments, catalysts such as kaolinite are used during an esterification process to activate and complete the esterification process to produce polymers having a MW suitable for use in resin.

In some embodiments, the catalyst includes compounds containing an organic group, such as carboxylic acid salts, alkoxy salt organic sulfonic acid salts, or ß-diketonate salts each containing such a metal element, etc.; and furthermore, inorganic compounds such as oxides, halides, and the like of the foregoing metals and mixtures thereof.

In some embodiments the catalyst is not a metal-containing catalyst. In some embodiments the catalyst lacks any transition metal compound or salt. In certain embodiments, the method provides for enhanced catalytic activity without a metal catalyst.

In some embodiments, the catalyst is a protic ionic salt. Protic ionic salt containing catalyst of interest include sulfonic acid containing compounds and materials, or a salt thereof. In some embodiments, the catalyst is an organocatalyst comprising a protic ionic salt. In some embodiments, the organocatalyst comprises an organosulfate and/or sulfonate group(s). In some embodiments, a modified cellulose or other polysaccharide can act as a catalyst. Methane sulfonic acid is an organocatalyst that finds use in high temperature polymer degradation and synthesis. In some embodiments, the protic ionic salt catalyst is utilized in conjunction with a non-nucleophilic base, such as triazabicyclodecene (TBD) or 1,8-diazabicyclo[5.4.0]undec-7-ene (DBU).

In some embodiments, the polysaccharide nanocrystals utilized in the reaction mixture are selected to include substituent groups that are capable of acting as a Lewis acid catalyst. For example, nanocellulose crystals (NCC) produced via sulfuric acid treatment can contain sulfate and/or sulfonate groups. In some cases, modified polysaccharide nanocrystals are selected to act as a protic ionic salt catalyst in the reaction mixture.

In some embodiments, the method includes, at the time of polymerization, a compound which is liquid or soluble in an ester low polymer or polyester. In some embodiments, a compound which is liquid or soluble in an ester low polymer or polyester is added because when the catalyst is in a molten or dissolved state at the time of polymerization, the polymerization rate becomes high.

Methods

Aspects of the present disclosure include methods for producing a polyester polymer-polysaccharide nanocomposite resin.

In some embodiments, the method includes preparing a dispersion or suspension comprising polysaccharide nanocrystals, an alkane diol monomer and an alkane diacid agent monomer, after which polymerization is initiated. Polymerization can be initiated, e.g., by addition of a catalyst and/or application of reaction conditions (e.g., temperature, solvent, pressure, etc) sufficient to initiate transesterification.

In some embodiments, the method the dispersion or suspension comprising polysaccharide nanocrystals, an alkane diol monomer and an alkane diacid agent monomer are prepared in situ after initiation of the reaction. Thus, in some cases, the polysaccharide nanocrystals are added to a reaction mixture including the alkane diol monomer and the alkane diacid agent monomer, and e.g., oligomers composed of the same. In some embodiments, the addition of the polysaccharide nanocrystals (e.g., NCCs) in situ can provide for one or more desired properties or characteristics in the resulting composition, such as a desired strength, toughness, processing aid during melt spinning, Cationic dyeable sites, gas/moisture transmission property, nucleating agent, and/or enhanced biodegradability.

In some embodiments, the method further includes polymerizing or polycondensing the alkane diol monomer and the alkane diacid agent monomer in the dispersion to produce a polymer-polysaccharide nanocomposite resin.

In alternative embodiments, the method further includes pelletizing and/or drying the polymer-polysaccharide nanocomposite resin after initial polymerization reaction.

In some embodiments, the method further includes pelletizing the polyester polymer-polysaccharide nanocomposite resin that is produced from polymerization process. In some embodiments, drying pellets of the resin is performed under conditions sufficient to remove moisture from the mixture and increase the molecular weight of polymers in the resin mixture.

In certain embodiments, pelletizing the mixture occurs before compounding (e.g. involving blending, re-melting, and mixing) or melt spinning. In some embodiments, compounding comprises any one of in situ polymerization, melt mixing, and solution mixing.

In some embodiments, pelletizing comprises any conventionally known pelletizing processes. Non-limiting examples include but are not limited to melt pelletizing and strand pelletizing.

Preparation of Reaction Mixture or Dispersion

Aspects of the present methods includes preparing a mixture or dispersion comprising polysaccharide nanocrystals, an alkane diol monomer and an alkane diacid agent monomer.

In some embodiments, preparing the mixture or dispersion includes dispersing polysaccharide nanocrystals in a solution that includes one or both of an alkane diol monomer and an alkane diacid agent monomer.

In some embodiments, dispersing includes contacting polysaccharide nanocrystals in a solution. In some embodiments, the solution includes one or both of the alkane diol monomer and the alkane diacid agent monomer. In some embodiments, the polysaccharide nanocrystals are added in situ. In certain embodiments, adding the polysaccharide nanocrystals in situ is configured to increase the tensile strength and Young's modulus of the nanocomposite resin. In certain embodiments adding the polysaccharide nanocrystals in situ provides for enhanced biodegradability of an article manufactured by the nanocomposite resin. In certain embodiments adding the polysaccharide nanocrystals in situ provides for reduced gas and/or moisture transmission through the article produced by manufacturing the nanocomposite resin. In some embodiments, the polysaccharide nanocrystals are nucleating agents. In certain embodiments, the polysaccharide nanocrystals serve as cationic dyable sites in an article produced by manufacturing the nanocomposite resin. In certain embodiments, the polysaccharide nanocrystals are compatibilizing agents for the melting processing/spinning of the nanocomposites during yarn or fiber fabrication.

In some embodiments, the solution includes the alkane diol monomer and the alkane diacid agent monomer. In some embodiments, the solution consists of the alkane diol monomer and the alkane diacid agent monomer.

In some embodiments, the solution further includes a non-aqueous solvent. In some embodiments, the solution further includes a non-aqueous solvent organic solvent.

In some embodiments, the solution further includes water. In some embodiments, the water is deionized water.

In some embodiments, dispersing the polysaccharide nanocrystals, the alkane diol monomer, and the alkane diacid agent monomer includes contacting the cellulose nanocrystals with a solution that includes the polysaccharide nanocrystals, the alkane diol monomer, and the alkane diacid agent monomer to produce a mixture; and sonicating the mixture to homogeneously disperse the polysaccharide nanocrystals in the solution and produce the dispersion.

For example, the polysaccharide nanocrystals are added to the alkane diol monomer, and/or the alkane diacid agent and dispersed.

In some embodiments, the method includes charging the alkane diol monomer, and/or the alkane diacid agent to a reaction vessel, to form a reactant mixture. In some embodiments, the method includes stirring the reactants with nitrogen gas flow ranging from 100-250 rpm (e.g., 100 rpm or more, 150 rpm or more, 200 rpm or more, or 250 rpm or more) until a homogenous slurry is formed.

In some embodiments, the method further includes contacting the polysaccharide nanocrystals with the homogenous slurry.

A catalyst (e.g., as described herein) may be added to the reaction mixture at any convenient time. In some embodiments, the catalyst solution is prepared as part of the initial reaction mixture. In some embodiments, the catalyst and the polysaccharide nanocrystals are prepared as a separate dispersed solution, and then added to the reaction mixture at any convenient stage.

In some embodiments, the method further includes increasing the temperature of the reaction mixture or slurry. In some embodiments, the temperature is increased to 100° C. or more, 125° C. or more, 150° C. or more, 175° C. or more, 200° C. or more, 225° C. or more, 250° C. or more, or 275° C. or more. In some embodiments, the temperature is increased for about 10 minutes or more, about 20 minutes or more, about 30 minutes or more, about 40 minutes or more, about 50 minutes or more, about 60 minutes or more, about 70 minutes or more, about 80 minutes or more, about 90 minutes or more, about 100 minutes or more, about 110 minutes or more, about 120 minutes or more, about 130 minutes or more, about 140 minutes or more, or about 150 minutes or more.

In some embodiments, when the temperature is increased, water and THF are formed. In some embodiments, the method further includes removing water and THF from the reactor via a distillation apparatus.

The polysaccharide nanocrystals can be dispersed and characterized in a pre-solution or reaction mixture using any convenient methods, such as the methods described by Beck et al. ("Dispersibility in Water of Dried Nanocrystalline Cellulose." Biomacromolecules 2012, 13, 1486-1494).

In some embodiments, the polysaccharide nanocrystals are dispersed in the alkane diol monomer by sonicating the polysaccharide-alkane diol mixture. In some embodiments, dispersing the polysaccharide-alkane diol mixture includes sonicating the mixture, as opposed to other mechanical means such as stirring, to eliminate or substantially eliminate sedimentation. In some embodiments, polysaccharide-alkane diol mixtures with higher dispersion values (smaller polysaccharide nanocrystal particle sizes), relative to larger polysaccharide nanocrystal particle sizes with lower dispersion values, will ultimately yield polysaccharide nanocomposites with more desirable properties, including increased clarity, processability, biodegradability, strength, and toughness. However, other embodiments of the method may include mechanical means of dispersing the polysaccharide nanocrystals; for example, using a homogenizer for high shear dispersion.

In some embodiments, the polysaccharide nanocrystals are dispersed in the alkane diol monomer with a homogenizer.

In some embodiments, the polysaccharide nanocrystals are dispersed prior to esterification. For example, polysaccharide-alkane diol dispersions may be obtained by dispersing the polysaccharide nanocrystals in an alkane diol monomer prior to esterification. Moreover, the dispersion quality may be verified before proceeding further with production, allowing the dispersion to be adjusted until at a desired level. The dispersion quality can be verified by measuring the dispersion quality before the reaction takes place. For example, in production we can take aliquots of the BDO/NCC dispersion and check to make sure it is meeting our requirements. More data is collected on dispersion levels before the reaction (e.g., 50% or more of material has dimensions of <100 nm) to assess how the final polymer properties are affected, which can include NCC gel size in the final polymer.

In some embodiments, the polysaccharide nanocrystals are dispersed in the alkane diacid agent by optionally sonicating the polysaccharide-alkane diacid agent mixture. In some embodiments, dispersing the polysaccharide-alkane diacid agent mixture includes optionally sonicating the mixture, as opposed to other mechanical means such as stirring, to eliminate or substantially eliminate sedimentation. In some embodiments, polysaccharide-alkane diacid agent mixtures with higher dispersion values (smaller polysaccharide nanocrystal particle sizes) will ultimately yield polysaccharide nanocomposites with more desirable properties, including increased clarity, processability, and toughness. However, other embodiments of the method may include mechanical means of dispersing the polysaccharide nanocrystals; for example, using a homogenizer for high shear dispersion.

In some embodiments, the polysaccharide nanocrystals are dispersed in the -alkane diacid agent with a homogenizer.

In some embodiments, the polysaccharide nanocrystals are dispersed in the alkane diacid agent by optionally sonicating the polysaccharide-alkane diacid agent mixture. In some embodiments, dispersing the polysaccharide-alkane diacid agent mixture includes optionally sonicating the mixture, as opposed to other mechanical means such as stirring, to eliminate or substantially eliminate sedimentation. In some embodiments, polysaccharide-alkane diacid agent mixtures with higher dispersion values (smaller polysaccharide nanocrystal particle sizes) will ultimately yield polysaccharide nanocomposites with more desirable properties, including increased clarity, processability, and toughness. However, other embodiments of the method may include mechanical means of dispersing the polysaccharide nanocrystals; for example, using a homogenizer for high shear dispersion.

In certain embodiments, the polysaccharide nanocrystals are not dispersed in the alkane diacid agent by sonicating the polysaccharide-alkane diacid agent mixture.

In some embodiments, the polysaccharide nanocrystals are dispersed in the-alkane diacid agent with a homogenizer.

In some embodiments, the polysaccharide nanocrystals are dispersed using a high shear disperser.

In some embodiment, the method includes contacting the polysaccharide-alkane diol monomer dispersion with the alkane diacid agent monomer. In some embodiments, the polysaccharide-alkane diol monomer mixture is added to the alkane diacid agent monomer as a slurry.

In some embodiments, sonicating the mixture is performed under conditions sufficient to produce a dispersion with no visible sedimentation is present.

In some embodiment, the method includes contacting the polysaccharide-alkane diol monomer dispersion with the alkane diacid agent monomer. In some embodiments, the polysaccharide-alkane diol monomer mixture is added to the alkane diacid agent monomer as a slurry.

In some embodiments, sonicating the mixture is performed under conditions sufficient to produce a dispersion with no visible sedimentation is present.

In some embodiments, the polysaccharide nanocrystals are dispersed in the alkane diol monomer and an alkane diacid agent by sonicating the polysaccharide-alkane diol-alkane diacid agent mixture. In some embodiments, dispersing the polysaccharide-alkane diol-alkane diacid agent mixture includes sonicating the mixture, as opposed to other mechanical means such as stirring, to eliminate or substantially eliminate sedimentation. In some embodiments, polysaccharide-alkane diol-alkane diacid agent mixtures with higher dispersion values (smaller polysaccharide nanocrystal particle sizes) will ultimately yield polysaccharide nanocomposites with more desirable properties, including increased clarity, processability, and toughness. However, other embodiments of the method may include mechanical means of dispersing the polysaccharide nanocrystals; for example, using a homogenizer for high shear dispersion.

In some embodiments, the polysaccharide nanocrystals are dispersed in the alkane diol monomer-alkane diacid agent mixture with a homogenizer.

In some embodiments, the polysaccharide nanocrystals are dispersed prior to esterification. For example, polysaccharide-alkane diol-alkane diacid agent dispersions may be obtained by dispersing the polysaccharide nanocrystals in an alkane diol monomer-alkane diacid agent prior to esterification. Moreover, the dispersion quality may be verified before proceeding further with production, enabling the dispersion to be adjusted until at a desired level.

In some embodiments, sonicating the mixture includes sonicating, for a duration of about 5 minutes or longer. In some embodiments, sonicating the mixture includes sonicating (e.g., with at least 60% of an amplitude of a maximum power of a sonicator), for a duration of about 5 minutes or longer. In some embodiments, sonicating the mixture includes sonicating (e.g., with at least 80% of an amplitude of a maximum power of a sonicator), for a duration of about 5 minutes or longer. In some embodiments, sonicating the mixture includes sonicating (e.g., with at least 100% of an amplitude of a maximum power of a sonicator), for a duration of about 5 minutes or longer.

In some embodiments, sonicating the mixture includes sonicating, for a duration of about 6 minutes or longer, 7 minutes or longer, 8 minutes or longer, 9 minutes or longer, 10 minutes or longer, 11 minutes or longer, 12 minutes or longer, 13 minutes or longer, 14 minutes or longer, or 15 minutes or longer.

Components for Dispersion

In some embodiments, the dispersion includes polysaccharide nanocrystals, and one or more monomers. In some embodiments, the one or more monomers include an alkane diol monomer and an alkane diacid agent monomer.

In some embodiments, the polysaccharide nanocrystals are derived from heparin, chitosan, chitin, hyaluronan, starch, cellulose, alginate, pectin, guar, starch/chitosan, chitosan/heparin, chitosan/hyaluronan, hyaluronan/heparin, or cellulose and chitin whiskers and platelet-like starch. In some embodiments, the polysaccharide nanocrystals are derived from cellulose, starch or chitin. In some embodiments, the polysaccharide nanocrystals are derived from chitosan. In some embodiments, the polysaccharide nanocrystals are derived from chitosan and cellulose. In some embodiments, polysaccharide nanocrystals in the nanocomposite resin derived from chitosan provides for improved properties to an article manufactured from the nanocomposite resin. In some embodiments, the improved properties to an article include one or more of: flame retardant, increased antibacterial properties, and enhanced biodegradability of the article. In some embodiments, the article is yarn or fiber.

In some embodiments, the polysaccharide nanocrystals are derived from cellulose. In some embodiments, the polysaccharide nanocrystals are derived from starch. In some embodiments, the polysaccharide nanocrystals are derived from chitin.

In some embodiments, the polysaccharide nanocrystals can be a sphere, rod, disk, or any other shape. In some embodiment, the nanocrystals can have a narrow size distribution. In some embodiment, the nanocrystals can have a wide size distribution.

In some embodiments, the polysaccharide nanocrystals are derived from cellulose. In some embodiments, the polysaccharide nanocrystals are cellulose nanocrystals.

In some embodiments, the cellulose nanocrystal is a crystal that is derived by subjecting a cellulose fiber to chemical treatment such as acid hydrolysis. In some embodiments, the cellulose nanocrystals are derived from acid hydrolyzed cellulose from cellulosic biomass via an acid hydrolysis technique similar to what was first as first described in Rånby, B. G. (Rånby, B. G. (1951) *Discussion Faraday Society,* 11, 158-164). NCCs produced via sulfuric acid and neutralized with base (NaOH in this instance) will contain an amount of sodium sulfate groups that affect dispersibility in hydrophilic mediums.

In some embodiments, the acid hydrolyzed cellulose is obtained from naturally occurring cellulose fibers. In some embodiments, the acid hydrolyzed cellulose is obtained, for example, plant biomass, vascular plants, cotton plants, wood pulp, jute, hemp, corn, flasks, rice, wheat straw, or sisal. In some embodiments, the cellulose is obtained from plant biomass, which includes, but is not limited to trees, grasses, cotton, sisal, bamboo and ramie.

In some embodiments, cellulose nanocrystals can be found as structural components in tunicates (sea creature similar to sea cucumbers), and are produced naturally by the *Acetobacter xylinum* bacteria.

In some embodiments, the cellulose nanocrystals have average dimensions of about 1 to 80 nm in width and about 25 to 1000 nm in length. In some embodiments, the cellulose nanocrystals have average dimensions ranging from about 1 to 100 nm in width and a length ranging from about 25 to 3000 nm. In some embodiments, the cellulose nanocrystals have average dimensions of about 10 nm or more, 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, 85 nm or more, 90 nm or more, 95 nm or more, or 100 nm or more in width; and 25 nm or more, 50 nm or more, 100 nm or more, 150 nm or more, 200 nm or more, 250 nm or more, 300 nm or more, 350 nm or more, 400 nm or more, 500 nm or more, 550 nm or more, 600 nm or more, 650 nm or more, 700 nm or more, 800 nm or more, 850 nm or more, 900 nm or more, 950 nm or more, 1000 nm or more, 1500 nm or more, 2000 nm or more, 2500 nm or more, or 3000 nm or more, in length.

In some embodiments, the nanocrystals in the dispersion have a particle size distribution ranging from about 1 d·nm to about 400 d·nm. In some embodiments, the nanocrystals in the dispersion have a particle size distribution ranging from about 1 d·nm to about 50 d·nm, about 50 d·nm to about 100 d·nm, about 100 d·nm to about 150 d·nm, about 150 d·nm to about 200 d·nm, 200 d·nm to about 250 d·nm, 250 d·nm to about 300 d·nm, 300 d·nm to about 350 d·nm, 350 d·nm to about 400 d·nm. In some embodiments, the nanocrystals in the dispersion have a particle size distribution ranging from about 1 d·nm to about 20 d·nm. In some embodiments, the nanocrystals in the dispersion have a particle size distribution ranging from about 10 d·nm to about 100 d·nm. In some embodiments, the nanocrystals in the dispersion have a particle size distribution ranging from about 10 d·nm to about 30 d·nm. In some embodiments, the nanocrystals in the dispersion have a particle size distribution ranging from about 100 d·nm to about 200 d·nm. In some embodiments, the nanocrystals in the dispersion have a particle size distribution of 1 d·nm or more, 2 d·nm or more, 4 d·nm or more, 6 d·nm or more, 8 d·nm or more, 10 d·nm or more, 12 d·nm or more, 14 d·nm or more, 16 d·nm or more, 18 d·nm or more, 20 d·nm or more, 22 d·nm or more, 24 d·nm or more, 26 d·nm or more, 28 d·nm or more, 30 d·nm or more, 32 d·nm or more, 34 d·nm or more, 36 d·nm or more, 38 d·nm or more, 40 d·nm or more, 42 d·nm or more, 44 d·nm or more, 46 d·nm or more, 48 d·nm or more, 50 d·nm or more, 52 d·nm or more, 54 d·nm or more, 56 d·nm or more, 58 d·nm or more, 60 d·nm or more, 62 d·nm or more, 64 d·nm or more, 66 d·nm or more, 68 d·nm or more, 70 d·nm or more, 72 d·nm or more, 74 d·nm or more, 76 d·nm or more, 78 d·nm or more, 80 d·nm or more, 82 d·nm or more, 84 d·nm or more, 86 d·nm or more, 88 d·nm or more, 90 d·nm or more, 92 d·nm or more, 94 d·nm or more, 96 d·nm or more, 98 d·nm or more, or 100 d·nm or more. In some embodiments, the nanocrystals in the dispersion have a particle size distribution of 100 d·nm or more, 125 d·nm or more, 150 d·nm or more, 175 d·nm or more, 200 d·nm or more, 225 d·nm or more, 250 d·nm or more, 275 d·nm or more, 300 d·nm or more, 325 d·nm or more, 350 d·nm or more, 400 d·nm or more, 425 d·nm or more, 500 d·nm or more, 525 d·nm or more, 550 d·nm or more, 575 d·nm or more, 600 d·nm or more, 625 d·nm or more, 650 d·nm or more, 675 d·nm or more, 700 d·nm or more, 725 d·nm or more, 750 d·nm or more, 775 d·nm or more, 800 d·nm or more, 825 d·nm or more, 850 d·nm or more, 875 d·nm or more, 900 d·nm or more, 925 d·nm or more, 950 d·nm or more, 975 d·nm or more, or 1000 d·nm or more.

In some embodiments, increasing the length of the cellulose nanocrystals increases load distribution potential throughout the polymer. In some embodiments, as orientation of the cellulose nanocrystals within the polymer increases the interfacial contact between adjacent cellulose nanocrystals in the axial orientation, where ultimate tensile strength can be increased. In some embodiments, in the transverse direction, Cellulose nanocrystal morphology (e.g., length, aspect ratio, length polydispersity) and surface charge vary greatly based on synthesis conditions.

In some embodiments, acid hydrolysis is used to break down cellulose microfibrils by digesting the amorphous regions that connect cellulose nanocrystals. In some embodiments, process typically requires heating, agitation, rinsing, filtration, dialysis, and ultrasonication, with the parameters of each step having a direct impact on cellulose nanocrystal morphology and/or surface chemistry. In some embodiments, the final result of cellulose nanocrystal processing includes a suspension of liquid crystalline cellulose nanocrystals that is produced, forming either a nematic or chiral nematic mesophase (e.g., dependent on cellulose nanocrystal length, aspect ratio, length polydispersity, surface charge, cellulose nanocrystal concentration, and electrolyte concentration).

In some embodiments, the polymer of the polymer-polysaccharide nanocomposite resin includes an aliphatic polyester polymer. In some embodiments, the aliphatic polyester polymer can include, but is not limited to, an aliphatic polyester polymer selected from polylactide (PLA) (e.g., poly(lactic acid)), polyglycolide (PGA) (e.g., Polyglycolic acid), poly(ε-caprolactone) (PCL), poly(γ-valerolactone) (PVL), and a co-polymer poly(lactic-co-glycolic acid) (PLGA).

In some embodiments, the polymer of the polymer-polysaccharide nanocomposite resin includes polybutylene succinate homopolymer or polybutylene succinate copolymer (e.g., polybutylene succinate adipate copolymer).

In some aspects, the dispersion includes an alkane diol monomer.

In some embodiments, the alkane diol monomer includes, but is not limited to, a 1,4-butanediol monomer, a 1,2-ethanediol monomer, a 1,3-propanediol monomer, a 1,5-pentanediol monomer, or a 1,6-hexanediol monomer.

In some embodiments, the alkane diol monomer includes one or more diols to form a polyester composite. Non-limiting examples of other suitable diols include, but are not limited to, ethylene glycol, 1,3-propylene glycol, neopentyl glycol, 1,6-hexamethylene glycol, 1,4-cyclohexanedimethanol, hydroquinone, 1.5-dihydroxynaphthalene, 4,4'-dihydroxydiphenyl, bis(p-hydroxyphenyl)methane, bis(p-hydroxyphenyl)-2.2-propane, and combinations thereof.

In some embodiments, the alkane diol monomer 1,4-butanediol.

In some embodiments, alkane diol monomer is 1,2-ethanediol.

In some embodiments, alkane diol monomer is 1,3-propanediol

In some embodiments, the dispersion includes an alkane diacid agent monomer. In some embodiments, the alkane diacid agent monomer includes, but is not limited to, the alkane diacid agent monomer selected from succinic acid, monoalkyl succinate, dialkyl succinate (e.g., dimethyl succinate or diethyl succinate), succinic anhydride, adipic acid, monoalkyl adipate, dialkyl adipate (e.g., dimethyl adipate or diethyl adipate), and adipic anhydride.

In some embodiments, the alkane diacid agent monomer is selected from oxalic acid, malonic acid, succinic acid, glutaric acid, adipic acid, suberic acid, sebacic acid, cyclohexanedicarboxylic acid, and their cyclic acid anhydride equivalents.

In certain embodiments, the alkane diol monomer is a 1,4-butanediol monomer. In certain embodiments, the alkane diacid agent monomer is a succinic acid agent monomer. In certain embodiments, alkane diacid agent monomer is succinic anhydride.

In some embodiments, the dispersing includes contacting cellulose nanocrystals, the 1,4-butanediol monomer, and the succinic acid agent monomer to produce a cellulose mixture.

In some embodiments, the alkane diacid agent monomer is a succinic acid agent monomer or derivative thereof. In some embodiments, the alkane diacid agent monomer is a succinic acid agent monomer. In some embodiments, the succinic acid agent is succinic anhydride.

In some embodiments, the succinic acid agent monomer includes, but is not limited to, a succinic acid agent selected from succinic acid, monoalkyl succinate, dialkyl succinate (e.g., dimethyl succinate or diethyl succinate), or succinic anhydride.

In some embodiments, the succinate acid agent is a succinate derivative. In some embodiments, the succinate derivative is succinate anhydride. In some embodiments, the succinate anhydride increases the speed of esterification with 1,4 butanediol and also reduces the amount of hazardous THF produced during the esterification step. However, other suitable non-limiting examples of succinate derivatives may include succinic acid or succinate esters.

In some aspects, the dispersion includes one or more additional monomers.

In some embodiments, the one or more additional monomers, include, but are not limited to, co-monomers, epoxy-derivatives, oils, pigments, cross-linkers, and the like.

In some embodiments, the one or more additional monomers includes an additional alkane diol monomer and/or an additional alkane diacid agent monomer.

In some embodiments, an additional alkane diol monomer includes, but is not limited to, alkane diol monomer includes, but is not limited to, a 1,4-butanediol monomer, a 1,2-ethanediol monomer, a 1,3-propanediol monomer, a 1,5-pentanediol monomer, or a 1,6-hexanediol monomer; and/or an additional alkane diacid agent monomer.

In some embodiments, an additional diacid agent monomer includes, but is not limited to, the alkane diacid agent monomer selected from succinic acid, monoalkyl succinate, dialkyl succinate (e.g., dimethyl succinate or diethyl succinate), succinic anhydride, adipic acid, monoalkyl adipate, dialkyl adipate (e.g., dimethyl adipate or diethyl adipate), and adipic anhydride.

In some embodiments, the additional alkane diacid agent monomer includes adipic anhydride. In some embodiments, the additional alkane diacid agent monomer includes fumaric acid, or an ester or anhydride thereof.

In some embodiments, the one or more additional components can include a hydrophobic agent. In some embodiments, the hydrophobic agent is an oil. In some embodiments, the hydrophobic agent is an elastomer material. In some embodiments, the hydrophobic agent is an epoxidized soybean oil or elastomer material. The hydrophobic agent can be utilized as a capping agent at the terminal of a polyester polymer in the composition, e.g., linked via an ether, ester or carbamate linkage.

In some embodiments, the one or more additional components include, but are not limited to agents to provide additional water and oxygen barrier properties may be included. Non-limiting exemplary water and oxygen barrier agents include candelilla wax, beeswax, and other waxes. In some embodiments, such a barrier agent is derived from a renewable source.

In some embodiments, one or more additional monomers include gloss agents that provide an aesthetically pleasing gloss to a finished product. Non-limiting exemplary gloss agents include shea butter and nut oils, such as Brazil nut oil. In some embodiments, a gloss agent is derived from a renewable source.

In some embodiments, the one or more additional monomers include, but are not limited to impact modifiers, antioxidants, antibacterial agents, antifungal agents, antistatic agents, fillers, thermal stabilizers, UV stabilizers, dyes, fillers, crystallizing promoters and coupling agents.

Non-limiting examples of antioxidants include hindered phenol antioxidants, such as p-tert-butyl hydroxytoluene and p-tert-butyl hydroxyanisole, sulfur antioxidants such as distearyl thiodipropionate and dilauryl thiodipropionate, and the like; heat stabilizers include triphenyl phosphite, trilauryl phosphite, tris-nonylphenyl phosphite and the like; UV stabilizers include p-tert-butyl phenyl salicylate, 2-hydroxy-4-methoxybenzophenone, 2-hydroxy-4-methoxy-2'-carboxybenzophenone, 2,4,5-trihydroxybutylophenone and the like; lubricants include calcium stearate, zinc stearate, barium stearate, sodium palmitate and the like; antistatic agents include N,N-bis(hydroxyethyl) alkyl amine, alkyl amine, alkyl allyl sulfonate, alkyl sulfonate and the like; flame retarders include hexabromocyclododecane, tris-(2,3-dichloropropyl) phosphate, pentabromophenyl allyl ether and the like; anti-blocking agents include the combination of inorganic fillers such as silica and oleamide and the like; inorganic fillers or nucleating agents include calcium carbonate, silica, titanium oxide, talc, mica, barium sulfate, alumina, mixture of NaHCO3 and citric acid and the like; crystallizing promoters include polyethylene terephthalate, poly-transcyclohexane dimethanol terephthalate and the like; organic fillers include wood powder, rice hull, waste-paper such as newspaper, starches (including modified materials such as alpha-starch), cellulose and the like.

In some embodiments, a polyether having hydroxyl end groups may be used in combination with the diols disclosed in the present disclosure. As the polyether having hydroxyl end groups, the carbon number has a lower limit of usually 4 or more, preferably 10 or more and an upper limit of usually 1,000 or less, preferably 200 or less, more preferably 100 or less. Non-limiting examples of the polyether having hydroxyl end groups include, but are not limited to diethylene glycol, triethylene glycol, polyethylene glycol, polypropylene glycol, polytetramethylene glycol, poly-1,6-hexamethylene glycol, and the like. Moreover, copolymerized polyether of polyethylene glycol and polypropylene glycol, and the like can be also used.

In some embodiments, the one or more additional monomers includes one or more dicarboxylic acids or anhydrides. Non-limiting examples may include, but are not limited to oxalic acid, malonic acid, succinic acid, glutaric acid, adipic acid, suberic acid, sebacic acid, cyclohexanedicarboxylic acid, and their cyclic acid anhydride equivalents.

In some embodiments, the one or more additional monomers include an epoxidized oil, epoxy derivative or fatty acid. In some embodiments, the epoxidized oil, epoxy derivative or fatty acid are capable of esterification.

In some embodiments, the one or more additional monomers include an epoxidized oil, epoxy derivative or fatty acid. In some embodiments, the epoxidized oil, epoxy derivative or fatty acid are capable of esterification. In some embodiments, the epoxy derivative or epoxidized oil is added at the end of the reaction. In some embodiments, the epoxidized oil or epoxy derivative is added in situ. For example, in some embodiments, the method includes adding the epoxy derivative or epoxidized after re-pressurizing the vessel just before the cool down and discharging of the polymer. In some embodiments, the method includes adding NCCs, epoxy derivative, and/or epoxidized oil can be added up front with the alkane diol monomer and/or alkane diacid agent monomer. For example, in some embodiments, the method includes adding NCCs in the beginning of the reaction in the form of a dispersion. In some embodiments, the method includes adding epoxy derivative or epoxidized oil at the very end of the esterification process right before the catalyst is added and the polycondensation takes place. In some examples, the epoxy derivative or epoxidized oil is allowed to react for 5 minutes before adding the catalyst. The high shear disperser method follows the same process as the sonication method for time and power consumption, but instead uses the equipment described in https://www(dot)mixers(dot)com/products/high-speed-dispersers/.

In some embodiments, the one or more additional monomers is an epoxidized oil. In some embodiments, the one or more additional monomers is an epoxidized derivative. In some embodiments, the epoxidized oil or an epoxy derivative includes, but is not limited to epoxidized linseed oil, as epoxidized linseed oil, lard, beef tallow, fish oil, coffee oil, soybean oil, safflower oil, tung oil, tall oil, calendula, rapeseed oil, peanut oil, sesame oil, grape seed oil, olive oil, jojoba oil, dehydrated castor oil, tallow oil, sunflower oil, cottonseed oil, corn oil, canola oil, orange oil, and mixtures thereof.

In some embodiments, the one or more additional monomers includes a catalyst.

Non-limiting exemplary catalysts include, but are not limited to titanium or zirconium compounds, such as titanium lactate or zirconium butoxide. In general, a compound containing at least one member among metal elements belong to the groups 1 to 14 of the periodic table may be used as the esterification reaction catalyst. Specifically, examples of the metal element include scandium, yttrium, samarium, titanium, zirconium, vanadium, chromium, molybdenum, tungsten, tin, antimony, cerium, germanium, zinc, cobalt, manganese, iron, aluminum, magnesium, calcium, strontium, sodium, potassium, and the like. Of these, scandium, yttrium, titanium, zirconium, vanadium, molybdenum, tungsten, zinc, iron, and germanium are preferable; and titanium, zirconium, tungsten, iron and germanium are especially preferable. Furthermore, in order to reduce the concentration of the polyester terminal which influences thermal stability of the polyester, among the foregoing metals, metal elements belonging to the groups 3 to 6 of the periodic table and exhibiting the Lewis acidity are preferable. Specifically, examples thereof include scandium, titanium, zirconium, vanadium, molybdenum, and tungsten. In particular, from the standpoint of easiness of availability, titanium and zirconium are preferable, and furthermore, from the standpoint of reaction activity, titanium is preferable.

In some embodiments, the catalyst includes compounds containing an organic group, such as carboxylic acid salts, alkoxy salt organic sulfonic acid salts, or β-diketonate salts each containing such a metal element, etc.; and furthermore, inorganic compounds such as oxides, halides, and the like of the foregoing metals and mixtures thereof.

In some embodiments, the method includes, at the time of polymerization, a compound which is liquid or soluble in an ester low polymer or polyester. In some embodiments, a compound which is liquid or soluble in an ester low polymer or polyester is added because when the catalyst is in a molten or dissolved state at the time of polymerization, the polymerization rate becomes high.

In some embodiments, the catalyst is a titanium compound. In some embodiments, the titanium compound is a tetraalkyl titanate and a hydrolyzate thereof. Non-limiting examples include, but are not limited to, tetra-n-propyl titanate, tetraisopropyl titanate, tetra-n-butyl titanate, tetra-t-butyl titanate, tetraphenyl titanate, tetracyclohexyl titanate, tetrabenzyl titanate, and mixed titanates thereof, and hydrolyzates thereof.

In some embodiments, the catalyst includes titanium (oxy)acetyl acetonate, titanium tetraacetyl acetonate, titanium (diisopropoxide)acetyl acetonate, titanium bis(ammonium lactate)dihydroxide, titanium bis(ethyl acetoacetate) diisopropoxide, titanium (triethanolaminate) isopropoxide, polyhydroxytitanium stearate, titanium lactate, titanium triethanolaminate, butyl titanate dimer, or the like. In some embodiments, the method further comprises adding liquid materials obtained by mixing an alcohol, a group 2 metal compound in the long-form m periodic table (Nomenclature of Inorganic Chemistry IUPAC Recommendations 2005) (hereinafter sometimes referred to as "group 2 metal compound in the long-form periodic table"), a phosphoric ester compound, and a titanium compound.

In some embodiments, the catalyst selected from tetra-n-propyl titanate, tetraisopropyl titanate, tetra-n-butyl titanate, titanium (oxy)acetyl acetonate, titanium tetraacetyl acetonate, titanium bis(ammonium lactate)dihydroxide, polyhydroxytitanium stearate, titanium lactate, or butyl titanate dimer; and adding a liquid material obtained by mixing an alcohol, a group 2 metal compound in the long-form periodic table, a phosphoric ester compound, and adding a titanium compound.

In some embodiments, the catalyst is selected from tetra-n-butyl titanate, titanium (oxy)acetyl acetonate, titanium tetraacetyl acetonate, polyhydroxytitanium stearate, titanium lactate, or butyl titanate dimer; and adding a liquid material obtained by mixing an alcohol, a group 2 metal compound in the long-form periodic table, a phosphoric ester compound; and adding a titanium compound.

In some embodiments, the catalyst is selected from tetra-n-butyl titanate, polyhydroxytitanium stearate, titanium (oxy)acetyl acetonate, titanium tetraacetyl acetonate; and adding a liquid material obtained by mixing an alcohol, a group 2 metal compound in the long-form periodic table, a phosphoric ester compound, and adding a titanium compound.

Non-limiting examples of the zirconium compound as a catalyst include, but are not limited to, zirconium tetraacetate, zirconium acetate hydroxide, zirconium tris(butoxy) stearate, zirconyl diacetate, zirconium oxalate, zirconyl oxalate, potassium zirconium oxalate, polyhydroxyzirconium stearate, zirconium ethoxide, zirconium tetra-n-propoxide, zirconium tetraisopropoxide, zirconium tetra-n-butoxide, zirconium tetra-t-butoxide, zirconium tributoxyacetyl acetonate, and mixtures thereof.

In some embodiments, the catalyst is selected from zirconyl diacetate, zirconium tris(butoxy)stearate, zirconium tetraacetate, zirconium acetate hydroxide, ammonium zirconium oxalate, potassium zirconium oxalate, polyhydroxyzirconium stearate, zirconium tetra-n-propoxide, zirconium tetraisopropoxide, zirconium tetra-n-butoxide, and zirconium tetra-t-butoxide are preferable; zirconyl diacetate, zirconium tetraacetate, zirconium acetate hydroxide, zirconium tris(butoxy)stearate, ammonium zirconium oxalate, zirconium tetra-n-propoxide, and zirconium tetra-n-butoxide. In some embodiments, the catalyst is selected from zirconium tris(butoxy)stearate. In some embodiments, a colorless polyester with a high degree of polymerization is easily obtained using zirconium tris(butoxy)stearate.

In some embodiments, the catalyst is a germanium compound. Non-limiting examples of the germanium compound include, but are not limited to, inorganic germanium compounds such as germanium oxide, germanium chloride, etc.; and organic germanium compounds such as a tetraalkoxygermanium, etc. From the standpoints of prices and easiness of availability, germanium oxide, tetraethoxygermanium, tetrabutoxygermanium, and the like are preferable, and germanium oxide is especially preferable.

In some embodiments, the catalyst is an inorganic chloride. Non-limiting examples of inorganic chlorides include, but are not limited to, such as ferric chloride, etc.; inorganic oxides such as triiron tetroxide, etc.; organic iron complexes such as ferrocene, etc.; and the like. In some embodiments, the catalyst is an inorganic oxide.

In some embodiments, the catalyst is a metal-containing compound. Non-limiting examples of metal-containing compounds include, but are not limited to scandium compounds such as scandium carbonate, scandium acetate, scandium chloride, scandium acetyl acetonate, etc.; yttrium compounds such as yttrium carbonate, yttrium chloride, yttrium acetate, yttrium acetyl acetonate, etc.; vanadium compounds such as vanadium chloride, vanadium trichloride oxide, vanadium acetyl acetonate, vanadium acetyl acetonate oxide, etc.; molybdenum compounds such as molybdenum chloride, molybdenum acetate, etc.; tungsten compounds such as tungsten chloride, tungsten acetate, tungstic acid, etc.; lanthanoid compounds such as cerium chloride, samarium chloride, ytterbium chloride, etc.; and the like.

Polymerization

Aspects of the present methods include polymerizing an alkane diol monomer and an alkane diacid agent monomer in the dispersion to produce a polymer-polysaccharide nanocomposite resin. Polymerizing refers collectively to the processes of esterification of monomers, e.g., to a growing oligomer or polymer chain, and polycondensing of oligomers to form polymers of higher MW. The terms polycondensing and condensing are used interchangeably herein. In some embodiments, polycondensing and condensing refer to a process involving the formation of ester bonds between two components of the composition, e.g., two oligomers, a oligomer/polymer with a polysaccharide nanocrystals, or a oligomer/polymer with an additive, such as an epoxidized oil.

In some embodiments, polymerizing includes esterifying the alkane diol monomer and the alkane diacid agent monomer to form a plurality of oligomers. In some embodiments, polymerizing further includes condensing the plurality of oligomers to produce high MW polymers (e.g., as described herein) in the polymer-polysaccharide nanocomposite resin.

In some embodiments, the oligomers have an average MW of 500 Da or more, up to 10,000 Da, such as an average MW of 500 Da to 5000 Da. In some embodiments, the oligomers have an average MW of 1000 to 10,000 Da, such as 5000 to 10,000 Da. In some embodiments, the oligomers have an average MW of less than 3 kDa.

In some embodiments, the high MW polymers have a MW of 10 kDa or more and, in some cases, up to 100 kDa.

In some embodiments, the oligomer has formula (IIa):

(IIa)

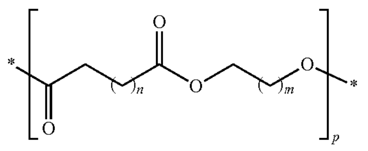

where:

n is 1 to 11;

m is 1 to 11;

p is 1 to 100; and each * independently represents H, OH, a co-polymer segment, a repeat unit, a co-monomer, or a grafted polysaccharide nanoparticle.

In some embodiments of formula (IIa), p is 1 to 50, such as 5 to 50, 10 to 50, 10 to 40, or 20 to 40.

In some embodiments, the oligomer is a PBS or PBF homopolymer. In some embodiments, the oligomer is a PBS or PBF copolymer. In some embodiments, the oligomer is represented by the formula (IIIa):

(IIIa)

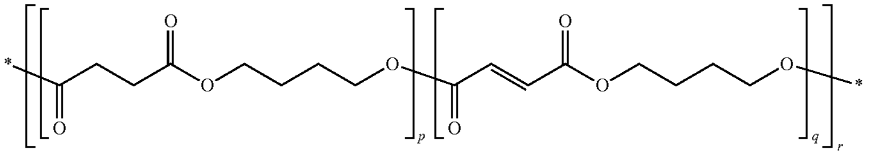

where p is 0 to 50;

q is 0 or 50, where p+q>0; and r is 1 to 50;

each * independently represents H, OH, a co-polymer segment, a repeat unit, a co-monomer, or a grafted polysaccharide nanoparticle. The oligomer can have up to about 50 repeat units in total. In some cases, the oligomer has an average MW of 1000 to 10,000 Da.

In some embodiments of formula (IIIa), (p+q)r is <50. In some embodiments of formula (IIIa), r is 1 to 50, such as 5 to 50, 10 to 50, 10 to 40, or 20 to 40.

In some embodiments, the plurality of oligomers and the high MW polymers each include a butylene succinate repeating unit. In some embodiments, the oligomers and the high MW polymers each include a plurality of butylene succinate repeating units. In some embodiments, the oligomers and the high MW polymers each include blocks or segments of polybutylene succinate.

In some embodiments, the polymer of the polymer-polysaccharide nanocomposite resin is polybutylene succinate homopolymer or polybutylene succinate copolymer (e.g., polybutylene succinate adipate copolymer).

In some embodiments, polymerizing further includes condensing an oligomer or polymer with an epoxidized oil or other epoxidized derivative (e.g., as described herein). In such embodiments, the mixture (e.g., dispersion) includes the epoxidized oil. In some embodiments, the epoxidized oil or other epoxidized derivative (e.g., as described herein) is covalently linked to an oligomer or polymer or via a transesterification process or a coupling process involving an epoxide group of the epoxidized oil or other epoxidized derivative and a compatible functional group of the polymers or polysaccharide nanocrystals. The epoxidized oil or other epoxidized derivative (e.g., as described herein) can include multiple epoxide groups that provide for crosslinking between two or more components of the resulting nanocomposite resin composition, e.g., between two or more oligomers or polymers, or between a polymer and a polysaccharide nanocrystal, or between a polymer and other additive moiety. In some embodiments, the epoxidized oil or other epoxidized derivative (e.g., as described herein) provides for desirable non-covalent interactions with other additives or components of the resin composition.

In some embodiments, the polymerization further includes condensing the nanocomposite resin with an epoxy derivative (e.g., an epoxidized oil or epoxidized fatty acid (ester) or epoxidized triglyceride or other epoxidized derivative that is capable of esterification, e.g., a coupling between an epoxide and a carboxylic acid group). In some embodiments, the epoxidized oil or epoxy derivative (e.g., as described herein) is added to the nanocomposite resin in situ. In some embodiments, the epoxidized oil or epoxy derivative (e.g., as described herein) is added to the reaction mixture before or during polymerization. In some embodiments, the epoxidized oil or epoxy derivative (e.g., as described herein) is added to the reaction mixture before or during esterification of the monomers. In some embodiments, the epoxidized oil or epoxy derivative (e.g., as described herein) is added to the reaction mixture before or during polycondensing of the plurality of oligomers.

In some embodiments, the epoxidized oil or epoxy derivative includes, but is not limited to epoxidized linseed oil, as epoxidized linseed oil, lard, beef tallow, fish oil, coffee oil, soybean oil, safflower oil, tung oil, tall oil, calendula, rapeseed oil, peanut oil, sesame oil, grape seed oil, olive oil, jojoba oil, dehydrated castor oil, tallow oil, sunflower oil, cottonseed oil, corn oil, canola oil, orange oil, and mixtures thereof. In some embodiments, the epoxidized oil is linseed oil. In some embodiments, condensing the nanocomposite resin with an epoxy is configured to improve one or more of hydrolytic stability of the nanocomposite resin, branching for enhanced processability during melt spinning of yarn fabrication increase the strength of the nanocomposite resin (e.g., toughen), reduce the coloration of the nanocomposite resin, and reduce COOH end groups of the nanocomposite resin. In some embodiments, condensing the nanocomposite with an epoxy is configured to improve hydrolytic stability of the nanocomposite resin. In some embodiments, condensing the nanocomposite with an epoxy is configured to provide branching for enhanced processability during melt spinning of the nanocomposite resin during yarn fabrication. In some embodiments, condensing the nanocomposite resin with an epoxy is configured to increase the strength of the nanocomposite resin. In some embodiments, condensing the nanocomposite with an epoxy is configured to reduce the coloration of the nanocomposite resin. In some embodiments, condensing the nanocomposite with an epoxy is configured to reduce COOH end groups of the nanocomposite resin.

The present disclosure includes nanocomposite synthetic precursor compositions that include a mixture of a plurality of oligomers (e.g., as described herein), cellulose nanocrystals, and optionally, one or more reagents or solvents (e.g., as described herein) suitable for polycondensation.

Esterification

Aspects of the present methods include esterifying the alkane diol monomer and the alkane diacid agent monomer to form a plurality of oligomers or polymers.

The terminal groups of the oligomers or polymers of this disclosure can be capped with a variety of groups. In some instances, the capping group can be an epoxidized oil. Esterification of an epoxidized oil or epoxy derivative to the polybutylene succinate nanocomposite can increase its durability, increases the melt viscosity, and reduces the concentration of acid end groups of the polybutylene succinate nanocomposite and thereby facilitates its processability and stabilizes it against thermal and hydrolytic effects. The resulting polybutylene succinate nanocomposite is biodegradable, and largely comprised of ester bonds, with a few ether bonds that are introduced with one of the reactants.

In some embodiments, polycondensing further includes esterifying an epoxidized oil or epoxy derivative (e.g., an epoxidized oil or epoxy derivative as an additional component).

In some embodiments, the one or more additional monomers include an epoxidized oil, epoxy derivative or fatty acid. In some embodiments, the epoxidized oil, epoxy derivative or fatty acid are capable of esterification. In some embodiments, the epoxy derivative or epoxidized oil is added at the very end of the esterification process right before the catalyst is added and the polycondensation takes place. In some examples, the epoxy derivative or epoxidized oil is allowed to react for 5 minutes before adding the catalyst. The high shear disperser method follows the same process as the sonication method for time and power consumption, but instead uses the in equipment described in https://www(dot)mixers(dot)com/products/high-speed-dispersers/.

In some embodiments, the one or more additional monomers is an epoxidized oil. In some embodiments, the one or more additional monomers is an epoxidized derivative. In some embodiments, the epoxidized oil or an epoxy derivative includes, but is not limited to epoxidized linseed oil, as epoxidized linseed oil, lard, beef tallow, fish oil, coffee oil, soybean oil, safflower oil, tung oil, tall oil, calendula, rapeseed oil, peanut oil, sesame oil, grape seed oil, olive oil, jojoba oil, dehydrated castor oil, tallow oil, sunflower oil, cottonseed oil, corn oil, canola oil, orange oil, and mixtures thereof.

In some embodiments, esterification is carried out in a vacuum environment or under inert gas conditions. For example, the esterification reaction may be carried out in a reaction vessel with nitrogen gas. The esterification may be carried out at about ambient pressure or slightly higher with any inert gas. The slurry may be heated at a temperature of about 100° C. or more, about 105° C. or more, about 110° C. or more, about 120° C. or more, about 130° C. or more, about 140° C. or more, or about 150° C. or more, to initiate the reaction.

In some embodiments, the esterification may be carried out in a gas phase.

In some embodiments, esterifying includes heating the dispersion to at an initial temperature of 100° C. to 140° C. (e.g., esterifying is initiated at 110° C.±10° C., 110° C.±5° C., or about 110° C.). In some embodiments, esterifying includes heating the dispersion to an initial temperature of about 100° C. or more, about 105° C. or more, about 110° C. or more, about 120° C. or more, about 130° C. or more, about 140° C. or more, or about 150° C. or more.

In some embodiments, esterifying further includes, after the reaction temperature exceeds 140° C., heating the dispersion to a second temperature of 200° C. to 250° C. (e.g., 225° C.±15° C., or about 225° C.). In some embodiments, esterifying further includes, after the reaction temperature exceeds 140° C., heating the dispersion to a second temperature of 200° C. or more, 225° C. or more, 230° C. or more, 235° C. or more, 240° C. or more, 245° C. or more, or 250° C. or more. In some embodiments, esterifying further includes, after the reaction temperature exceeds 140° C., heating the dispersion to a second temperature of 200° C.±15° C., 215° C.±15° C., 230° C.±15° C., 245° C.±15° C., or 250° C.±15° C.

Catalyst

In some embodiments, polymerizing is performed in the presence of a catalyst. In some embodiments, rate of the reaction (e.g., esterification, and/or polycondensation and/or transesterification) may be further increased by adding of a catalyst. In some embodiments, the method further includes adding a catalyst to the mixture (e.g., dispersion) before or during polymerization. In some embodiments, the catalyst is added during a first step of esterification of the monomers. In some embodiments, the catalyst is added during a second step of polycondensation of the plurality of oligomers, e.g., to facilitate formation of higher MW polymers.

As for the addition amount of the catalyst in the case of using a metal compound as such an esterification catalyst, a lower limit value thereof is generally 0.1 ppm by mass or more, preferably 0.5 ppm by mass or more, and more preferably 1 ppm by mass or more, and an upper limit value thereof is generally not more than 3,000 ppm by mass, preferably not more than 2,000 ppm by mass, more preferably not more than 1,000 ppm by mass, and especially preferably not more than 500 ppm by mass, in terms of a metal amount relative to the formed polyester. Where the amount of the catalyst to be used is too high, such is economically disadvantageous. Additionally, there may be the case where the terminal carboxyl group concentration in the polyester becomes high. Therefore, there is a concern that because of increases in the terminal carboxyl group concentration and the residual catalyst concentration, thermal stability and hydrolysis resistance of the polyester decrease. Conversely, where the amount of the catalyst to be used is too low, the polymerization activity decreases, and following this, thermal decomposition of the polyester is induced during the production of a polyester. As a result, the yield of a polyester showing practically useful physical properties is low.

The timing of the addition of the catalyst to the reaction system is not particularly limited. In some embodiments, the catalyst is added before the esterification reaction step. In some embodiments, the catalyst may be added at the time of charging the raw materials. In some embodiments, the catalyst is added after the esterification reaction step.

Non-limiting exemplary catalysts include, but are not limited to titanium or zirconium compounds, such as titanium lactate or zirconium butoxide. In general, a compound containing at least one member among metal elements belong to the groups 1 to 14 of the periodic table may be used as the esterification reaction catalyst. Specifically, examples of the metal element include scandium, yttrium, samarium, titanium, zirconium, vanadium, chromium, molybdenum, tungsten, tin, antimony, cerium, germanium, zinc, cobalt, manganese, iron, aluminum, magnesium, calcium, strontium, sodium, potassium, and the like. Of these, scandium, yttrium, titanium, zirconium, vanadium, molybdenum, tungsten, zinc, iron, and germanium are preferable; and titanium, zirconium, tungsten, iron and germanium are especially preferable. Furthermore, in order to reduce the concentration of the polyester terminal which influences thermal stability of the polyester, among the foregoing metals, metal elements belonging to the groups 3 to 6 of the periodic table and exhibiting the Lewis acidity are preferable. Specifically, examples thereof include scandium, titanium, zirconium, vanadium, molybdenum, and tungsten. In particular, from the standpoint of easiness of availability, titanium and zirconium are preferable, and furthermore, from the standpoint of reaction activity, titanium is preferable.

In some embodiments, the catalyst includes compounds containing an organic group, such as carboxylic acid salts, alkoxy salt organic sulfonic acid salts, or β-diketonate salts each containing such a metal element, etc.; and furthermore, inorganic compounds such as oxides, halides, and the like of the foregoing metals and mixtures thereof.

In some embodiments, the method includes, at the time of polymerization, a compound which is liquid or soluble in an ester low polymer or polyester. In some embodiments, a compound which is liquid or soluble in an ester low polymer or polyester is added because when the catalyst is in a molten or dissolved state at the time of polymerization, the polymerization rate becomes high.

In some embodiments, esterifying is carried out in the absence of a solvent. In some embodiments, esterifying is carried out in the presence of a solvent. In some embodiments, a small amount of a solvent may be used in order to dissolve the catalyst. Non-limiting examples of this solvent for use in catalyst dissolution include alcohols such as methanol, ethanol, isopropanol, butanol, etc.; the foregoing diols such as ethylene glycol, butanediol, pentanediol, etc.; ethers such as diethyl ether, tetrahydrofuran, etc.; nitriles such as acetonitrile, etc.; hydrocarbon compounds such as heptane, toluene, etc.; water; and mixtures thereof and the like. As for the use amount thereof, the solvent is used in such a manner that the catalyst concentration is generally 0.0001% by mass or more and not more than 99% by mass.

In some embodiments, the catalyst is a titanium compound. In some embodiments, the titanium compound is a tetraalkyl titanate and a hydrolyzate thereof. Non-limiting examples include, but are not limited to, tetra-n-propyl titanate, tetraisopropyl titanate, tetra-n-butyl titanate, tetra-t-butyl titanate, tetraphenyl titanate, tetracyclohexyl titanate, tetrabenzyl titanate, and mixed titanates thereof, and hydrolyzates thereof.

In some embodiments, the catalyst includes titanium (oxy)acetyl acetonate, titanium tetraacetyl acetonate, titanium (diisopropoxide)acetyl acetonate, titanium bis(ammonium lactate)dihydroxide, titanium bis(ethyl acetoacetate) diisopropoxide, titanium (triethanolaminate) isopropoxide, polyhydroxytitanium stearate, titanium lactate, titanium triethanolaminate, butyl titanate dimer, or the like. In some embodiments, the method further comprises adding liquid materials obtained by mixing an alcohol, a group 2 metal compound in the long-form periodic table (Nomenclature of Inorganic Chemistry IUPAC Recommendations 2005) (hereinafter sometimes referred to as "group 2 metal compound in the long-form periodic table"), a phosphoric ester compound, and a titanium compound.

In some embodiments, the method includes adding a catalyst selected from tetra-n-propyl titanate, tetraisopropyl titanate, tetra-n-butyl titanate, titanium (oxy)acetyl acetonate, titanium tetraacetyl acetonate, titanium bis(ammonium lactate)dihydroxide, polyhydroxytitanium stearate, titanium lactate, or butyl titanate dimer; and adding a liquid material obtained by mixing an alcohol, a group 2 metal compound in the long-form periodic table, a phosphoric ester compound, and adding a titanium compound.

In some embodiments, the method includes adding a catalyst selected from tetra-n-butyl titanate, titanium (oxy) acetyl acetonate, titanium tetraacetyl acetonate, polyhydroxytitanium stearate, titanium lactate, or butyl titanate dimer; and adding a liquid material obtained by mixing an alcohol, a group 2 metal compound in the long-form periodic table, a phosphoric ester compound; and adding a titanium compound.

In some embodiments, the method includes adding a catalyst selected from tetra-n-butyl titanate, polyhydroxytitanium stearate, titanium (oxy)acetyl acetonate, titanium tetraacetyl acetonate; and adding a liquid material obtained by mixing an alcohol, a group 2 metal compound in the long-form periodic table, a phosphoric ester compound, and adding a titanium compound.

Non-limiting examples of the zirconium compound as a catalyst include, but are not limited to, zirconium tetraacetate, zirconium acetate hydroxide, zirconium tris(butoxy) stearate, zirconyl diacetate, zirconium oxalate, zirconyl oxalate, potassium zirconium oxalate, polyhydroxyzirconium stearate, zirconium ethoxide, zirconium tetra-n-propoxide, zirconium tetraisopropoxide, zirconium tetra-n-butoxide, zirconium tetra-t-butoxide, zirconium tributoxyacetyl acetonate, and mixtures thereof.

In some embodiments, the catalyst is selected from zirconyl diacetate, zirconium tris(butoxy)stearate, zirconium tetraacetate, zirconium acetate hydroxide, ammonium zirconium oxalate, potassium zirconium oxalate, polyhydroxyzirconium stearate, zirconium tetra-n-propoxide, zirconium tetraisopropoxide, zirconium tetra-n-butoxide, and zirconium tetra-t-butoxide are preferable; zirconyl diacetate, zirconium tetraacetate, zirconium acetate hydroxide, zirconium tris(butoxy)stearate, ammonium zirconium oxalate, zirconium tetra-n-propoxide, and zirconium tetra-n-butoxide. In some embodiments, the catalyst is selected from zirconium tris(butoxy)stearate. In some embodiments, a colorless polyester with a high degree of polymerization is easily obtained using zirconium tris(butoxy)stearate.

In some embodiments, the catalyst is a germanium compound. Non-limiting examples of the germanium compound include, but are not limited to, inorganic germanium compounds such as germanium oxide, germanium chloride, etc.; and organic germanium compounds such as a tetraalkoxygermanium, etc. From the standpoints of prices and easiness of availability, germanium oxide, tetraethoxygermanium, tetrabutoxygermanium, and the like are preferable, and germanium oxide is especially preferable.

In some embodiments, the catalyst is an inorganic chloride. Non-limiting examples of inorganic chlorides include, but are not limited to, such as ferric chloride, etc.; inorganic oxides such as tri-iron tetroxide, etc.; organic iron complexes such as ferrocene, etc.; and the like. In some embodiments, the catalyst is an inorganic oxide.

In some embodiments, the catalyst is a metal-containing compound. Non-limiting examples of metal-containing compounds include, but are not limited to scandium compounds such as scandium carbonate, scandium acetate, scandium chloride, scandium acetyl acetonate, etc.; yttrium compounds such as yttrium carbonate, yttrium chloride, yttrium acetate, yttrium acetyl acetonate, etc.; vanadium compounds such as vanadium chloride, vanadium trichloride oxide, vanadium acetyl acetonate, vanadium acetyl acetonate oxide, etc.; molybdenum compounds such as molybdenum chloride, molybdenum acetate, etc.; tungsten compounds such as tungsten chloride, tungsten acetate, tungstic acid, etc.; lanthanoid compounds such as cerium chloride, samarium chloride, ytterbium chloride, etc.; and the like.

Condensing

Aspects of the present disclosure include esterifying the alkane diol monomer and the alkane diacid agent monomer to form a plurality of oligomers; and condensing the plurality of oligomers to produce high MW polymers in the polymer-polysaccharide nanocomposite resin.

In some embodiments, condensing the plurality of oligomers is performed in a reaction vessel under reduced pressure. In some embodiments, the pressure of the vessel may be decreased during the condensation. In some embodiments, the condensing is performed at a pressure of about 500 mTorr. In some embodiments, the condensing is performed at a pressure of about 400 mTorr. In some embodiments, the condensing is performed at a pressure of about 300 mTorr. In some embodiments, the pressure may decrease from an initial pressure of about 700 Torr (i.e., atmospheric pressure) to a final pressure of about 500 mTorr. In some embodiments, the pressure may decrease from an initial pressure of about 710 Torr (i.e., atmospheric pressure) to a final pressure of about 500 mTorr. In some embodiments, the pressure may decrease from an initial pressure of about 720 Torr (i.e., atmospheric pressure) to a final pressure of about 500 mTorr. In some embodiments, the pressure may decrease from an initial pressure of about 730 Torr (i.e., atmospheric pressure) to a final pressure of about 500 mTorr. In some embodiments, the pressure may decrease from an initial pressure of about 740 Torr (i.e., atmospheric pressure) to a final pressure of about 500 mTorr. In some embodiments, the pressure may decrease from an initial pressure of about 750 Torr (i.e., atmospheric pressure) to a final pressure of about 500 mTorr. In some embodiments, the pressure may decrease from an initial pressure of about 760 Torr (i.e., atmospheric pressure) to a final pressure of about 500 mTorr. In some embodiments, the pressure may decrease from an initial pressure of about 770 Torr (i.e., atmospheric pressure) to a final pressure of about 500 mTorr.

In some embodiments, the method includes pressurizing the reaction vessel at an initial pressure and heating the reaction vessel, followed by decreasing the initial pressure to a lower pressure.

In some embodiments, the pressure may decrease from an initial pressure of about 780 Torr (i.e., atmospheric pressure) to a final pressure of about 500 mTorr. In some embodiments, the pressure may decrease from an initial pressure of about 790 Torr (i.e., atmospheric pressure) to a final pressure of about 500 mTorr. In some embodiments, the pressure may decrease from an initial pressure of about 800 Torr (i.e., atmospheric pressure) to a final pressure of about 500 mTorr.

After esterification, the reaction vessel may be heated to about 225° C. to condensate the plurality of oligomers to produce high MW polymers in the polymer-polysaccharide nanocomposite resin.

In some embodiments, the presence of high MW polymers in the resin composition can be determined via assessment or measurement of the viscosity of the resin, e.g., intrinsic viscosity (dL/g). In some embodiments, the polymer-polysaccharide nanocomposite resin comprises high MW polymers and provides for an intrinsic viscosity of about 0.8 to about 1.5 dL/g about 0.9 to about 1.5 dL/g, as measured at 20° C. using a capillary based, automatic dilution viscometer as descried herein.

In some embodiments, the temperature of the vessel may be gradually increased as the reaction progresses. In some embodiments, the temperature may be increased to about 200° C. or more, 210° C. or more, 220° C. or more, 230° C. or more, 240° C. or more, or 250° C. or more.

In some embodiments, the method includes adding an epoxy derivative or epoxidized oil at the end of the reaction. For example, in some embodiments, the epoxy derivative or epoxidized can be added after re-pressurizing the vessel just before the cool down and discharging of the polymer. In some embodiments, the method includes adding one or more additional components after polymerization of the nanocomposite.

Uses of the Polymer-Polysaccharide Nanocomposite Resin in Making Yarn/Fiber

Aspects of the present disclosure include an article comprising a nanocomposite resin produces by the methods described herein.

In some embodiments, the article is manufactured from the nanocomposite resin using any known methods. Non-limiting examples of manufacturing methods include, but are not limited to injection molding, blow molding, compression molding, extrusion, and melt spinning.

In some embodiments, the article is a molded article molded from the nanocomposite resin of this disclosure.

In some embodiments, the article is yarn or fiber.

In some embodiments, the polysaccharide-polymer nanocomposite resin (e.g., polybutylene succinate nanocomposite) produced by this method may then be formed into an article of manufacture. For example, in some embodiments, the process may include thermoforming, extrusion molding, injection molding or blow molding the composition in melted form.

The nanocomposite resin of this disclosure provides for a variety of desirable properties and finds use in articles where such properties are of great interest. In certain embodiments, adding the polysaccharide nanocrystals in situ is configured to increase the tensile strength and Young's modulus of the nanocomposite resin. In certain embodiments adding the polysaccharide nanocrystals in situ provides for enhanced biodegradability of an article manufactured from the nanocomposite resin. In certain embodiments adding the polysaccharide nanocrystals in situ provides for reduced gas and/or moisture transmission through the article produced from manufacturing the nanocomposite resin. In some embodiments, the polysaccharide nanocrystals are nucleating agents. In certain embodiments, the polysaccharide nanocrystals serve as cationic dyable sites in an article produced from manufacturing the nanocomposite resin. In certain embodiments, the polysaccharide nanocrystals are compatibilizing agents for the melting processing/spinning of the nanocomposites during yarn or fiber fabrication.

In some embodiments, polysaccharide nanocrystals in the nanocomposite resin derived from chitosan provides for improved properties to an article manufactured from the nanocomposite resin. In some embodiments, the improved properties to an article include one or more of: flame retardation, increased antibacterial properties, and enhanced biodegradability of the article. In some embodiments, the article is yarn or fiber.

In some embodiments, injection molding processes include any molding process in which a polymeric melt or a monomeric or oligomeric solution is forced under pressure, for instance with a ram injector or a reciprocating screw, into a mold where it is shaped and cured. Blow molding processes may include any method in which the extrudable polymer composition may be shaped with the use of a fluid and then cured to form a product. Blow molding processes may include extrusion blow molding, injection blow molding, and injection stretch blow molding, as desired. Non-limiting examples of extrusion molding methods include those in which the extrudable polymer composition is extruded from a die under pressure and cured to form the final product, e.g., a film or a fiber.

In some embodiments, single screw or twin screw extruders may be used, the selection of which and the amounts of each component being varied depending on the extruder will be within the skill of one in the art. Other molding methods may include gas foam molding, bead foam molding, T-dye film forming, stretch blow molding, inflation film forming and sheet forming.

In some embodiments, the resulting molded article is a container. The term "container" as used herein includes, but is not limited to, any article, receptacle, or vessel utilized for storing, dispensing, packaging, portioning, or shipping various types of products or objects (including but not limited to, food and beverage products). Non-limiting examples of such containers include, but are not limited to, boxes, cups, "clam shells", jars, bottles, plates, bowls, trays, cartons, cases, crates, cereal boxes, frozen food boxes, milk cartons, carriers for beverage containers, dishes, egg cartons, lids, straws, envelopes, stacks, bags, baggies, or other types of holders. Containment products and other products used in conjunction with containers are also intended to be included within the term "container."

In some embodiments, the molded article is a containment product that is a closure. The term "closure" as used herein, includes but is not limited to, any containment product such as caps, lids, liners, partitions, wrappers, films, cushioning materials, and any other product used in packaging, storing, shipping, portioning, serving, or dispensing an object within a container. Non-limiting examples of closures include, but are not limited to, screw caps, snap on caps, tamper-resistant, tamper-evident and child-resistant closures or caps.

Exemplary Embodiments

As described herein, the text refers to various embodiments of the present compounds, compositions, and methods. The various embodiments described are meant to provide a variety of illustrative examples and should not be construed as descriptions of alternative species. Rather, it should be noted that the descriptions of various embodiments provided herein may be of overlapping scope. The embodiments discussed herein are merely illustrative and are not meant to limit the scope of the present technology.

Notwithstanding the appended claims, aspects of the present disclosure are illustrated by the following clauses.

Clause 1. A method for producing a polymer-polysaccharide nanocomposite resin, the method comprising:
- polymerizing a mixture comprising:
  - an alkane diol monomer;
  - an alkane diacid agent monomer;
  - polysaccharide nanocrystals that are dispersed in the mixture;
  - a catalyst; and
  - one or more optional additives;
- under conditions sufficient to produce a polymer-polysaccharide nanocomposite resin.

Clause 2. The method of clause 1, wherein the catalyst is a Lewis acid catalyst.

Clause 3. The method of clause 2, wherein the catalyst is a metal-based Lewis acid catalyst.

Clause 4. The method of clause 2 or 3, wherein the metal-based Lewis acid catalyst comprises a transition metal catalyst.

Clause 5. The method of clause 4, wherein the transition metal catalyst comprises a metal selected from aluminum, tin, titanium, zirconium, iron, copper, zinc, hafnium and molybdenum.

Clause 6. The method of any one of clauses 3 to 5, wherein the metal-based Lewis acid catalyst comprises an alkali or alkaline earth metal catalyst.

Clause 7. The method of clause 6, wherein the catalyst comprises an alkaline earth metal selected from calcium, magnesium, and strontium.

Clause 8. The method of clause 6 or 7, wherein the metal-based Lewis acid catalyst comprises a transition metal and an alkaline earth metal.

Clause 9. The method of any one of clauses 3 to 8, wherein the metal-based Lewis acid catalyst is a mixed metal oxide catalyst.

Clause 10. The method of any one of clauses 3 to 9, wherein the catalyst comprises one or more components selected from magnesium acetate, zirconium acetate, zirconium butoxide, Na2MoO4, ZnMoO4, and a hafnium salt.

Clause 11. The method of any one of clauses 3 to 10, wherein the catalyst further comprises a chelating agent.

Clause 12. The method of clause 11, wherein the chelating agent is biogenic (e.g., a biogenic compound or material produced by plant, fungi or microorganism).

Clause 13. The method of clause 11 or 12, wherein the chelating agent is selected from kojic acid (5-hydroxy-2-(hydroxymethyl)-4-pyrone), furaneol (4-hydroxy-2,5-dimethyl-3-furanone), maltol (3-Hydroxy-2-methyl-4H-pyran-4-one), and maple lactone (3-Methylcyclopentane-1,2-dione).

Clause 14. The method of any one of clauses 1 to 13, wherein the catalyst is added to the mixture as a liquid catalyst composition comprising a mixed metal oxide catalyst and a chelating agent dissolved in a glycol solvent (e.g., ethylene glycol or propylene glycol solvent).

Clause 15. The method of clause 1 or 2, wherein the catalyst is an aluminosilicate mineral (e.g., magnesium aluminum phyllosilicate clay or acti-gel 208).

Clause 16. The method of clause 15, wherein the catalyst is selected from kaolin, kaolinite, zeolite, illite, attapulgite, palygorskite, and bentonite.

Clause 17. The method of clause 1 or 2, wherein the catalyst is an organocatalyst comprising a protic ionic salt.

Clause 18. The method of clause 1 or 2, wherein the catalyst is non-metallic and comprises sulfonic acid groups or salts thereof.

Clause 19. The method of any one of clauses 1 to 18, wherein the catalyst is added to the reaction mixture as a liquid catalyst composition that further comprises dispersed polysaccharide nanocrystals.

Clause 20. The method of any one of clause 1 to 19, wherein the polymer-polysaccharide nanocomposite resin produced exhibits an intrinsic viscosity of about 0.9 to about 1.5 dL/g (e.g., as measured at 20° C. using a capillary based viscometer).

Clause 21. The method of any one of clause 1 to 19, wherein the polymerizing comprises: esterifying the alkane diol monomer and the alkane diacid agent monomer to produce a plurality of oligomers; and polycondensing the plurality of oligomers in the presence of the polysaccharide nanocrystals to produce high MW polymers in the polymer-polysaccharide nanocomposite resin.

Clause 22. The method of clause 21, wherein the esterifying and polycondensing steps are performed sequentially (e.g., under different temperature and pressure reaction conditions).

Clause 23. The method of clause 21 or 22, wherein the esterifying and condensing steps are performed in the same reaction vessel (e.g., at the same temperature and pressure reaction conditions).

Clause 24. The method of clause 21, wherein the plurality of oligomers have an average MW of less than 3 kDa, and the high MW polymers have an average MW of 10 kDa or more.

Clause 25. The method of any one of clauses 21 to 24, wherein the esterifying comprises heating the mixture to at an initial temperature of 100° C. to 140° C.

Clause 26. The method of clause 25, wherein the esterifying further comprises, after the reaction temperature exceeds 140° C., heating the mixture to a second temperature of 200° C. to 250° C.

Clause 27. The method of any one of clauses 21-26, wherein:

the polycondensing of the plurality of oligomers is performed in a reaction vessel under reduced pressure (e.g., a pressure of about 500 mTorr or less); and/or the polycondensing of the plurality of oligomers is performed at a reaction temperature of 200° C. to 250° C.

Clause 28. The method of clause 21, wherein the esterifying and polycondensing steps are performed in a one pot reaction under a set of reaction conditions sufficient to produce the polymer-polysaccharide nanocomposite resin.

Clause 29. The method of clause 28, wherein a plurality of polycondensed polymers in the resin has an average MW of 10 kDa or more.

Clause 30. The method of any one of clauses 1 to 28, further comprising pelletizing the polymer-polysaccharide nanocomposite resin to produce resin pellets, and optionally drying the pellets (e.g., under conditions sufficient to increase the average MW of the polymers in the polymer-polysaccharide nanocomposite resin).

Clause 31. The method of any one of clauses 1 to 30, wherein the mixture is pre-combined and contains the catalyst when the polymerization reaction is initiated.

Clause 32. The method of any one of clauses 1 to 30, wherein the catalyst is added to the reaction mixture after initiation of polymerization.

Clause 33. The method of clause 32, wherein the catalyst is added to the mixture to catalyze esterification of the monomers.

Clause 34. The method of clause 32, wherein the catalyst is added to the mixture to catalyze the polycondensing of the plurality of oligomers.

Clause 35. The method of any one of clauses 1 to 34, wherein the polymerizing is performed in the presence of an additive that is an epoxidized lipid (e.g., epoxidized oil, epoxidized triglyceride, epoxidized fatty acid ester, or epoxidized terpene).

Clause 36. The method of clause 35, wherein the epoxidized lipid is added to the reaction mixture after initiation of polymerization.

Clause 37. The method of clause 35 or 36, wherein the polymerizing further comprises condensing an oligomer or polymer of the reaction mixture with the epoxidized lipid (e.g., epoxidized oil).

Clause 38. The method of any one of clauses 1 to 37, further comprising condensing the polymer-polysaccharide nanocomposite resin with an epoxidized lipid (e.g., epoxidized oil, epoxidized triglyceride, epoxidized fatty acid ester, or epoxidized terpene).

Clause 39. The method of any one of clauses 35 to 38, wherein the epoxidized lipid is an epoxidized oil.

Clause 40. The method of clause 39, wherein the epoxidized oil is derived from one or fatty acids selected from linolenic acid, oleic acid, linoleic acid, palmitic acid and stearic acid.

Clause 41. The method of clause 39 or 40, wherein the epoxidized oil is epoxidized linseed oil.

Clause 42. The method of any one of clauses 1 to 41, wherein the polysaccharide nanocrystals are derived from cellulose, starch or chitin.

Clause 43. The method of any one of clauses 1 to 42, wherein the polysaccharide nanocrystals are cellulose nanocrystals.

Clause 44. The method of clause 43, wherein the cellulose nanocrystals are derived from acid hydrolyzed cellulose from source wood, cotton, bacteria, or algae.

Clause 45. The method of clause 43 or 44, wherein the cellulose nanocrystals have average dimensions of about 3 to about 50 nm in width and about 100 to about 1000 nm in length.

Clause 46. The method of any one of clauses 1 to 45, wherein the alkane diol monomer is selected from 1,4-butanediol, 1,3-propanediol and 1,2-ethanediol.

Clause 47. The method of clause 46, wherein the alkane diol monomer is 1,4-butanediol.

Clause 48. The method of any one of clauses 1 to 47, wherein the alkane diacid agent monomer is selected from succinic acid, monoalkyl succinate, dialkyl succinate (e.g., dimethyl succinate or diethyl succinate), succinic anhydride, adipic acid, monoalkyl adipate, dialkyl adipate (e.g., dimethyl adipate or diethyl adipate), and adipic anhydride.

Clause 49. The method of clause 48, wherein the alkane diacid agent monomer is succinic anhydride.

Clause 50. The method of any one of clauses 1 to 49, wherein the method is for producing a polybutylene succinate-cellulose nanocomposite resin, comprising:

preparing a mixture comprising dispersed cellulose nanocrystals, 1,4-butanediol monomer, succinic acid agent monomer, a metal oxide catalyst, a chelating agent and optional additive;

polymerizing the 1,4-butanediol monomer and the succinic acid agent monomer in the dispersion mixture to produce a polybutylene succinate-cellulose nanocomposite resin.

Clause 51. The method of any one of clauses 1 to 49, wherein preparing the mixture comprises combining:

a cellulose nanocrystal-catalyst dispersion solution comprising the cellulose nanocrystals dispersed in a solution of the metal oxide catalyst and chelating agent; and a monomer mixture of 1,4-butanediol monomer, succinic acid agent monomer, and optional additive.

Clause 52. The method of clause 50, wherein the cellulose nanocrystals are derived from acid hydrolyzed cellulose from source from source wood, cotton, bacteria, or algae.

Clause 53. The method of any one of clauses 51 to 52, wherein the cellulose nanocrystals have average dimensions of about 3 to 50 nm in width and about 100 to 1000 nm in length.

Clause 54. The method of any one of clauses 51 to 53, wherein the succinic acid agent monomer is selected from succinic acid, monoalkyl succinate, dialkyl succinate (e.g., dimethyl succinate or diethyl succinate), and succinic anhydride.

Clause 55. The method of clause 54, wherein the alkane diacid agent monomer is succinic anhydride.

Clause 56. The method of any one of clauses 1 to 55, wherein the mixture (e.g., dispersion) further comprises one or more additional monomers, and/or an epoxidized lipid.

Clause 57. The method of clause 55, wherein the plurality of oligomers and the high MW polymers each comprise a butylene succinate repeating unit.

Clause 58. The method of any one of clauses 1 to 57, wherein the polymer of the polymer-polysaccharide nanocomposite resin is polybutylene succinate homopolymer or polybutylene succinate copolymer.

Clause 59. The method of any one of clauses 1 to 58, wherein the preparing the mixture (e.g., dispersion) comprises dispersing cellulose nanocrystals in a monomer solution (e.g., homogeneous solution) comprising one or both of the alkane diol monomer and the alkane diacid agent monomer.

Clause 60. The method of clause 59, wherein the monomer solution consists of the alkane diol monomer and the alkane diacid agent monomer in a solvent.

Clause 61. The method of clause 59 or 60, wherein the monomer solution further comprises the catalyst.

Clause 62. The method of any one of clauses 59 to 61, wherein the monomer solution further comprises a non-aqueous organic solvent.

Clause 63. The method of any one of clauses 59 to 61, wherein the monomer solution further comprises water.

Clause 64. The method of any one of clauses 59 to 63, wherein the dispersing comprises:

contacting cellulose nanocrystals with a solution comprising 1,4-butanediol (BDO) and succinic anhydride to produce a cellulose mixture; and sonicating the cellulose mixture to homogeneously disperse the cellulose nanocrystals in the solution and produce the dispersion.

Clause 65. The method of clause 64, wherein the sonicating of the cellulose mixture is performed under conditions sufficient to produce a dispersion with no visible sedimentation is present.

Clause 66. The method of clause 64 or 65, wherein the sonicating of the cellulose mixture comprises sonicating for a duration of about 5 minutes or greater.

Clause 67. The method of any one of clauses 1 to 66, wherein the polysaccharide nanocrystals are derived from chitin.

Clause 68. The method of any one of clauses 1 to 18, further comprising preparing a dispersion of the polysaccharide nanocrystals in a pre-mixture solution.

Clause 69. The method of clause 68, wherein the pre-mixture solution comprises no catalyst.

Clause 70. The method of clause 68, wherein the pre-mixture solution further comprises the catalyst.

Clause 71. The method of clause 70, wherein the polysaccharide nanocrystals and the catalyst are heated in the pre-mixture solution prior to addition to the reaction mixture.

Clause 72. The method of clause 71, wherein the catalyst comprises a transition metal oxide catalyst.

Clause 73. The method of clause 71 or 72, wherein the catalyst is a mixed metal oxide catalyst.

Clause 74. The method of any one of clauses 68 to 73, wherein the dispersed polysaccharide nanocrystals are cellulose nanocrystals.

Clause 75. The method of any one of clauses 68 to 74, wherein the pre-mixture solution is added to the reaction mixture after initiation of polymerization.

Clause 76. The method of clause 75, wherein the pre-mixture solution is added prior to polycondensing of oligomers in the reaction mixture.

Clause 77. The method of any one of clauses 68 to 76, wherein the polymerizing is performed in the presence of an epoxidized oil additive (e.g., ELO or ESO).

Clause 78. The method of clause 77, wherein the epoxidized oil is added to the reaction mixture after initiation of polymerization, and prior to polycondensing of oligomers in the reaction mixture.

Clause 79. The method of clause 77, wherein the epoxidized oil is added to the reaction mixture prior to initiation of polymerization.

Clause 80. A nanocomposite resin produced according to any one of clauses 1-79.

Clause 81. The nanocomposite resin of clause 80, wherein the resin exhibits an intrinsic viscosity of about 0.9 to about 1.5 dL/g (e.g., as measured at 20° C. using a capillary based viscometer).

Clause 82. An article comprising nanocomposite resin of clause 80 or 81.

Clause 83. The article of clause 82, wherein the article is manufactured from the nanocomposite resin using a method selected from injection molding, blow molding, compression molding, extrusion, and melt spinning.

Clause 84. The article of clause 82 or 83, wherein the article is a molded article.

Clause 85. The article of clause 82 or 83, wherein the article is yarn or fiber.

EXAMPLES

The following examples are offered to illustrate the present disclosure and are not to be construed in any way as limiting the scope of the present technology. Any methods that are functionally equivalent are within the scope of the present technology. Various modifications of the present technology in addition to those described herein will become apparent to those skilled in the art from the foregoing description and accompanying figures. Such modifications fall within the scope of the appended claims.

General Assessment Methods

The nanocomposite resins of this disclosure and articles (e.g., fibers) produced from same can assessed via a variety of methods.

Intrinsic Viscosity

Intrinsic viscosity measurements can be conducted according to ASTM D445 and D2515 testing methods, or the methods described by Maron and Reznik ("A new method for determination of intrinsic viscosity." Journal of Polymer Science Part A-2: Polymer Physics, Volume 7, Issue 2, February 1969, Pages 309-32. For example, by using a capillary based, automatic dilution viscometer, under following conditions: Capillary constant=0.003 $mm^2/s^2$, temperature=20° C., solvent=chloroform, and at five concentration levels.

Viscosity/Rheology

Polymeric materials exhibit viscoelastic behavior which is directly related to molecular structure and formulation differences. To accurately evaluate the molecular structure and viscoelastic behavior experiments, such as rheological measurements, can be conducted in regions where the viscoelastic properties observed are independent of imposed stress or strain levels, e.g., in the linear viscoelastic region. Assessments can be performed using a parallel plate rheometer according to the methods of Cox W P, Merz E H (1958) Correlation of dynamic and steady-flow viscosities. *J Polym Sci* 28:619-622. Exemplary conditions: 25 mm plates, 1 mm gap, load polymer resin as pellets. Under nitrogen (4-5 L/min) Experiments: temperature sweep (140-200° C.), strain amplitude sweep (1-10%), frequency sweep (1-500/s), time temperature superposition, Cox-Merz rule.

Tensile Strength Testing of PBS Nanocomposites

Tensile strength testing can be carried out according to ASTM D882-18: Standard Test Method for Tensile Properties of Thin Plastic Sheeting. Briefly, the materials are subject to a 20,000 lbs hot press at 145° C. for 15 minutes. Sheet thickness is controlled by spacers to about 1 mm. The samples are then cut into 50 mm×10 mm strips and a gauge length of about 30 mm is used for testing. The samples are kept at 20° C. with a moisture content of about 65% for either 24 or 72 hours. The samples are placed in the mechanical grips of an Instron and subjected to a crosshead speed of 6 mm/min. Sample thickness is measured as the average thickness at five different points along the gauge length.

Example 1: Pure PBS Made From Succinic Acid+Butanediol 113.55 g of 1,4 butanediol (BDO) and 141.71 g of succinic acid (SA) are charged to a 1 L glass reaction vessel. The reactants are stirred at 150 rpm with $N_2$ flow until a homogeneous slurry is formed. The temperature is then ramped to 225° C. over the course of about 100 minutes and the reaction mixture is stirred continually. During this ramp, water and THF are formed and removed from the reactor via a distillation apparatus. When the reaction reaches 225° C. 600 uL of catalyst is added (zirconium butoxide (ZBO) 80% wt. in 1-butanol, 470 ppm [Zr] in total) and the pressure inside the vessel is reduced gradually over the course of about an hour and a half to a final pressure of about 500 mTorr. The temperature is increased to 230° C. and the polycondensation reaction proceeds for 3 hours after this point. The vessel is re-pressurized and cooled down to 110° C. before removing the polymer. The reaction takes about 6 hours in total and produces a beige, semi-crystalline polymer.

Example 2: PBS With 0.1% wt. Nano Crystalline Cellulose (SA+BDO Method)

112.26 g of 1,4 butanediol (BDO) and 140.09 g of succinic acid (SA) are charged to a 1 L glass reaction vessel. The reaction is stirred at 150 rpm with $N_2$ flow until a homogeneous slurry is formed. 5.4 mL of a 4.8% wt. Nano Crystalline Cellulose (NCC) dispersion in DI water is added to the slurry to reach a total NCC concentration of ~0.1% wt. The temperature is then ramped to 225° C. over the course of about 2 hours and the reaction mixture is stirred continually. During this ramp, water and THF are formed and removed from the reactor via a distillation apparatus. When the reaction reaches 225° C. an amount of catalyst is added (zirconium butoxide (ZBO) 80% wt. in 1-butanol, 470 ppm [Zr] in total) and the pressure inside the vessel is reduced gradually over the course of about 2 hours to a final pressure of about 500 mTorr. The temperature is increased to 230° C. and the polycondensation reaction proceeds for 1 hour after this point. The vessel is re-pressurized and cooled down to 110° C. before removing the polymer. The reaction takes about 5 hours in total and produces a beige, semi-crystalline polymer.

Example 3: PBS With 0.4% wt. ELO (SA+BDO Method)

113.55 g of 1,4 butanediol (BDO) and 141.71 g of succinic acid (SA) are charged to a 1 L glass reaction vessel. The reactants are stirred at 150 rpm with $N_2$ flow until a homogeneous slurry is formed. The temperature is then ramped to 225° C. over the course of about 2 hours and the reaction mixture is stirred continually. During this ramp, water and THF are formed and removed from the reactor via a distillation apparatus. When the reaction reaches 225° C. 600 uL of catalyst is added (zirconium butoxide (ZBO) 80% wt. in 1-butanol, 470 ppm [Zr] in total) and the pressure inside the vessel is reduced gradually over the course of about an hour and a half to a final pressure of about 500 mTorr. The temperature is increased to 230° C. and the polycondensation reaction proceeds for 2 hours after this point. The vessel is re-pressurized and 1.03 g epoxidized linseed oil (ELO) is added to the melt and reacted for 15 minutes. The vessel is then cooled down to 110° C. before removing the polymer. The reaction takes about 7 hours in total and produces a beige, semi-crystalline polymer.

Example 4: PBS With 0.1% wt. NCC+0.4% wt. ELO (SA+BDO Method)

97.79 g of 1,4 butanediol (BDO) and 122.05 g of succinic acid (SA) are charged to a 1 L glass reaction vessel. The reactants are stirred at 150 rpm with $N_2$ flow until a homogeneous slurry is formed. 4.7 mL of a 4.8% wt. NCC dispersion in DI water is added to the slurry to reach a total NCC concentration of ~0.1% wt. The temperature is then ramped to 225° C. over the course of about 2 hours and the reaction mixture is stirred continually. During this ramp, water and THF are formed and removed from the reactor via a distillation apparatus. When the reaction reaches 225° C. 600 uL of catalyst is added (zirconium butoxide (ZBO) 80% wt. in 1-butanol, 470 ppm [Zr] in total) and the pressure inside the vessel is reduced gradually over the course of about an hour to a final pressure of about 500 mTorr. The temperature is increased to 230° C. and the polycondensation reaction proceeds for 1 hour after this point. The vessel is re-pressurized and 0.89 g ELO is added to the melt and reacted for 15 minutes. The vessel is then cooled down to 110° C. before removing the polymer. The reaction takes about 4.5 hours in total and produces a beige, semi-crystalline polymer.

Example 5: PBS With 1% wt. NCC (SA+BDO Method)

97.79 g of 1,4 butanediol (BDO) and 122.05 g of succinic acid (SA) are charged to a 1 L glass reaction vessel. The reaction is stirred at 150 rpm with $N_2$ flow until a homogeneous slurry is formed. 46.64 mL of a 4.8% wt. NCC dispersion in DI water is added to the slurry to reach a total NCC concentration of ~1% wt. The temperature is then ramped to 225° C. over the course of about 2 hours and the reaction mixture is stirred continually. During this ramp, water and THF are formed and removed from the reactor via a distillation apparatus. The reaction is a dark brown color. When the reaction reaches 225° C. an amount of catalyst is added (zirconium butoxide (ZBO) 80% wt. in 1-butanol, 470 ppm [Zr] in total) and the pressure inside the vessel is reduced gradually over the course of about 2 hours to a final pressure of about 500 mTorr. The temperature is increased to 230° C. and the polycondensation reaction proceeds for about 15 minutes after this point and is stopped prematurely due to the high viscosity of the polymer. The vessel is re-pressurized and cooled down to 110° C. before removing the polymer. The reaction takes about 4.5 hours in total and produces a dark brown, brittle polymer.

Example 6: PBS With 0.1% wt. NCC+0.4% wt. ELO Succinic Anhydride+BDO 115.35 g of BDO and 128.09 g of succinic anhydride (SAn) are charged to a 1 L reaction vessel. The reaction is stirred at 150 rpm with $N_2$ flow until a homogeneous slurry is formed. 23.95 g of a 1% wt. dispersion of BDO and NCCs is added to the reaction vessel and the reaction temperature is ramped to 110° C. over the course of 30 minutes. When the reaction reaches 110° C., an endotherm occurs and is measured through a thermocouple probe. Very soon after a large exotherm occurs and propels the temperature up to about 135° C. The temperature is then ramped to 225° C. over the course of 1 hour. During this ramp, water is formed and removed from the reactor. When the reaction reaches 225° C. 575 uL of catalyst is added (zirconium butoxide (ZBO) 80% wt. in 1-butanol, 470 ppm [Zr] in total) and the pressure inside the vessel is reduced gradually over the course of about an hour to a final pressure of about 500 mTorr. The temperature is then increased to 230° C. The reaction proceeds for 1 hour after this point, but it may also be stopped. The vessel is re-pressurized and 1 g of ELO is added to the mixture and reacted for about 15 mins. The reaction takes about 3.5 hrs and produces a material that is exceptionally tough and has a high melt viscosity, which aides in processing.

Example 7: PBS With 0.1% wt. NCC+0.4% wt. ELO Succinic Anhydride+BDO 491.31 g of BDO and 513.36 of succinic anhydride (SAn) are charged to a 2 L reaction vessel. The reaction is stirred at 190 rpm with $N_2$ flow until a homogeneous slurry is formed. 114.11 g of a 1% wt. dispersion of BDO and NCCs is added to the reaction vessel and the reaction temperature is ramped to 225° C. over the course of 110 minutes. When the reaction reaches 130° C., a mild endotherm occurs and is measured through a thermocouple probe. Very soon after an exotherm occurs and propels the temperature up to about 155° C. where it stabilizes and continues increasing to 225° C. During this ramp, water is formed and removed from the reactor. When the reaction reaches 225° C. 2.45 g of catalyst is added (zirconium butoxide (ZBO) 80% wt. in 1-butanol, 470 ppm [Zr] in total) and the pressure inside the vessel is reduced gradually over the course of about an hour to a final pressure of about 500 mTorr. The temperature is then increased to 230° C. The reaction proceeds for 30 minutes after this point and the stirring speed is sequentially slowed down to 50 rpm as the viscosity of the melt increases. The vessel is re-pressurized and 4 g of ELO is added to the mixture and reacted for about 15 mins. Then 0.6 g of a 50% wt. phytic acid solution in DI water is added as a heat stabilizer and decolorizer. The reaction takes about 4 hrs and produces a material that is exceptionally tough and has a high melt viscosity, which aides in processing.

Example 8 (A): PBS benchmark

Example 9 (B): PBS epoxide capped

Example 10 (C): PBS NCC extended

Example 11 (D): PBS NCC extended, epoxide capped

Example 12 (E): PBS NCC extended 10×, epoxide capped

Example 13 (F): PBS via SAn NCC extended, epoxide capped

Example 14 (G): PBS NCC+epoxide extended, sonication method

Example 15 (H): PBS NCC+epoxide extended, high shear disperser method

As shown above, the term "capped" is defined herein as the reactant (ELO in this case) being added at the end of the reaction. In examples 9, 11, 12, and 13 this means that ELO was added after re-pressurizing the vessel just before the cool down and discharging of the polymer. The term "Extended" is defined as the reactant (NCCs, ELO) being added up front with the BDO and SA or SAn. In examples 11, 12, and 13 the NCCs is added in the beginning of the reaction in the form of a dispersion. In examples 14 and 15 ELO is added at the very end of the esterification process right before the catalyst is added and the polycondensation takes place. In these examples the ELO is allowed to react for 5 minutes before adding the catalyst.

The high shear disperser method follows the same process as the sonication method for time and power consumption, but instead uses the equipment described in https://www(dot)mixers(dot)com/products/high-speed-dispersers/.

Sonication of Cellulose-BDO Mixture

Cellulose-BDO mixtures are prepared by either: i) preparing a 1% wt. solution of NCCs in 1,4 butanediol by combining about 20 g of reactants into a 40 mL scintillation vial, or ii) adding about 20 g of a 4.8% wt. dispersion of NCCs in DI water (provided by CelluForce) into a 40 mL scintillation vial. Using a Qsonica Q55 Ultrasonic Homogenizer (available from Qsonica LLC) with a stainless steel probe tip (55 W), the cellulose-BDO mixture is pulse sonicated at 60% amplitude for a total of 5 minutes. The fully cellulose-BDO dispersion is added to the slurry under mixing and $N_2$.

Tensile Strength Testing of PBS Nanocomposites

Tensile strength testing for PBS nanocomposites is carried out according to ASTM D882-18: Standard Test Method for Tensile Properties of Thin Plastic Sheeting. Briefly, the materials are subject to a 20,000 lbs hot press at 145° C. for 15 minutes. Sheet thickness is controlled by spacers to about 1 mm. The samples are then cut into 50 mm×10 mm strips and a gauge length of about 30 mm is used for testing. The samples are kept at 20° C. with a moisture content of about 65% for either 24 or 72 hours. The samples are placed in the mechanical grips of an Instron and subjected to a crosshead speed of 6 mm/min. Sample thickness is measured as the average thickness at five different points along the gauge length.

Table 1 lists the tensile strengths of Examples 4-6 based on samples kept in 20° C. at a moisture content of 65%. Table 2 lists the tensile strengths of Examples 8-13 at 50 mm/min strain rate based on samples kept in 20° C. at a moisture content of 65% for 24 hours, and Table 3 lists the tensile strengths based on samples kept in for 72 hours. Table 4 lists the tensile strengths for Examples 11-13 at 6 mm/min strain rate and 24 hour conditioning, and Table 5 lists the tensile strengths based on 72 hour conditioning. Table 6 lists the tensile strength for a polymer fiber comprised of the PBS formed in Example 13 at 150 mm/min strain rate and 24 hour conditioning, and Table 7 lists the tensile strength at 55 mm/min strain rate with 24 hour conditioning.

TABLE 1

Tensile Strengths for Examples 4-6

| Example Conditioning Time | | Thickness Mm | Strain at Break % | Stress at Break MPa | Strain at Yield % | Stress at Yield MPa | Modulus MPa |
|---|---|---|---|---|---|---|---|
| Example 4 24 hours | Average | 0.62 | 15.16 | 30.07 | / | / | 349.20 |
| | Median | 0.63 | 15.17 | 30.28 | / | / | 344.10 |
| | Std Dev | 0.05 | 1.49 | 1.97 | / | / | 20.20 |
| Example 4 72 hours | Average | 0.57 | 14.75 | 32.33 | / | / | 384.64 |
| | Median | 0.56 | 14.80 | 32.70 | / | / | 374.50 |
| | Std Dev | 0.07 | 1.44 | 1.95 | / | / | 22.13 |
| Example 5 24 hours | Average | 0.66 | 14.84 | 29.83 | / | / | 351.30 |
| | Median | 0.66 | 14.93 | 29.76 | / | / | 344.60 |
| | Std Dev | 0.04 | 1.21 | 1.94 | / | / | 20.20 |
| Example 5 72 hours | Average | 0.68 | 9.55 | 26.39 | / | / | 375.63 |
| | Median | 0.68 | 9.25 | 26.84 | / | / | 375.80 |
| | Std Dev | 0.03 | 1.30 | 2.86 | / | / | 37.08 |
| Example 6 24 hours | Average | 0.53 | 81.45 | 33.32 | 25.57 | 35.30 | 307.80 |
| | Median | 0.52 | 89.60 | 33.20 | 26.88 | 35.56 | 289.40 |
| | Std Dev | 0.06 | 25.73 | 1.24 | 4.25 | 1.79 | 36.13 |
| Example 6 72 hours | Average | 0.49 | 49.45 | 27.82 | 26.26 | 32.54 | 337.45 |
| | Median | 0.48 | 63.27 | 27.68 | 26.18 | 33.19 | 348.70 |
| | Std Dev | 0.07 | 23.41 | 4.63 | 2.58 | 4.62 | 26.31 |

TABLE 2

Tensile strength for Examples 8-13 at 50 mm/min strain rate and 24 hour conditioning

| Sample | E (GPa) | $\sigma_y$ (MPa) | $\sigma_u$ (MPa) | $\epsilon_u$ (%) |
|---|---|---|---|---|
| 8 | 0.29 | 34 | 29 | 21 |
| 9 | 0.3 | 29 | 27 | 63 |
| 10 | 0.34 | 36 | 26 | 76 |
| 11 | 0.28 | 26 | 23 | 47 |
| 12 | 0.39 | N/A | 31 | 14 |
| 13 | 0.3 | 31 | 27 | 37 |

TABLE 3

Tensile strength for Examples 8-13 at 50 mm/min strain rate and 72 hour conditioning

| Sample | E (GPa) | $\sigma_y$ (MPa) | $\sigma_u$ (MPa) | $\epsilon_u$ (%) |
|---|---|---|---|---|
| 8 | 0.42 | N/A | 33 | 18 |
| 9 | 0.34 | N/A | 29 | 17 |
| 10 | 0.4 | 35 | 32 | 25 |
| 11 | 0.34 | 26 | 24 | 27 |
| 12 | 0.36 | N/A | 28 | 14 |
| 13 | 0.37 | 30 | 27 | 42 |

TABLE 4

Tensile strength for Examples 11-13 at 6 mm/min strain rate and 24 hour conditioning

| Sample | E (GPa) | $\sigma_y$ (MPa) | $\sigma_u$ (MPa) | $\epsilon_u$ (%) |
|---|---|---|---|---|
| 11 | 0.35 | N/A | 30 | 15 |
| 12 | 0.35 | N/A | 30 | 15 |
| 13 | 0.31 | 35 | 33 | 81 |

TABLE 5

Tensile strength for Examples 11-13 at 6 mm/min strain rate and 72 hour conditioning

| Sample | E (GPa) | $\sigma_y$ (MPa) | $\sigma_u$ (MPa) | $\epsilon_u$ (%) |
|---|---|---|---|---|
| 11 | 0.38 | N/A | 32 | 15 |
| 12 | 0.38 | N/A | 26 | 10 |
| 13 | 0.34 | 33 | 28 | 49 |

TABLE 6

Tensile strength for Example 13 (fiber) at 150 mm/min strain rate and 24 hour conditioning

| Sample | E (GPa) | $\sigma_u$ (MPa) | $\epsilon_u$ (%) |
|---|---|---|---|
| 13 | 0.9 | 48 | 473 |

TABLE 7

Tensile strength for Example 13 (fiber) at 55 mm/min strain rate and 24 hour conditioning

| Sample | E (GPa) | $\sigma_y$ (MPa) | $\sigma_u$ (MPa) | $\epsilon_u$ (%) |
|---|---|---|---|---|
| 13 | 0.48 | 33 | 64 | 179 |

The tensile strength data illustrate that the PBS nanocomposites synthesized using the methods disclosed herein are comparable to the benchmark PBS synthesized using traditional means known in the prior art. In some instances, the PBS nanocomposites exhibit improved properties over the benchmark PBS.

Intrinsic Viscosity Testing of PBS Nanocomposites

Intrinsic viscosity tests were conducted according to ASTM D445 and D2515 testing methods. Briefly, 4 g of material are dissolved in 100 mL of chloroform within a volumetric flask for two days. The polymer solution is then filtered with a glass-core funnel and diluted to different concentrations before being placed into a CANNON-FENSKE Viscometer (available from Cannon Instrument Company at State College, PA). The entire viscometer is kept in a water bath at about 25° C. for 10 minutes before each measurement. Each polymer solution is loaded into the device and the time it takes the solution to pass between the two red lines is measured. The intrinsic viscosity is calculated as the intersection between plots of the relative and specific viscosities at zero point concentration.

Table 8 lists the viscosity values for Examples 1-6, and Table 9 lists the viscosity values for Examples 8-15. Higher viscosity values are associated with higher molecular weight polymers and higher quality materials. Dispersion of NCC in BDO prior to esterification leads to higher viscosities for PBS nanocomposites, as exhibited in Example 15. Esterifying with succinic anhydride also increases the intrinsic viscosity for PBS nanocomposites in comparison to esterifying with succinic acid (see Examples 6 and 13).

TABLE 8

Intrinsic viscosity values for Examples 1-6

| | Example | | | | | |
|---|---|---|---|---|---|---|
| | 1 | 2 | 3 | 4 | 5 | 6 |
| Viscosity (dL/g) | 0.351 | 0.337 | 0.395 | 0.311 | 0.246 | 0.455 |

TABLE 9

Intrinsic viscosity values for Examples 8-15

| | Example | | | | | | | |
|---|---|---|---|---|---|---|---|---|
| | 8 | 9 | 10 | 11 | 12 | 13 | 14 | 15 |
| Viscosity (dL/g) | 0.35 | 0.4 | 0.34 | 0.31 | 0.25 | 0.46 | N/A | 1.04 |

Acid Value for Example 15

The acid value for Example 15 is determined according to ASTM D7409 standards. Briefly, about 0.6 g of the sample is dissolved in a chloroform/methanol solution. Phenolphthalein is added to the solution and is titrated with a Metrohm photometric titrator using 0.1N KOH in ethanol. The acid value for Example 15 is about 0.9 mg KOH/g, which corresponds to about 16 carboxylic acid end group equivalents per metric ton.

Dynamic Viscosity

Dynamic viscosity value is determined by using a Brookfield HAHB viscometer. FIG. 1 provides a plot illustrating the relationship between viscosity versus temperature for Example 15. Dynamic viscosity value is determined by using a Brookfield AMETEK rotational viscometer with a #27 spindle and thermo container. A small amount of polymer was placed in the sample container and the temperature was raised to 230° C. to induce melting. Viscosity measurements were recorded incrementally as the sample temperature decreased over time. Data collection stopped once the temperature neared the melting temperature of the polymer.

Differential Scanning Calorimetry (DSC)

Samples are placed in TA Instruments Q2000 equilibrated at 30° C. for 1 minute under nitrogen gas flow. For a first cycle, the calorimeter is ramped to 140° C. at 10° C./min. The sample is then placed on isothermal hold for 3 minutes. The calorimeter is ramped to −60° C. at 20° C./min for the second cycle. An isothermal hold is placed for two minutes to end the second cycle. A last cycle is performed wherein the calorimeter is ramped to 380° C. at 10° C./min.

Thermogravimetric Analysis (TGA)

Samples are equilibrated at 30° C. for 1 minute under nitrogen gas flow. The oven is heated to 600° C. at 10° C./min.

TABLE 10

Thermal Properties of Examples 8-15

| Sample | $T_g$ (° C.) | $T_m$ (° C.) | $T_c$ (° C.) | $T_{5\%}$ (° C.) | $X_c$ (%) |
|---|---|---|---|---|---|
| 8 | −23 | 113 | 63 | 354 | 52 |
| 9 | −23 | 113 | 69 | 356 | 47 |
| 10 | −23 | 114 | 67 | 354 | 51 |
| 11 | −26 | 107 | 80 | 347 | 48 |
| 12 | −21 | 107 | 85 | 342 | 45 |

TABLE 10-continued

| Thermal Properties of Examples 8-15 | | | | | |
|---|---|---|---|---|---|
| Sample | $T_g$ (° C.) | $T_m$ (° C.) | $T_c$ (° C.) | $T_{5\%}$ (° C.) | $X_c$ (%) |
| 13 | −23 | 106 | 82 | 344 | 45 |
| 13 (fiber) | −24 | 113 | 75 | 369 | 48 |
| 14 | N/A | N/A | N/A | N/A | N/A |
| 15 | N/A | N/A | N/A | N/A | N/A |

Thermal Analysis of Examples 8-15

Table 10 provides a comparison of numerous thermal properties of each PBS nanocomposite: 1) the glass transition temperature ($T_g$), 2) the crystalline melting temperature ($T_m$), 3) the cold crystallization temperature ($T_c$), 4) the decomposition temperature at 5% mass loss ($T_{5\%}$), and 5) the percent crystallinity ($X_c$). Most of the properties are substantially equivalent among the various PBS nanocomposites. The cold crystallization temperature is increased for PBS nanocomposites that are NCC extended and are esterified with epoxidized linseed oil. The polymer produced from example 13 was subjected to a basic melt spinning procedure using a twin-screw extruder fed into a spinneret block with 19 circular holes. The barrel temperature and spinneret were both set to 190° C. and the barrel pressure was held at 500 psi. Fibers were collected on a rotating drum under non-isothermal conditions and without any drawing procedures. At this temperature the polymer will begin to nucleate and grow crystalline domains. In some cases, having a higher $T_c$ will help with dimensional stability of the polymer.

$^1$H-NMR

The polymers and compositions can be characterized by $^1$H NMR.

TABLE 11

| Number average molecular weights of Examples 8-13 | | | | | | |
|---|---|---|---|---|---|---|
| | Example | | | | | |
| | 8 | 9 | 10 | 11 | 12 | 13 |
| $M_n$ (Da) | 32,360 | 24,812 | 40,699 | 29,066 | 17,326 | 40,401 |

The number average molecular weights for Examples 8-13 are provided in Table 11. The addition of succinic anhydride provides a higher $M_n$ in comparison to PBS nanocomposites esterified with succinic acid.

Particle Size Analysis

Polymer fiber produced from Example 13 is dissolved in chloroform at a concentration of 100 ppm. The solution is homogenized, then particle size analysis is performed using a Malvern Nano ZS Zetasizer. The absorption coefficient of the fiber is set to zero and the refractive index of the specimen is set to 1.49 (value for PBS). The experiment is run 5 times.

TABLE 12

| Particle size distribution | | | | | |
|---|---|---|---|---|---|
| Large gel particles volume | | | Small gel particles volume | | |
| Size (d · nm) | Stdev (d · nm) | Vol (%) | Size (d · nm) | Stdev (d · nm) | Vol (%) |
| 226.8 | 33.35 | 1.0 | 7.985 | 1.007 | 99.0 |
| 236.6 | 41.73 | 2.7 | 14.73 | 2.282 | 95.8 |
| 117.8 | 15.19 | 0.2 | 16.87 | 3.157 | 97.3 |
| 226.8 | 33.35 | 1.0 | 4.692 | 0.612 | 99.8 |
| 225.8 | 33.74 | 2.3 | 7.985 | 1.007 | 99.0 |
| 343.6 | 61.20 | 7.2 | 13.69 | 2.018 | 97.7 |
| 254.4 | 47.34 | 2.3 | 16.66 | 2.780 | 92.8 |

Figure 2:
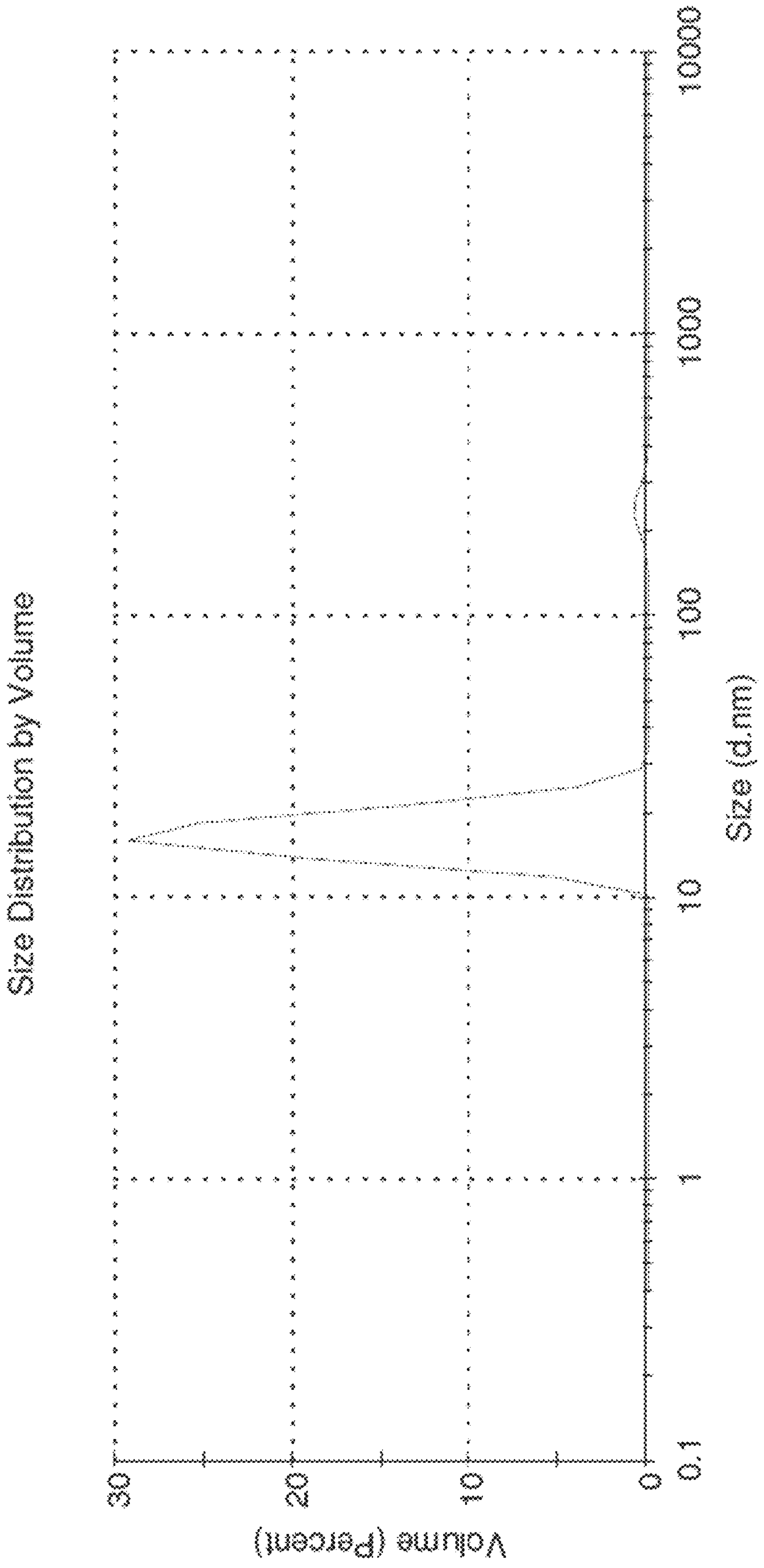
FIG. 2 shows a particle size distribution plot for a polymer fiber comprising materials prepared as shown in Example 13.

Table 12 and FIG. 2 show the particle size distribution for the dissolved polymer fiber. The majority of the particles for the polymer fiber have an average diameter between about 10-30 nm.

Particle Size Analysis for NCC Dispersed Using Sonication

Nano crystalline cellulose is slowly added to 1,4 butanediol at 1:10 (w/w) while stirring. The solution is continuously stirred and mixed to obtain a thick white liquid with no lumps present. Samples are dispersed at different amplitudes (60%, 80% and 100%) at a frequency of 1 Hz. For each amplitude, samples are collected at 1 minute, 3 minutes, and 5 minutes of sonication. Each sample is diluted using distilled water at 5% (w/v). Particle size analysis of the sample is performed using Malvern Nano ZS Zetasizer. The absorption coefficient of NCCs is set to 0.001 and the refractive index is set as 1.58. The absorption coefficient of water is set to zero and the refractive index is set as 1.33. Experiments are repeated 5 times for each of the 9 runs to confirm reproducibility and improve accuracy of gel size and polydispersity index.

TABLE 13

| Particle size distribution for NCC dispersed using sonication | | | | | | | | | | |
|---|---|---|---|---|---|---|---|---|---|---|
| Amplitude | Dispersion Time (min) | Small Size Particles (d · nm) | Stdev. (d · nm) | Vol (%) | Medium Size Particles (d · nm) | Stdev. (d · nm) | Vol (%) | Large Size Particles (d · nm) | Stdev. (d · nm) | Vol (%) |
| 60% | 1 | 4.06 | 0.91 | 86.9 | 14.01 | 5.66 | 12.7 | 95.47 | 35.17 | 0.3 |
| | 3 | 4.44 | 1.06 | 89.9 | 15.18 | 4.93 | 9.7 | 109.4 | 32.52 | 0.2 |
| | 5 | 7.97 | 2.1 | 94.3 | 29.67 | 9.16 | 5.1 | 283.9 | 117.6 | 0.6 |
| 80% | 1 | 5.61 | 1.36 | 95.4 | 17.18 | 6.03 | 3.2 | 89.11 | 28.78 | 1.3 |
| | 3 | 11.8 | 3.16 | 96.7 | 60.65 | 17.74 | 1.9 | 385.6 | 136 | 1.4 |
| | 5 | 10.44 | 2.68 | 97.2 | 52.91 | 17.51 | 1.2 | 71.96 | 28.56 | 1.6 |
| 100% | 1 | 10.92 | 3.12 | 93.8 | 36.42 | 12.01 | 4.7 | 340.9 | 168.7 | 1.4 |
| | 3 | 6.04 | 1.65 | 92.7 | 22.13 | 18.41 | 7.1 | 298.8 | 197.2 | 0.2 |
| | 5 | 9.99 | 2.97 | 97.5 | 69.72 | 33.51 | 1.1 | 95.92 | 33.16 | 1.5 |

Figure 3A:
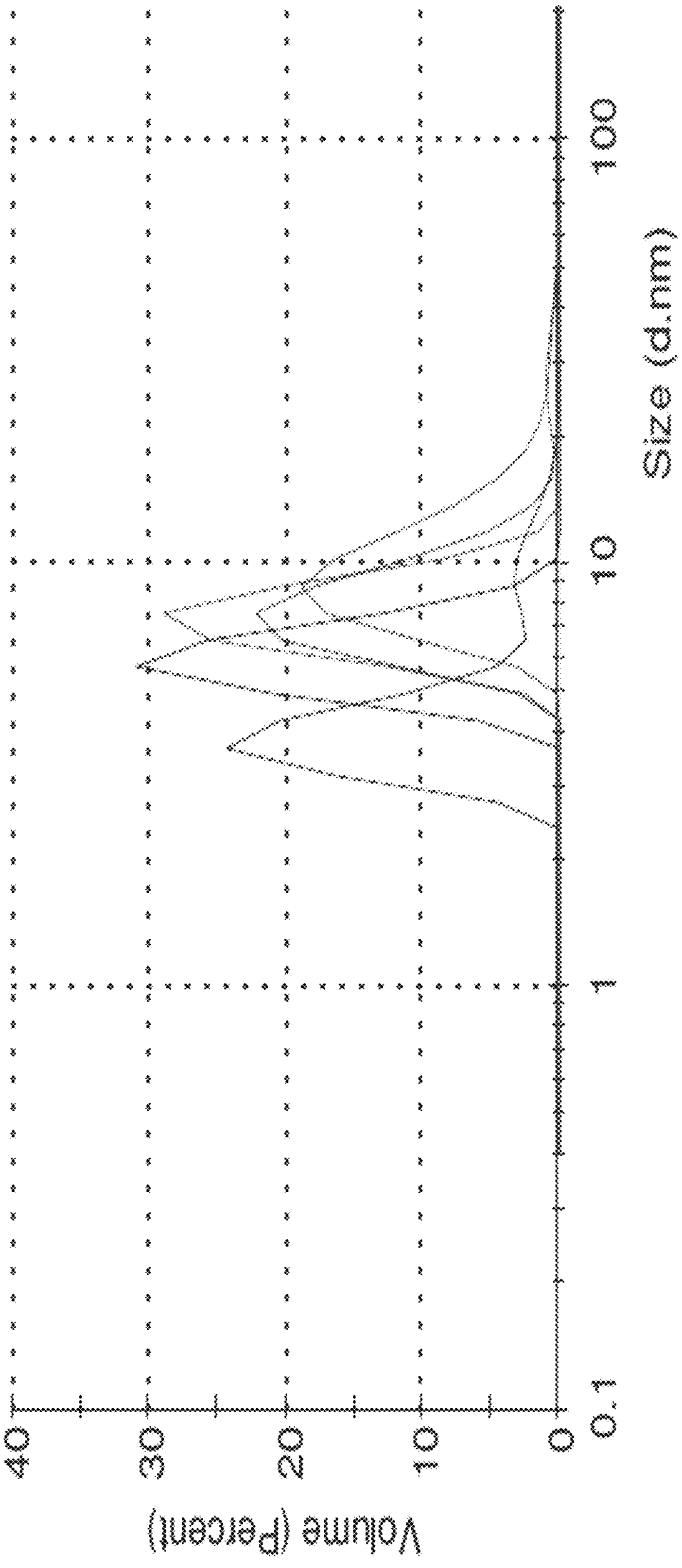
FIGS. 3A-3C show particle size distribution plots for various cellulose nanocrystals dispersed in 1,4 butanediol at sonication amplitudes of 60, 80 or 100%, respectively.
Figure 3B:
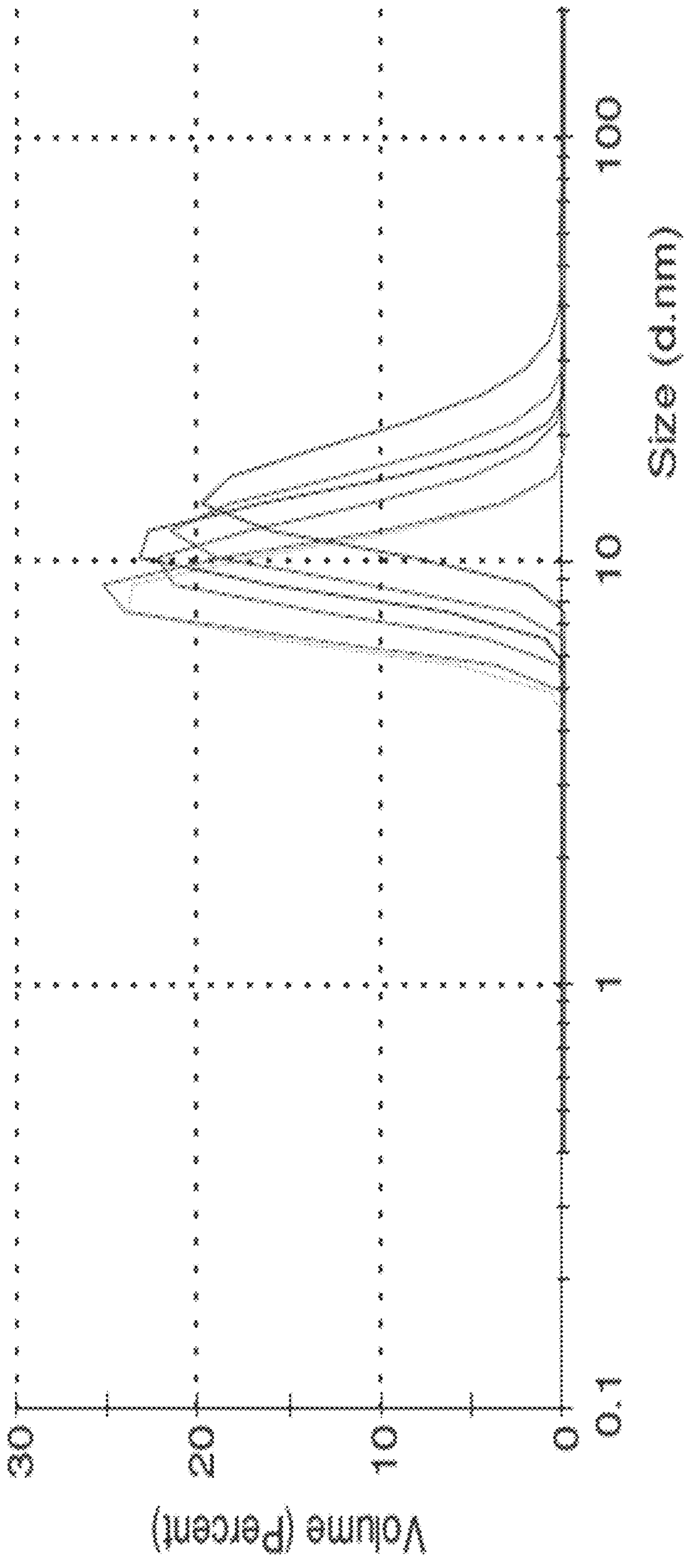
Figure 3C:
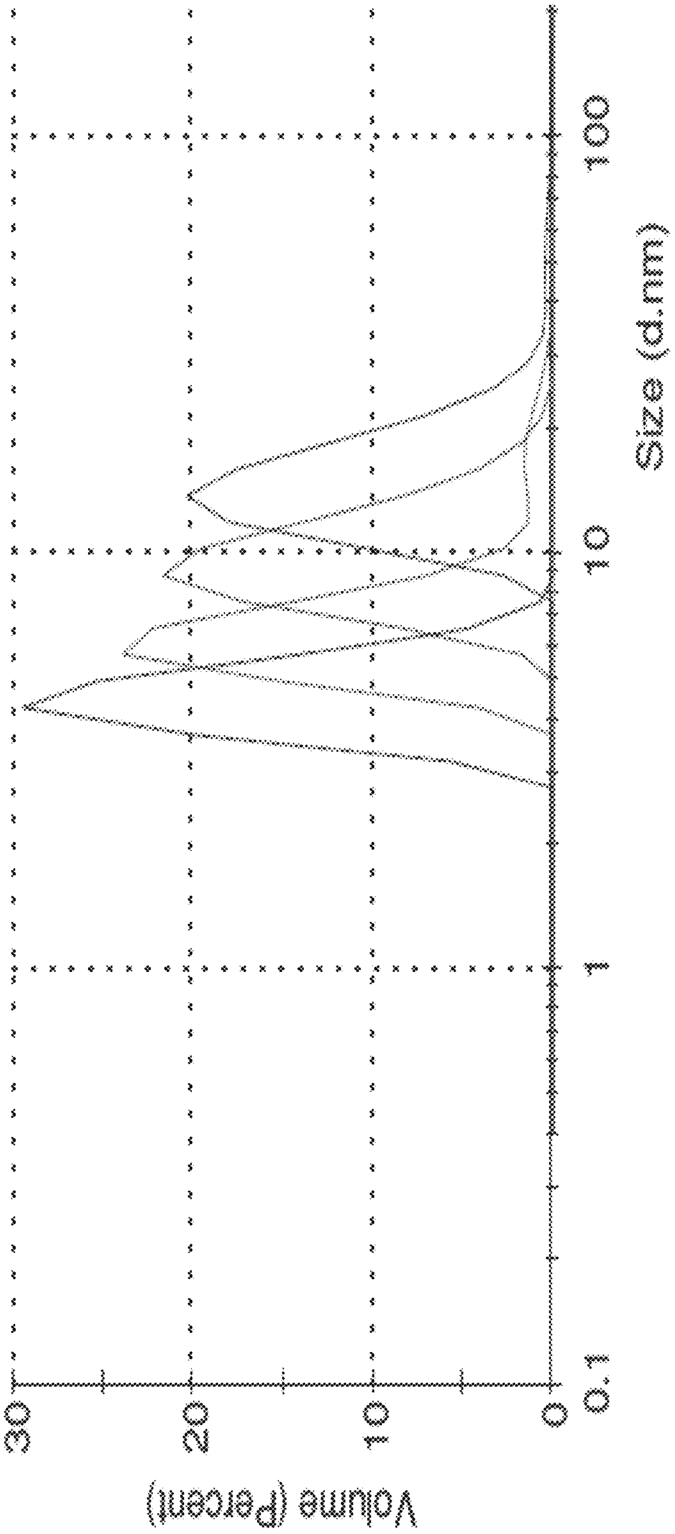

FIGS. 3A-3C and Table 13 compare particle size distribution data across different time points and amplitudes of sonication. Particle sizes correlate with the extent of dispersion of NCC in BDO, wherein smaller particle sizes indicate increased NCC dispersion. Higher amplitudes of sonication generally leads to increased levels of NCC dispersion (indicated by the higher distribution of small particle sizes), particularly for short durations of sonication. The differences between sonication values decrease as the duration increases. Similarly, longer durations of sonication provide greater NCC dispersion.

Particle Size Analysis for NCC Dispersed Using Homogenization

Nano crystalline cellulose is slowly added to 1,4 butanediol at 1:10 (w/w) while stirring. The solution is continuously stirred and mixed to obtain a thick white liquid with no lumps present. Samples are dispersed at three different homogenizer speeds, ranging from 10000 rpm to 16667 rpm. For each speed setting, samples are collected at 1 minute, 3 minutes, and 5 minutes of homogenizing. Each sample is diluted using distilled water at 5% (w/v). Particle size analysis of the sample is performed using Malvern Nano ZS Zetasizer. The absorption coefficient of Nccs is set to 0.001 and the refractive index is set as 1.58. The absorption coefficient of water is set to zero and the refractive index is set as 1.33. Experiments are repeated 5 times for each of the 9 runs to confirm reproducibility and improve accuracy of gel size and polydispersity index.

TABLE 14

Particle size distribution for NCC dispersed using homogenization

| Speed (1000 rpm) | Dispersion Time (minutes) | Small Size Particles (d · nm) | Stdev. (d · nm) | Vol (%) | Medium Size Particles (d · nm) | Stdev. (d · nm) | Vol (%) | Large Size Particles (d · nm) | Stdev. (d · nm) | Vol (%) |
|---|---|---|---|---|---|---|---|---|---|---|
| 10 | 1 | | | | 53.62 | 12.98 | 55.3 | 462.8 | 122.4 | 44.7 |
| | 3 | | | | 66.93 | 14.18 | 18.4 | 951.2 | 252.6 | 81.6 |
| | 5 | | | | 53.51 | 9.69 | 29.6 | 908.4 | 199.2 | 70.4 |
| 13.33 | 1 | | | | 25.55 | 4.25 | 82.6 | 679.2 | 118.3 | 17.4 |
| | 3 | | | | 29.52 | 4.86 | 84.3 | 547.2 | 83.35 | 15.7 |
| | 5 | | | | 23.00 | 3.61 | 92.3 | 413.9 | 67.52 | 7.7 |
| 16.66 | 1 | 9.13 | 7.41 | 97.1 | | | | 897.5 | 420.4 | 2.8 |
| | 3 | | | | 33.09 | 5.45 | 72.7 | 665.4 | 123.4 | 27.3 |
| | 5 | | | | 58.29 | 11.31 | 55.8 | 468.0 | 90.73 | 44.2 |

Figure 4A:
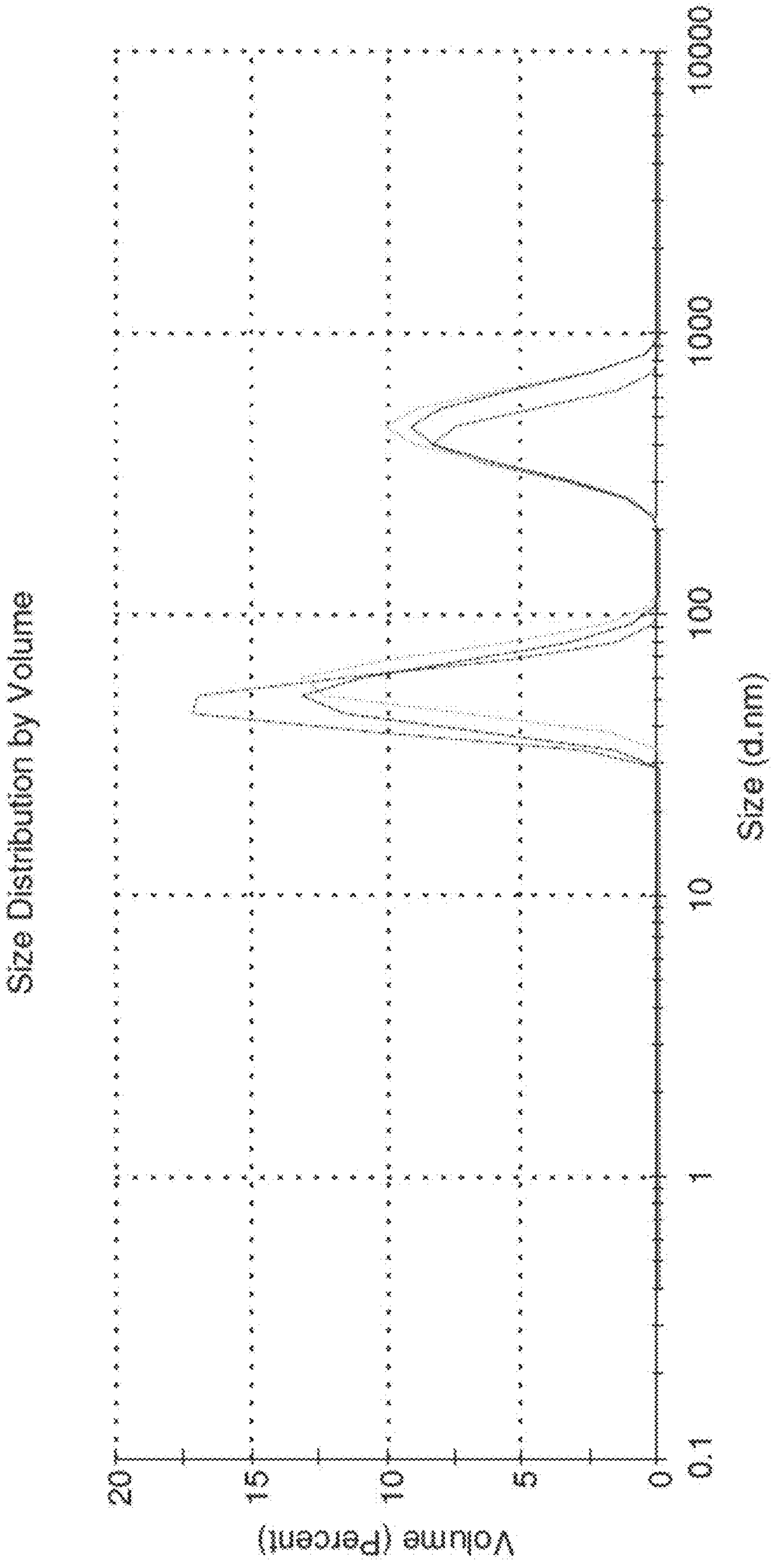
FIGS. 4A-4C show particle size distribution plots for cellulose nanocrystals dispersed in 1,4 butanediol at homogenizer speeds of 10000 rpm, 13333 rpm, or 16666 rpm for 1 minute, respectively.
Figure 4B:
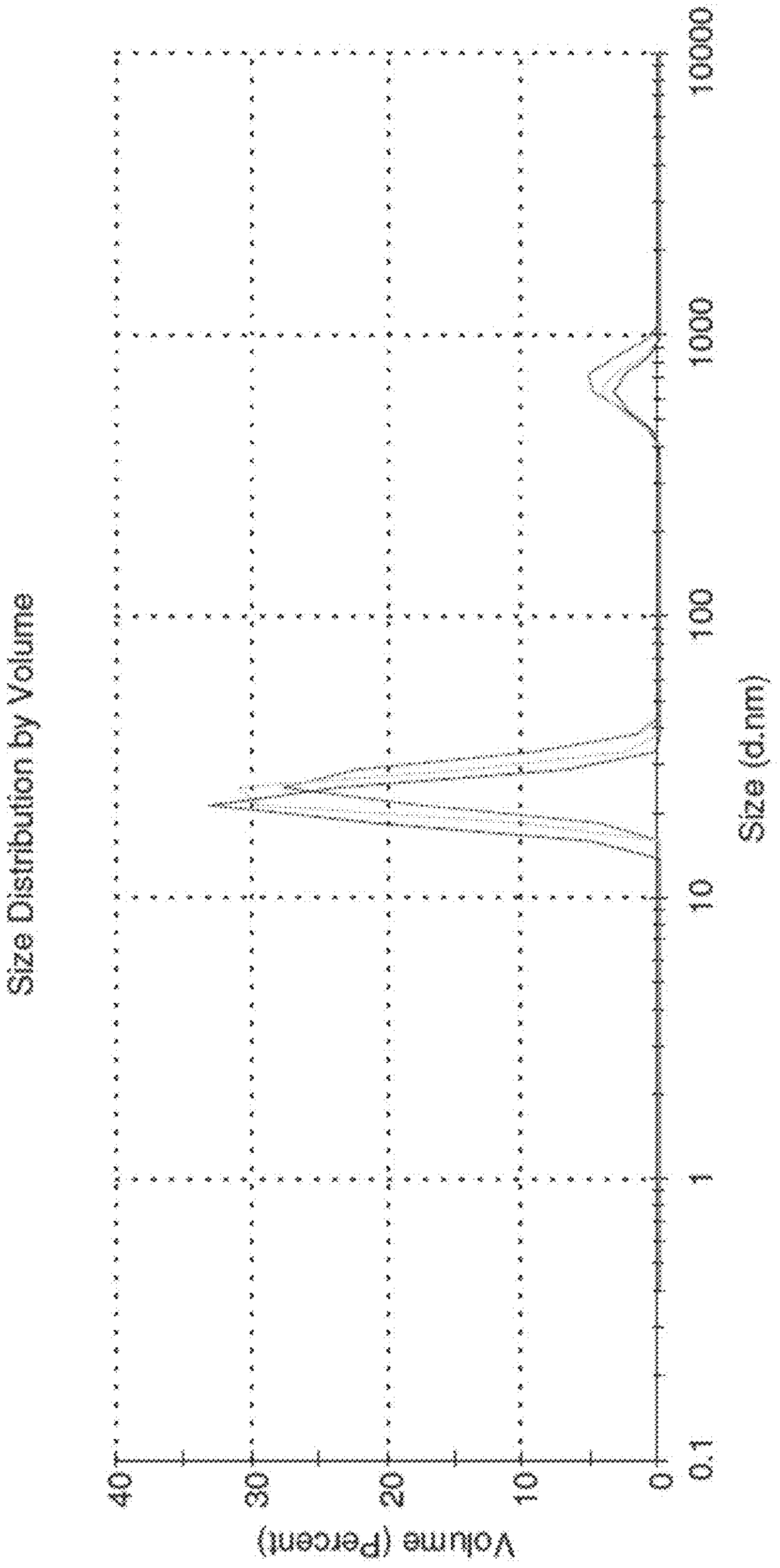
Figure 4C:
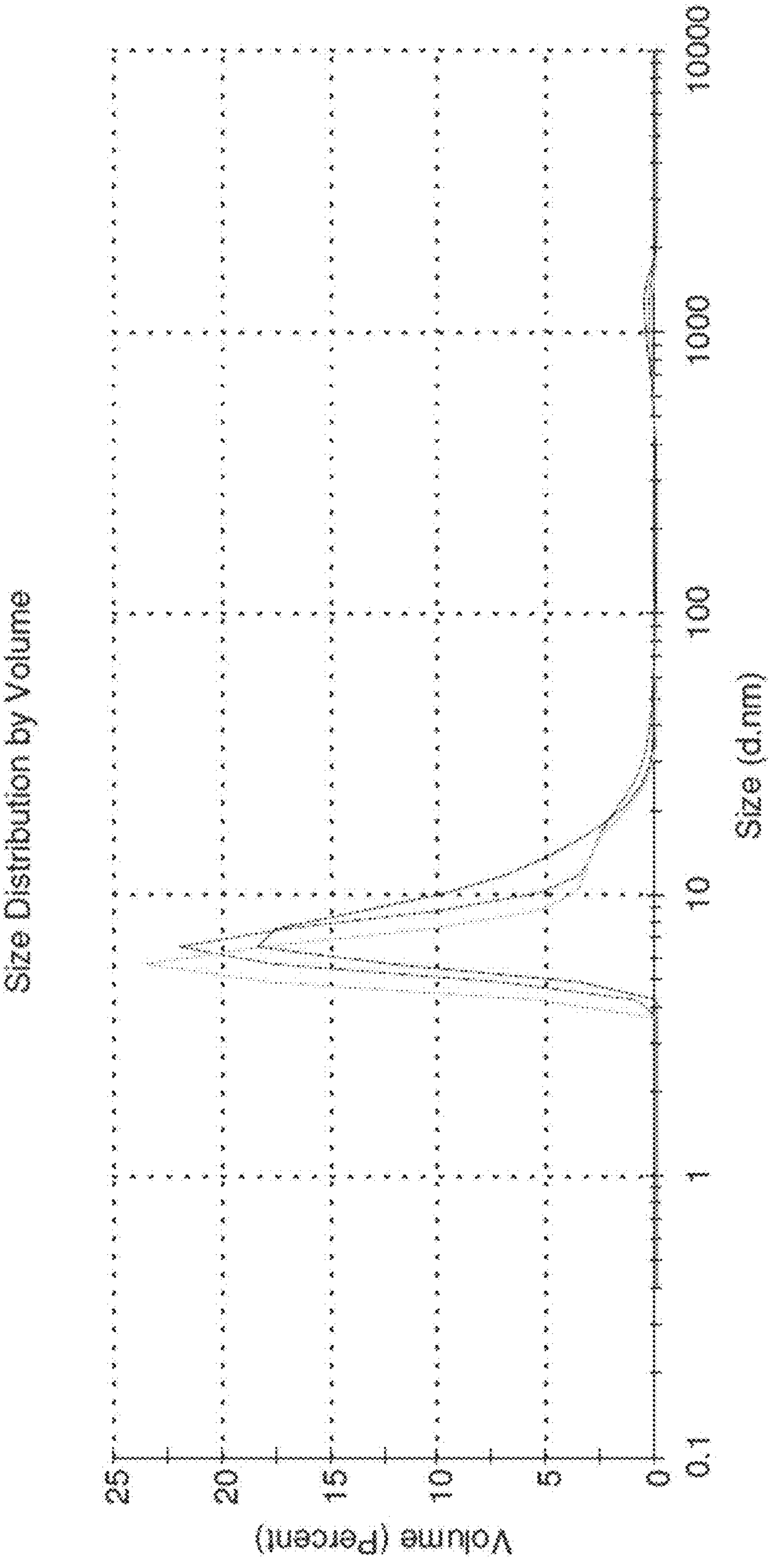

FIGS. 4A-4C and Table 14 compare particle size distribution data across different time points and speeds of homogenization. Higher speeds correspond to higher shear levels and particle sizes correlate with the extent of dispersion of NCC in BDO, wherein smaller particle sizes indicate increased NCC dispersion. As seen in Table 14, a high speed of homogenization is needed to effectively disperse NCC. Speeds of 13,330 and 10,000 rpm results in a higher distribution of medium and large particle sizes.

Example 16: PBS NCC+Epoxide Extended, Sonication Method

Example 16 is a similar method to example 14, except ELO is added at the beginning of the process with the monomers. Example 15 demonstrates that ELO can used as a chain extender and/or branching agent when added between the esterification and polycondensation steps of certain methods of this disclosure. Examples 13, 12, 11, 9, 7, 6, 4, and 3 exhibit the use of ELO used as a capping agent.

Example 17: ELO Used in Both as Extender and Capping Agent

Example 16 is a similar method to example 14 except half of the ELO is added after esterification and the other half is added at the end of the polymerization reaction.

Example 18: Phytic Acid (PA) Addition

Example 18 is a similar method to example 7, except the phytic acid solution is added before the esterification step.

Example 19: PA Addition in Between Esterification/Polycondensation

Example 19 is a similar method to example 7, except the phytic acid solution is added after the esterification step and before the addition of catalyst.

Example 20: PA Addition in Between Esterification/Polycondensation

Example 20 is a similar method to example 15, except the phytic acid solution is added after the esterification step and before the addition of ELO. PA addition at the end of reaction is shown in Example 7.

Example 21: Addition of NCC Between Esterification/Polycondensation Steps

Example 21 is a similar method to Example 15 except the NCC dispersion is added to the monomer containing reaction mixture after the esterification step and before the addition of ELO.

Example 22: Addition of Chitin Nanofibers

Example 22 is a method that is the same as example 15 except that chitin nanofibers (CNF) are utilized instead of NCCs.

Example 23: Mixture of Chitin Nanofibers and NCCs

Example 23 is a method that is the same as example 15 except that chitin nanofibers (CNF) are utilized with the NCCs as a 50/50% wt mixture.

Example 24: PBS With 0.1% wt. NCC+0.4% wt. ELO Using Esterification Catalyst (No Polycondensation)

BDO and SA at are charged to a 2 L reaction vessel. The reaction is stirred at 190 rpm with $N_2$ flow until a homogeneous slurry is formed. A dispersion of BDO and NCCs is added to the reaction vessel bringing the BDO:SA molar ratio to 1.05:1 and the NCC content to ~0.1% wt. An esterification catalyst is added (hafnium tert-butoxide (HtBO), 100-500 ppm [Hf] in total) before increasing the reaction temperature to 225° C. over the course of 110 minutes. During this ramp, water is formed and removed from the reactor. Upon reaching 225° C. the reaction is left to stir until threshold viscosity/end-group concentration is reached and then ELO is added (0.4% wt). The temperature is then increased to 230° C. The reaction proceeds for 30 minutes after this point and the stirring speed is sequentially slowed down to 50 rpm as the viscosity of the melt increases. The vessel is re-pressurized and 50% wt. phytic acid solution in DI water is added as a heat stabilizer and decolorizer (0.4% wt. PA solids). A transesterification catalyst is added (zirconium butoxide (ZBO) 80% wt. in 1-butanol, 100-500 ppm [Zr] in total) as the last step before pelletization. A mid-molecular weight polymer is formed that may be subjected to solid state polymerization (SSP) to increase the molecular weight to a desirable value during the pellet drying stage prior to melt spinning or subsequently after melt spinning while in yarn form.

Example 25

Preparation of a Mixed Metal Oxide Catalyst Solution

Catalyst 1 (Solution C1):

Solution A: Zirconium (Zr) acetate in $H_2O$ (Sigma) with a Zr content of 16.5% wt.

Solution B: A stock solution of Magnesium acetate in $H_2O$ was prepared with a Mg content of 4.12% wt.

Solution C: A stock solution of Kojic acid (KA) in $H_2O$ was prepared with a KA content of 3.7% wt.

Method: Solution A and an amount of deionized (DI) water are raised to 50° C. and Solution B is added dropwise with stirring. After 1 hour a thick white sol gel evolves. The solution has a blue/pink hue indicating the formation of a colloid. The metal colloid solution is then added dropwise to Solution C at room temperature with stirring. The final solution is a thick white/yellow precipitate.

An amount of glycol is added to the solution and the remaining water and acetic acid are evaporated out via gentle distillation. Over the course of the distillation the solution becomes clearer. The final solution is a completely transparent, yellow liquid with a final Zr content of ~4.92% wt.

A variety of catalysts can be prepared by adapting the method above.

Preparation of Dispersions of Cellulose Nanocrystals (NCC)

NCC Pre-Dispersion

NCC powder (NanoCrystalline Cellulose, cellulose sulphate sodium salt, CAS #9005-22-5) is added through a sieve into a vortex of liquid water, 1,4-butanediol (BDO), or a combination of water/BDO to reach a solution of up to 4% wt. NCC. For a purely aqueous solution it is most preferable to create a solution in the range of 0.05-1.5% wt. NCC.

NCC Dispersion

The NCC pre-dispersion solution described above, can be further treated according to one or more of the following procedures:

The pre-dispersion may be heated to 30-40° C. with stirring for up to 1 hour and filtered through a sieve to remove undesirable contaminants/gels.

The pre-dispersion may be sonicated using a probe-tip sonicator running at an amplitude between 60-80% and delivering between 2500-8000 Joules per gram of NCC. The resulting solution is filtered through a sieve to remove remaining contaminants/gels.

In some cases, the pre-dispersion may be further dispersed using a high shear disperser such as a rotor-stator mixer or high shear blade. Typically, the solution is agitated for 1-2 minutes at 50-80% of the rated power of the disperser. The resulting solution is filtered through a sieve to remove remaining contaminants/gels.

NCC Functionalization Options—None, Catalytic, & Non-Catalytic

Depending on the desired resin and resin properties, the dispersed NCC solution may be incorporated into the reaction mixture for polymerization reaction via different procedures.

The NCC dispersion may be used as is without further functionalization and added to either the pre-esterification slurry mixture or to the pre-polycondensation oligomer mixture. The NCC dispersion solution can be added to the pre-polycondensation oligomer mixture using a variety of convenient methods to achieve a desired NCC and solvent concentration, in the reaction mixture.

Activated NCC Dispersion-Catalyst Solution

The NCC dispersion may be added to an aqueous solution containing zirconium acetate, zirconium acetate hydroxide, zirconyl chloride octahydrate, zirconium propionate, magnesium acetate tetrahydrate, magnesium chloride hexahydrate, or a combination of these products to make a catalytically active solution. The order of addition of these solutions may be varied. For example, when a mixed metal oxide catalyst is to be utilized, the NCC dispersion may be added to a zirconium containing solution, followed by addition of a magnesium containing solution. Alternatively, the NCC dispersion may be added to a solution containing a mixed metal ion catalyst, e.g., a solution containing zirconium and magnesium.

The temperature of the mixed NCC dispersion and catalyst solutions may be varied. For example, the solutions may be combined at room temperature (25 C), and then raised to a temperature range between 50-80° C. In general, the NCC dispersion-catalyst solution is stirred for at least 1 hour at 50-80° C. prior to addition to a reaction mixture.

It is understood that depending on the particular resin and resin properties that are desired, the amounts and ratios of the components of the NCC dispersion solution and metal based catalyst solutions can vary.

The metal solutions of the catalyst are typically made in deionized water at a concentration between 2-20% wt. More preferable are solutions at concentrations between 3-12% wt.

The ratio of magnesium to zirconium ions can be between 1-3 mol/mol in the final dispersion. The ratio of NCCs to metal ions can be between 1-20 wt/wt. In the final dispersion. The most preferable ratio is between 5-15 wt/wt.

Non-Catalytic NCC Dispersion Solution

The NCC dispersion may be added to an aqueous solution of aluminum acetate, aluminum diacetate, aluminum triacetate, or a combination thereof, to make a non-catalytically active solution. The temperature of the solutions may be varied. For example, the metal solution may added at room temperature, and raised to a temperature range between 50-80° C., before stirring of the final solution for at least 1 hour at a temperature range between 50-80° C.

The metal solution is typically made in deionized water at a concentration between 2-20% wt. More preferable are solutions at concentrations between 3-12% wt. The ratio of NCCs to aluminum ions can be between 1-20 wt/wt in the final dispersion. A preferred ratio is between 5-15 wt/wt.

NCC Dispersion Characterization

The quality of the dispersion can be assessed visually by looking for NCC pockets or large NCC gel blobs, or other unsuspended material.

NCC dispersion solutions can be diluted (e.g., to 2% wt or less) and observed in between polarized filters. This approach helps identify unsuspended material that is otherwise invisible in the suspension. At high consistencies, the NCC suspension can be placed on a black surface and pressed down to create a thin NCC gel which will help visualize unsuspended material.

The NCC dispersion solutions can be characterized using a particle size analyzer, such as a Malvern Zetasizer Nano ZS instrument. Samples can be diluted to 0.1% wt. and any contaminants removed with a syringe filter before testing. Typically, dispersed NCC particles in the solution have a size range between 75-125 nm. Metal-functionalized NCCs (e.g., as described above) can have a slightly larger size and size range.

A variety of methods can be used to characterize NCC dispersions, including those described by Shafiei-Sabet et al., "Rheology of Nanocrystalline Cellulose Aqueous Suspensions." Langmuir 2012, 28, 17124-17133.

Epoxidized Triglycerides (ELO, ESO)

Epoxidized triglycerides such as epoxidized linseed oil (ELO) or epoxidized soybean oil (ESO) can be used in the polymerization reaction. The ELO or ESO is added as a liquid before the addition of the catalyst solution, and before the polycondensation step of the reaction. When the polymerization is a single step process, the ELO or ESO is added to the initial reaction mixture.

In general, the ELO or ESO added can act as an acid scavenger in the mixture and improve the color and heat stability of the resin produced.

The ELO or ESO added can also extend the polymer chain length, and improve the melt strength and intrinsic viscosity of the final polymer.

The addition of ELO or ESO to the polymerization reaction mixture can also enhance the process. The epoxide groups may react with residual BDO or water solvent that is present in the prepolymer mixture, increasing processing speeds. This property can be important when using moisture sensitive catalysts such as Zr butoxide, and a polymerization method including a pre-polycondensation step.

Preparation of a Polybutylene Succinate (PBS) Co-Polymers

Catalyst solutions are used in the synthesis of polybutylene succinate co-polymer nanocomposite resin compositions by adapting any one of the polymerization methods described in Examples 2-7 and 8-15.

Composition 1 conditions: mixed metal oxide catalyst solution C1 was used to prepare PBS nanocomposite resin (130 ppm Zr+17 ppm Mg) according to the methods described herein.

Epoxidized linseed oil (ELO) is added before polycondensation to eliminate the need for a pre-polycondensation step. In general, a pre-polycondensation step is important for moisture sensitive catalysts.

Use of ELO as an additive helps achieve higher MW polymer composition and creates polymeric branch points that increase melt strength in the resulting resin compositions.

The polycondensation took ~1.5 hours with 2.5 mbar vacuum and the polymer was discharged once a torque strength of 22 Newton-cm (Ncm) was reached. In general, there is a linear correlation between the increasing torque observed of the polymeric reaction mixture and the degree of polymerization of the PBS nanocomposite resin. The torque can be used to monitor the molecular weight in situ during the polymerization. The final resin product (300 g) is a tough soft plastic with low color.

Composition 2 conditions: a titanium catalyst was used to prepare PBS nanocomposite resin (862 ppm Ti) according to similar methods. The polycondensation took 2.33 hours with <1 mbar vacuum, and produced 900 g resin having less desirable color.

Composition 3 conditions: a zirconium catalyst was used to prepare PBS nanocomposite resin (442 ppm Zr) according to the similar methods. The polycondensation took 6 hours with <1 mbar vacuum, and produced 8 kg resin having acceptable color.

Assessment of PBS Nanocomposite Resin

The resin compositions produced are assessed for color/colorless appearance, intrinsic viscosity and spinnability.

PBS polymer composition 1—0.82 dL/g intrinsic viscosity.

PBS polymer composition 2—0.83 dL/g intrinsic viscosity.

PBS polymer composition 3—0.88 dL/g intrinsic viscosity.

Melt Spinning of PBS Nanocomposite Resin

The resin compositions produced are used to prepare fibers using a melt spinning process. The fibers produced are assessed for a variety of properties, such as hydrolytic stability, fiber diameter, linear density, and tensile strength (e.g., elastic modulus, tenacity, and strain at break).

Figure 5:
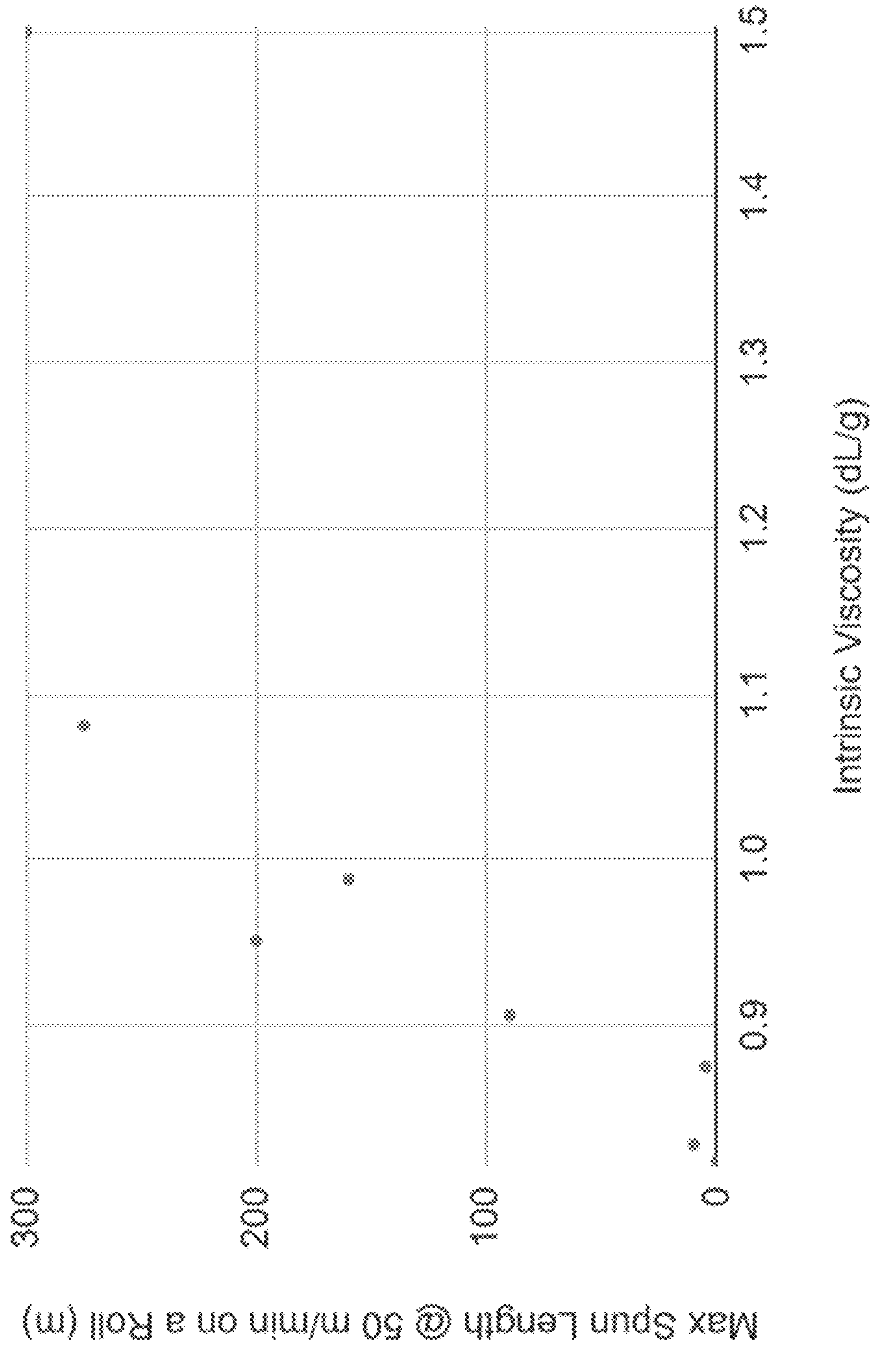
FIG. 5 shows a plot illustrating the relationship between intrinsic viscosity and maximum spun length for a conventional commercial grade PBS polymer resin.

FIG. 5 shows a plot illustrating the expected relationship between intrinsic viscosity and maximum spun length for a PBS polymer resin.

The diameters, tensile strengths, hydrolytic stability, and other properties of fibers produced from PBS nanocomposite resins of this disclosure under various melt spinning conditions (e.g., increasing draw ratios (DR) of 1 to 10) are assessed using conventional methods.

The PBS nanocomposite resins of this disclosure are demonstrated as processable into fibers using commercial melt spinning processes. The produced fibers are demonstrated to have desirable properties such as being colorless or of desirable low color, hydrolytic stability over an extended period of time, stability to dye procedures (e.g., dyeability), and desirable tensile strength.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

What is claimed is:

1. A method for producing a polymer-polysaccharide nanocomposite resin, the method comprising the steps of:

a) preparing and heating a mixture comprising a diacid agent monomer and 1,4-butane diol at a first temperature to esterify the diacid agent monomer and 1,4-butane diol;

b) contacting the heated mixture of step a) with a nanocellulose crystal (NCC) dispersion after esterification of the monomers to produce a NCC oligomeric composition; and c) heating a second mixture comprising the NCC oligomeric composition and a catalyst at a second temperature and under reduced pressure to polycondense the NCC oligomeric composition and produce a polymer-cellulose nanocomposite resin.

2. The method of claim 1, wherein the first temperature is from 150° C. or more.

3. The method of claim 1, wherein the second temperature is from 200° C. or more.

4. The method of claim 1, wherein the diacid agent monomer is selected from succinic acid, monoalkyl succinate, dialkyl succinate, dimethyl succinate, diethyl succinate, and succinic anhydride.

5. The method of claim 1, wherein the NCC dispersion comprises 1,4-butanediol.

6. The method of claim 1, wherein the NCC dispersion comprises a 1,4-butanediol or a glycol solution.

7. The method of claim 1, wherein the NCC dispersion does not comprise water.

8. The method of claim 1, wherein the first temperature is 150° C. to 200° C.

9. The method of claim 1, wherein the second temperature is greater than the first temperature, and the second temperature is 200° C. to 250° C.

10. The method of claim 1, wherein the NCC oligomeric composition comprises oligomers having an average MW of 500 Da or more.

11. The method of claim 4, wherein the diacid agent monomer is selected from succinic acid, dimethyl succinate, and succinic anhydride.

12. The method of claim 1, wherein NCC oligomeric composition comprises a butylene succinate repeating unit and has an average MW of 1,000 to 10,000 Da.

13. The method of claim 1, wherein the second mixture of step c) further comprises an epoxidized oil.

14. The method of claim 1, wherein step a) or step b) further comprises the addition of a catalyst.

15. The method of claim 14, wherein the catalyst is added at the beginning of step a) or during step a).

16. The method of claim 14, wherein the catalyst is added at the beginning or during step b).

17. The method of claim 1, wherein the catalyst is a mixed metal oxide catalyst.

18. The method of claim 17, wherein the catalyst comprises zirconium.

19. The method of claim 18, wherein the catalyst comprises zirconium in an amount of 100 to 500 ppm.

20. The method of claim 19, wherein the catalyst comprises zirconium in an amount of 470 ppm.

21. An article comprising the nanocomposite resin of claim 1, wherein the article is manufactured from the nanocomposite resin using melt spinning, wherein the article is yarn or fiber.

22. The method of claim 11, wherein:

the first temperature is 150° C. to 200° C.; and the second temperature is 200° C. to 250° C.

23. The method of claim 22, wherein the second mixture of step c) further comprises an epoxidized oil.

24. The method of claim 23, wherein step a) or step b) further comprises the addition of a catalyst.

25. The method of claim 24, wherein the catalyst is a mixed metal oxide catalyst comprising zirconium.

* * * * *